United States Patent
Tischler et al.

(10) Patent No.: US 9,494,305 B2
(45) Date of Patent: Nov. 15, 2016

(54) LIGHTING SYSTEMS INCORPORATING FLEXIBLE LIGHT SHEETS DEFORMABLE TO PRODUCE DESIRED LIGHT DISTRIBUTIONS

(71) Applicants: Michael A. Tischler, Vancouver (CA);
Paul Palfreyman, Vancouver (CA);
(Continued)

(72) Inventors: Michael A. Tischler, Vancouver (CA);
Paul Palfreyman, Vancouver (CA);
(Continued)

(73) Assignee: Cooledge Lighting, Inc., Richmond (CA)

( * ) Notice: Subject to any disclaimer, the term of this patent is extended or adjusted under 35 U.S.C. 154(b) by 32 days.

(21) Appl. No.: 14/303,197

(22) Filed: Jun. 12, 2014

(65) Prior Publication Data
US 2014/0369038 A1    Dec. 18, 2014

Related U.S. Application Data

(60) Provisional application No. 61/834,183, filed on Jun. 12, 2013.

(51) Int. Cl.
*F21V 21/14* (2006.01)
*F21L 4/00* (2006.01)
(Continued)

(52) U.S. Cl.
CPC .................. *F21V 21/14* (2013.01); *F21L 4/00* (2013.01); *F21V 21/005* (2013.01); *F21V 21/34* (2013.01);
(Continued)

(58) Field of Classification Search
CPC ................... F21V 21/14; F21V 21/005; F21V 21/34; F21V 33/00; F21V 23/06; F21V
(Continued)

(56) References Cited

U.S. PATENT DOCUMENTS 4,103,171 A      7/1978  Schroeder
4,173,035 A  *  10/1979  Hoyt ...................... F21S 10/00
                                                                361/749
(Continued)

FOREIGN PATENT DOCUMENTS

JP      2007-115550 A     5/2007
JP      2007-531321 A    11/2007
(Continued)

OTHER PUBLICATIONS

PCT International Patent Application No. PCT/US2014/041280, International Search Report and Written Opinion mailed Oct. 22, 2014, 14 pages.
(Continued)

*Primary Examiner* — Bao Q Truong
(74) *Attorney, Agent, or Firm* — Morgan, Lewis & Bockius LLP

(57) ABSTRACT

In accordance with certain embodiments, lighting systems include flexible light sheets having light-emitting elements with first luminous intensity distributions disposed thereover, and the light sheets are curved or folded to produce a second luminous intensity distribution different from the first luminous intensity distribution.

47 Claims, 36 Drawing Sheets

(71) Applicants: Calvin Wade Sheen, Chula Vista, CA (US)

(72) Inventors: Calvin Wade Sheen, Chula Vista, CA (US)

(51) Int. Cl.
| | |
|---|---|
| *F21V 21/005* | (2006.01) |
| *F21V 21/34* | (2006.01) |
| *F21V 33/00* | (2006.01) |
| *G06F 1/16* | (2006.01) |
| *G09F 13/00* | (2006.01) |
| *F21Y 105/00* | (2016.01) |
| *F21L 4/08* | (2006.01) |
| *F21V 1/00* | (2006.01) |
| *F21V 23/06* | (2006.01) |
| *F21V 31/00* | (2006.01) |
| *F21V 17/00* | (2006.01) |
| *F21V 21/08* | (2006.01) |
| *F21Y 101/02* | (2006.01) |

(52) U.S. Cl.
CPC ............. *F21V 33/00* (2013.01); *G06F 1/1616* (2013.01); *G09F 13/00* (2013.01); *F21L 4/08* (2013.01); *F21L 2001/00* (2013.01); *F21V 17/007* (2013.01); *F21V 21/08* (2013.01); *F21V 23/06* (2013.01); *F21V 31/005* (2013.01); *F21Y 2101/02* (2013.01); *F21Y 2105/001* (2013.01); *F21Y 2105/003* (2013.01)

(58) Field of Classification Search
CPC ................ 17/007; F21V 31/005; F21V 21/08; F21L 4/00; F21L 4/08; F21L 2001/00; G06F 1/1616; F21Y 2105/001; F21Y 2101/02; F21Y 2105/003
See application file for complete search history.

(56) References Cited

U.S. PATENT DOCUMENTS

| | | | | |
|---|---|---|---|---|
| 5,559,681 A | * | 9/1996 | Duarte | .................... F21V 21/08 362/231 |
| 8,410,726 B2 | * | 4/2013 | Dau | ......................... F21K 9/135 315/307 |
| 8,760,075 B1 | * | 6/2014 | Tischler | ............. H05B 33/0815 315/185 S |
| 8,786,200 B2 | | 7/2014 | Tischler et al. | |
| 8,801,224 B2 | * | 8/2014 | Huang | .................... F21K 9/135 362/227 |
| 8,926,130 B2 | * | 1/2015 | Li | ........................ F21V 29/2231 362/249.02 |
| 2006/0197456 A1 | | 9/2006 | Cok | |
| 2009/0116244 A1 | | 5/2009 | Hsiao et al. | |
| 2010/0065873 A1 | | 3/2010 | Bhattacharya et al. | |
| 2011/0254470 A1 | | 10/2011 | Penoyer | |
| 2012/0169227 A1 | * | 7/2012 | Chidiac | .................... F21K 9/135 315/35 |
| 2014/0321126 A1 | * | 10/2014 | Narag | .................... H05K 1/189 362/306 |
| 2014/0362566 A1 | | 12/2014 | Tischler et al. | |
| 2014/0369033 A1 | | 12/2014 | Palfreyman et al. | |

FOREIGN PATENT DOCUMENTS

| | | |
|---|---|---|
| JP | 2011-65829 A | 3/2011 |
| JP | 2012-43756 A | 3/2012 |
| WO | 98/23896 A1 | 6/1998 |
| WO | 2013/001528 A1 | 1/2013 |
| WO | 2013/021311 A2 | 2/2013 |
| WO | 2014/200846 A1 | 12/2014 |
| WO | 2014/201112 A1 | 12/2014 |
| WO | 2014/201250 A1 | 12/2014 |

OTHER PUBLICATIONS

PCT International Patent Application No. PCT/US2014/041903, International Search Report and Written Opinion mailed Nov. 12, 2014, 22 pages.

PCT International Patent Application No. PCT/US2014/042126, International Search Report and Written Opinion mailed Oct. 27, 2014, 9 pages.

* cited by examiner

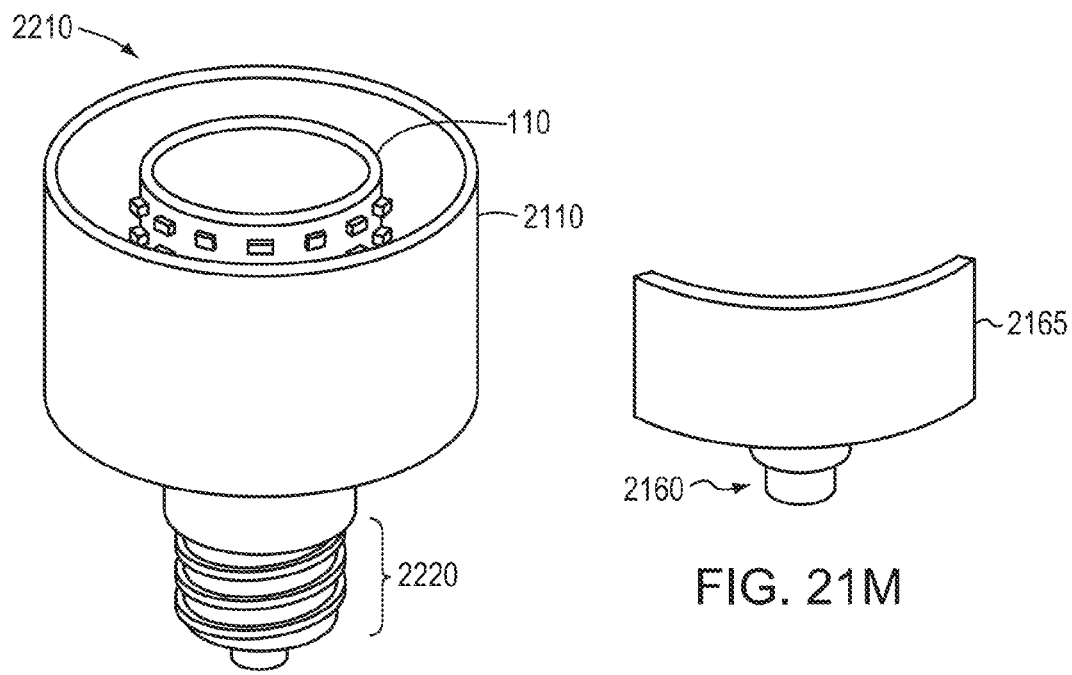
FIG. 21H
FIG. 21M
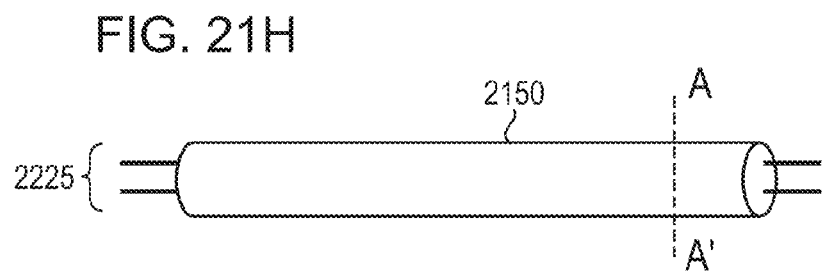
FIG. 21I
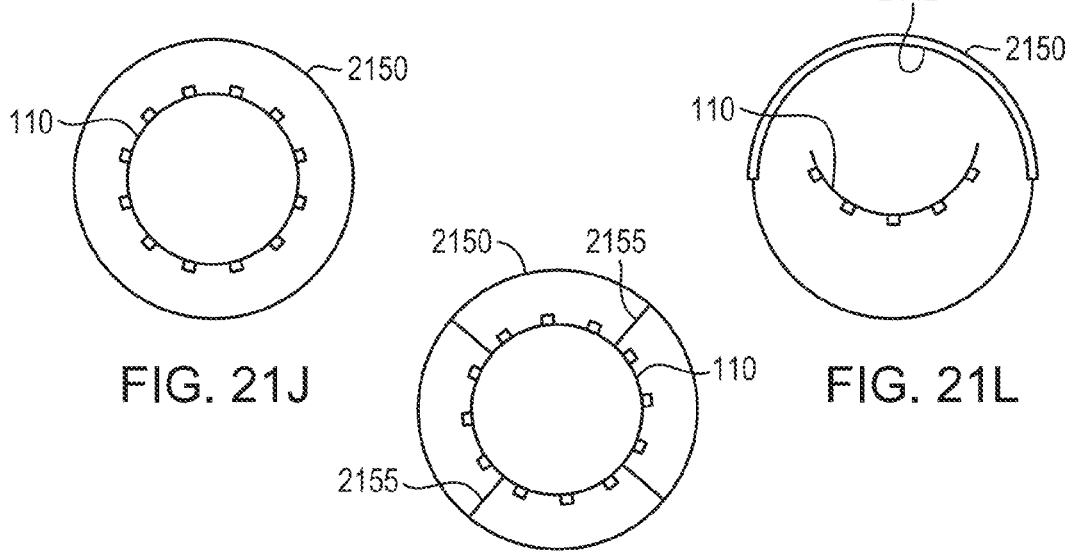
FIG. 21J
FIG. 21K
FIG. 21L

LIGHTING SYSTEMS INCORPORATING FLEXIBLE LIGHT SHEETS DEFORMABLE TO PRODUCE DESIRED LIGHT DISTRIBUTIONS

RELATED APPLICATION

This application claims the benefit of and priority to U.S. Provisional Patent Application No. 61/834,183, filed Jun. 12, 2013, the entire disclosure of which is hereby incorporated herein by reference.

FIELD OF THE INVENTION

In various embodiments, the present invention generally relates to electronic devices, and more specifically to array-based electronic devices.

BACKGROUND

Light sources such as light-emitting diodes (LEDs) are an attractive alternative to incandescent and fluorescent light bulbs for illumination devices due to their higher efficiency, smaller form factor, longer lifetime, and enhanced mechanical robustness. However, both packaged LEDs and bare-die LEDs generally exhibit Lambertian luminous intensity distributions, which may not be useful for lighting applications. Thus, LED-based lighting systems typically require one or more additional or external collimators, mixing chambers, and/or optical elements to produce a desired luminous intensity profile that is useful for lighting, such as a batwing, a narrow batwing, a spot or a flood distribution, or to be useful for applications such as cove lighting or wall washing. Higher light intensities and larger light sources typically require larger and/or more complex optical systems. For example, a lighting system having several high-power LEDs may require a relatively large mixing chamber as well as a relatively complicated optical system to reduce glare to acceptable levels and to achieve a specific light-distribution pattern.

In some cases it is desirable for a luminaire or lighting system to be able to produce different light-output patterns, for example, a bat-wing distribution with different beam widths, or a relatively collimated beam or a tilted or asymmetric beam. In conventional lighting systems, a new optical system is generally required for each different light-distribution pattern. This results in additional manufacturing cost as well as requiring the stocking of multiple different optical systems for each luminaire.

Conventional LED systems also typically require some form of heat-sinking or thermal management that is difficult to incorporate in relatively small and enclosed spaces. Additionally, such systems may require extra ventilation, for example, passive ventilation or active ventilation (e.g., fans), to prevent deleterious heat buildup. These constraints typically lead to undesirably large, thick, and potentially complicated and expensive lighting systems.

Furthermore, from a design perspective, it is often desirable to have an illumination source be able to conform to a curved surface, or to itself have one or more curves. It is also desirable for such structures to be relatively thin, so that they do not add bulk or detract from the surrounding architecture. In some applications, it is desirable for the lighting equipment to be relatively inconspicuous or to essentially disappear. While simple curved structures may be approximated by a large number of rigid circuit boards, this approach is very expensive, requiring a custom solution for each application and complicated and time-consuming installation. The large number of separate boards and interconnects between boards may also lead to reliability problems. As the shape to be covered or approximated becomes more complex, this approach also increases in cost and complexity. A further disadvantage of such an approach is that it may be difficult to make small-volume, inconspicuous, or relatively invisible lighting systems, because of the need for relatively large thermal-management systems.

In view of the foregoing, a need exists for systems and techniques enabling the low-cost design and manufacture of compact reliable lighting systems having low glare with the ability to produce different light-distribution patterns.

SUMMARY

In accordance with certain embodiments of the present invention, lighting systems incorporate flexible light sheets having an array of light-emitting elements ("LEEs," e.g., packaged light-emitting diodes or bare-die light-emitting diodes) thereon. The light sheets are advantageously curved and/or folded (e.g., along predefined creases) in order to produce an advantageous luminous intensity distribution different from that of the LEEs, without the use of additional or external optical elements. As utilized herein, "folding" of a light sheet includes cases in which the light sheet is only partially folded (i.e., such that opposed surfaces are not in contact or an edge of the light sheet does not come into contact with another edge of the light sheet) or completely folded (i.e., such that opposed surfaces of the light sheet do come into contact). In various embodiments, the light-emitting elements may each have a light distribution pattern, for example a substantially Lambertian luminous intensity distribution, and the light sheet may be curved and/or folded to produce a different light distribution pattern, for example a substantially non-Lambertian luminous intensity distribution. As utilized herein, a substantially Lambertian luminous intensity distribution is one in which the luminance (i.e., brightness) is substantially independent of angle from the light emitter; thus, the intensity as a function of angle from the light emitter decreases as the cosine of the angle, i.e., $I(\theta)=I_0 \cos(\theta)$, where $I(\theta)$ is the intensity at angle $\theta$ and $I_0$ is the intensity at normal incidence (where $\cos(\theta)=1$)). In this manner, lighting systems in accordance with embodiments of the invention may be fabricated and transported in flat, unfolded and/or uncurved (e.g., unrolled) configurations and then reconfigured (e.g., folded and/or curved (e.g., rolled)) to produce a desired light output during installation. In some embodiments, lighting systems may be fabricated and/or transported in a first folded and/or curved (e.g., rolled) configuration) and then reconfigured (e.g., unfolded, uncurved or further curved) to produce a desired light output during installation. In some embodiments, a configured lighting system may be reconfigured to have a different light output by folding and/or curving in a configuration different from the initial configuration.

As mentioned above, preferred embodiments of the present invention incorporate only light sheet folding and/or curving to produce the new and different luminous intensity distribution, and thus do not incorporate additional or external optical elements. Specifically, preferred embodiments of the invention do not incorporate optical elements, other than the light sheet itself (to the extent that the light sheet might be considered to be an optical element such as a waveguide), that non-diffusively transmit and/or reflect light from the light-emitting elements. Thus, as utilized herein, the light sheet is not an "optical element." Such optical elements may be characterized by (i) being separate or spaced apart from the light sheet, (ii) having a high transmittance or reflectance to light emitted by the light-emitting elements, and/or (iii) having a refractive index different than that of air, and that are used to focus, collimate or otherwise guide the light emitted by the light-emitting elements. For example, preferred embodiments of the invention do not utilize lenses or lens arrays, e.g., lenses fabricated from glass or plastic, that are disposed in front of the light-emitting elements and that receive and transmit light emitted therefrom. In this manner, the light distribution pattern resulting from the curving and/or folding of the light sheet is emitted by the lighting system into free space and is observable by an observer—no additional optical elements are disposed between the lighting system and the observer.

As will be described in more detail below, some embodiments of the invention do utilize diffusers in order to obscure visible pixelization of the substantially point-source light-emitting elements, but such diffusers are translucent rather than transparent, and they typically do not greatly distort the light distribution pattern resulting from the light sheet folding and/or curving. Thus, some embodiments of the present invention lack both external/additional optical elements and diffusers, while other embodiments of the invention incorporate diffusers but are otherwise free of external/additional optical elements between the light sheet and an observer.

In addition, while folding and/or curving the light sheet within lighting systems in accordance with embodiments of the invention advantageously results in a different light distribution pattern (different from that of the light-emitting elements on the light sheet) in a particular direction (e.g., a main direction of illumination), in some embodiments such lighting systems also exhibit a light distribution pattern similar, or even substantially identical, to that of the light-emitting elements on the light sheet in another direction. For example, a light sheet incorporating an array of light-emitting elements emitting light with a Lambertian distribution may be curved and/or folded and incorporated into a lighting system that exhibits a non-Lambertian distribution in a first direction and a substantially Lambertian distribution in a second direction (that is often but not necessarily opposite the first direction).

In an aspect, embodiments of the invention feature an illumination device that includes or consists essentially of a flexible light sheet and a power source. The light sheet is substantially planar (i.e., a substantially two-dimensional sheet having a small thickness) in an unfolded and uncurved configuration. The light sheet includes or consists essentially of (i) a flexible substrate having first and second opposed surfaces, (ii) a plurality of light-emitting elements disposed over at least one of the first or second surfaces of the substrate, and (iii) a plurality of conductive traces disposed on the substrate and electrically interconnecting the plurality of light-emitting elements. The power source supplies power to at least a portion of the light sheet and thereby illuminates the light-emitting elements of the at least a portion of the light sheet. The light-emitting elements each have a first luminous intensity distribution. At least a portion of the flexible substrate not covered by the light-emitting elements has a specular reflectance (e.g., a specular reflectance greater than 50%) for a wavelength of light emitted by the light-emitting elements. The light sheet is curved and/or folded to produce a second luminous intensity distribution emitted by the illumination device different from the first luminous intensity distribution. The illumination device is free of optical elements discrete and/or separate from the light-emitting elements and positioned to transmit light emitted by the light-emitting elements, whereby the second luminous intensity distribution is produced only by the curving and/or folding of the light sheet.

Embodiments of the invention may include one or more of the following in any of a variety of combinations. The first luminous intensity distribution may be a substantially Lambertian luminous intensity distribution, and/or the second luminous intensity distribution may be a substantially non-Lambertian luminous intensity distribution. The spectral reflectance of the at least a portion of the flexible substrate may be greater than 50%, greater than 75%, or even greater than 90%, for a wavelength of light emitted by the light-emitting elements. The second luminous intensity distribution may include or consist essentially of a batwing distribution extending from the illumination device in a first direction. In all embodiments including a second luminous intensity distribution extending from the illumination device in a first direction (e.g., downward and/or toward an observer positioned below the illumination device), the second luminous intensity distribution may also (but does not necessarily) include a component substantially the same as the first luminous intensity distribution (e.g., a Lambertian luminous intensity distribution) in a second direction different from (e.g., opposite to) the first direction. The second luminous intensity distribution may include or consist essentially of a collimated beam extending from the illumination device in a first direction (i.e., a collimated beam distribution). The collimated beam may have a half-power beam width less than 30°, less than 20°, or even less than 10°. The second luminous intensity distribution may include or consist essentially of, extending from the illumination device in a first direction, a two-lobed beam distribution including or consisting essentially of two lobes separated by an angle therebetween. The angle between the two lobes may be at least 10°, at least 20°, at least 30°, or at least 40°. The angle between the two lobes may be less than 180°, or even less than 90°. Each lobe may have a half-power beam width less than 40°, less than 30°, less than 20°, or even less than 10°. Each lobe may have a half-power beam width greater than 0°, greater than 2°, or greater than 5°. The second luminous intensity distribution may include or consist essentially of a substantially cardioid (i.e., heart-shaped) distribution.

The illumination device may be free of diffusers discrete and/or separate from the light sheet and positioned to diffuse light emitted by the light-emitting elements. The second luminous intensity distribution may include or consist essentially of a linear spot beam extending from the illumination device in a first direction. The linear spot beam may have a half-power beam width less than 30°, less than 20°, or even less than 10°. The linear spot beam may have a half-power beam width greater than 0°, greater than 2°, or greater than 5°. The second luminous intensity distribution may include or consist essentially of a four-lobed beam distribution (e.g., having a four-leaf-clover shape) extending from the illumination device in a first direction. The second luminous intensity distribution may include or consist essentially of a beam distribution that is asymmetric with respect to an axis normal to the illumination device (e.g., a vertical axis). The light-emitting elements may be disposed only on one side (e.g., the first surface) of the substrate, or some of the light-emitting elements may be disposed on at least a portion of the first surface of the substrate and some of the light-emitting elements may be disposed on at least a portion of the second surface of the substrate.

The light sheet may be curved into a conical shape (e.g., a cone, a portion of a cone, or a truncated cone), the first surface of the substrate may be an interior surface of the cone, and light-emitting elements may be disposed on at least a portion of the first surface of the substrate (i.e., the interior surface of the cone). The light sheet may be curved into a cylindrical shape (e.g., a circular cylinder such as a right circular cylinder, an elliptical cylinder, and/or an oblique cylinder), the first surface of the substrate may be an interior surface of the cylinder, and light-emitting elements may be disposed on at least a portion of the first surface of the substrate (i.e., the interior surface of the cylinder). The light sheet may be curved into a cylindrical shape (e.g., a circular cylinder such as a right circular cylinder, an elliptical cylinder, and/or an oblique cylinder), the first surface of the substrate may be an interior surface of the cylinder, and light-emitting elements may be disposed on at least a portion of the second surface of the substrate (i.e., the exterior surface of the cylinder). In these and other embodiments, both of the first and second surfaces of the substrate may include light-emitting elements thereon or thereover. The light sheet may be curved into a teardrop shape (e.g., in cross-section, which may be extended linearly to form a closed teardrop "cylinder" or rotated to form a three-dimensional teardrop), the first surface of the substrate may be an interior surface of the teardrop, and light-emitting elements may be disposed on at least a portion of the second surface of the substrate (i.e., the exterior surface of the teardrop). The light sheet may have a triangular cross-sectional shape (e.g., forming in three dimensions a triangular cylinder or a pyramid), an interior surface of the triangle may correspond to the first surface of the substrate, and light-emitting elements may be disposed on at least a portion of a second surface of the substrate (i.e., the exterior surface of the triangular shape).

The light sheet may define a plurality of undulations (i.e., have the form of an undulating sheet), and at least some light-emitting elements may be disposed on at least a portion of the first surface of the substrate. Some light-emitting elements may be disposed on at least a portion of the second surface of the substrate. The light sheet may have a V-shape in cross-section, and light-emitting elements may be disposed on at least a portion of the second surface of the substrate (i.e., the surface of the substrate defining the planes meeting to form the acute angle of the V-shape). Some light-emitting elements may be disposed on at least a portion of the first surface of the substrate. The light sheet may be curved into at least a portion of an oblate cylinder (i.e., a closed oblate cylinder or an open shape defining only a portion of an oblate cylinder), an interior surface of the at least a portion of the oblate cylinder may correspond to the first surface of the substrate, and light-emitting elements may be disposed on at least a portion of the first surface of the substrate (i.e., the interior surface). The light sheet may be curved into at least a portion of an oblate cylinder (i.e., a closed oblate cylinder or an open shape defining only a portion of an oblate cylinder), an interior surface of the at least a portion of the oblate cylinder may correspond to the first surface of the substrate, and light-emitting elements may be disposed on at least a portion of the second surface of the substrate (i.e., the exterior surface). In these and other embodiments, both of the first and second surfaces of the substrate may include light-emitting elements thereon or thereover.

The light sheet may include one or more creases along which the light sheet is folded. The light sheet may define one or more openings therethrough. A diffuser may be disposed around at least a portion of the light sheet. A second portion of the flexible substrate not covered by the light-emitting elements may have a transmittance greater than 70%, or even greater than 80%, for a wavelength of light emitted by the light-emitting elements. The illumination device may include a mounting device having a base and two sides (i) extending upward from the base and (ii) defining an open channel therebetween. The light sheet may have a width greater than a width of the open channel and may be curved to fit within the open channel. The illumination device may include one or more tabs each extending from an edge of the light sheet and one or more connectors disposed within the open channel. Each connector may define an opening complementary in shape to a shape of a tab. Each tab may be at least partially disposed within one of the connectors. One or more (even all) of the tabs may be substantially rigid. The power source may be disposed within the open channel. The power source may be electrically connected to at least one connector. At least one tab may include or consist essentially of an electrical conductor for supplying power from the power source, through the at least one connector into which the tab is at least partially disposed, and to the light sheet. The power source may be electrically connected to at least one connector by a wire. One or more of the connectors may be spring-loaded. The illumination device may have at least two tabs and at least two connectors, and the tabs and connectors may be configured to allow the tabs to be disposed within the connectors in only a single orientation.

The light sheet may include first and second spaced-apart power conductors disposed on the substrate. The plurality of light-emitting elements may be interconnected to form a plurality of light-emitting strings disposed over the substrate, each light-emitting string (i) including or consisting essentially of a plurality of interconnected light-emitting elements spaced along the light-emitting string, (ii) having a first end electrically coupled to the first power conductor, and (iii) having a second end electrically coupled to the second power conductor. The power conductors may supply power to each of the light-emitting strings. The illumination device may include a plurality of control elements each (i) electrically connected to at least one light-emitting string and (ii) configured to utilize power supplied from the power conductors to control the current to the at least one light-emitting string to which it is electrically connected. The illumination device may include a plurality of additional conductive traces disposed over the substrate and each (i) electrically interconnecting a light-emitting element and a control element, (ii) electrically connecting a control element to a power conductor, or (iii) electrically connecting a light-emitting element to a power conductor. The first and second power conductors may extend along opposing edges of the first surface of the substrate. The first and second power conductors may extend in a first direction, and at least a portion of each of the plurality of light-emitting strings may extend in a second direction not parallel to the first direction. The power source may be electrically connected to the first and second power conductors to supply power to the light-emitting elements. The power source may be configured to provide a substantially constant voltage to the power conductors. The light-emitting elements in each of the light-emitting strings may be separated by a substantially constant pitch.

The illumination device may include control circuitry configured to control at least one emission characteristic of the light-emitting elements, and/or communication circuitry configured to transmit information to or from the illumination device. The at least one emission characteristic may include or consist essentially of a correlated color temperature, a color rendering index, R9, a luminous flux, a light output power, a spectral power density, a radiant flux, a light-distribution pattern, and/or an angular color uniformity. The plurality of light-emitting elements may form a fixed pattern in the shape of one or more symbols and/or letters. The thickness of the light sheet may be less than 15 mm, less than 10 mm, less than 5 mm, or even less than 3 mm. At least one light-emitting element may emit substantially white light. A correlated color temperature of the substantially white light may be in the range of 2000 K to 10,000 K. At least one light-emitting element may include or consist essentially of a bare-die light-emitting diode or a packaged light-emitting diode. At least one light-emitting element may be coupled to one or more conductive traces via solder and/or an adhesive. At least one light-emitting element may be coupled to one or more conductive traces via an anisotropic conductive adhesive. The conductive traces may include or consist essentially of copper, brass, aluminum, silver, and/or gold. The thickness of the conductive traces may be less than 50 µm, and/or the substrate may include or consist essentially of polyethylene terephthalate. The substrate may include or consist essentially of polyester, acrylic, polystyrene, polyethylene, polyimide, polyethylene naphthalate, polyethylene terephthalate, polypropylene, polycarbonate, acrylonitrile butadiene styrene, polyurethane, silicone, and/or polydimethylsiloxane. The weight per area of the illumination device may be less than 2 kg/m$^2$, less than 1.0 kg/m$^2$, or even less than 0.5 kg/m$^2$.

The light sheet may be curved and/or folded to define a concave surface, and at least some of the light-emitting elements may be disposed on the concave surface. Some of the light-emitting elements may be disposed on the convex surface opposite the concave surface. The light sheet may have a gloss level of at least 10, as measured at a beam incidence angle of 20° in accordance with ASTM D523 or ASTM D2457. The light sheet may have a gloss level of at least 30, as measured at a beam incidence angle of 60° in accordance with ASTM D523 or ASTM D2457. The light sheet may be configurable to produce a third luminous intensity distribution emitted by the illumination device, different from the first and second luminous intensity distributions. The light sheet may be manually configurable, and/or the illumination device may include circuitry for receiving a signal, from a remote source not disposed on the illumination device, for configuring the light sheet to produce a specific luminous intensity distribution. The plurality of light-emitting elements may include or consist essentially of two individually energizable groups, each group including or consisting essentially of a plurality of light-emitting elements. Energizing the first group and de-energizing the second group may produce a third luminous intensity distribution emitted by the illumination device, different from the first and second luminous intensity distributions. The plurality of light-emitting elements may include or consist essentially of one or more additional individually energizable groups, and energization and de-energization of different groups may produce a plurality of different luminous intensity distributions emitted by the illumination device.

In another aspect, embodiments of the invention feature a method of producing a desired luminous intensity distribution. A flexible light sheet that is substantially planar in an unfolded and uncurved configuration is provided. The light sheet includes or consists essentially of (i) a flexible substrate having first and second opposed surfaces, (ii) a plurality of light-emitting elements disposed over at least one of the first or second surfaces of the substrate, and (iii) a plurality of conductive traces disposed on the substrate and electrically interconnecting the plurality of light-emitting elements. The light-emitting elements each have a first luminous intensity distribution, and at least a portion of the flexible substrate not covered by the light-emitting elements has a specular reflectance (e.g., greater than 50%, greater than 75%, or even greater than 85%) for a wavelength of light emitted by the light-emitting elements. The light sheet is curved and/or folded to produce a second luminous intensity distribution emitted by the illumination device, different from the first luminous intensity distribution, the second luminous intensity distribution being produced only by the curving and/or folding of the light sheet, and, optionally, selection of the specular reflectance of the at least a portion of the flexible substrate not covered by the light-emitting elements (rather than in whole or in part by, e.g., use of optical elements positioned to transmit light emitted by the light-emitting elements). The light sheet may be curved and/or folded in any of a plurality of different configurations, each resulting in a different luminous intensity distribution emitted by the illumination device. The light-emitting elements may be configured as a plurality of different, independently energizable groups, and energization and de-energization of different groups of light-emitting elements may produce different luminous intensity distributions, in addition to or instead of mere curving and/or folding of the light sheet. The second luminous intensity distribution may be produced in part by selection of the specular reflectance of the at least a portion of the flexible substrate not covered by the light-emitting elements. The spectral reflectance of the at least said portion of the flexible substrate may be greater than 50% for a wavelength of light emitted by the light-emitting elements.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "about," "approximately," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

Herein, two components such as light-emitting elements and/or optical elements being "aligned" or "associated" with each other may refer to such components being mechanically and/or optically aligned. By "mechanically aligned" is meant coaxial or situated along a parallel axis. By "optically aligned" is meant that at least some light (or other electromagnetic signal) emitted by or passing through one component passes through and/or is emitted by the other.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 21H and 21I are isometric views of lighting devices in accordance with various embodiments of the invention;

FIGS. 21J-21L are schematic cross-sections of lighting devices in accordance with various embodiments of the invention;

FIG. 21M is an isometric view of a lighting device in accordance with various embodiments of the invention;

DETAILED DESCRIPTION

A key aspect of various embodiments of the present invention is a flexible light sheet incorporating an array of light-emitting elements, for example LEDs, and that may be curved or folded to achieve one or more specific advantageous characteristics or attributes, in particular to achieve a specific advantageous light intensity distribution patterns different from that of the light-emitting elements, without the use of additional or external optical elements. In various embodiments, portions of the flexible light sheet may even have different optical characteristics, for example light intensity, correlated color temperature (CCT), color rendering index (CRI), reflectance (e.g., specular and/or diffuse reflectance) or the like, and shaping the light sheet may permit achievement of different illumination characteristics for light emitted in different directions from the light sheet.

FIGS. 1A-1M depict exemplary lighting devices in accordance with embodiments of the present invention, although alternative devices or systems with similar functionality are also within the scope of the invention. As depicted, the lighting devices include or consist essentially of one or more flexible light sheets 110, which include a flexible substrate 165 on which is formed an array of light-emitting elements (LEEs) 140. The relatively flexible nature of the light sheet 110 permits single or multiple curves, including concave and/or convex curvatures, as well as folding and creasing to provide a shaped light sheet. In contrast to the use of multiple conventional rigid printed circuit boards (PCBs), the structures shown in FIGS. 1A-1M and related structures may be manufactured from a single light sheet, greatly simplifying construction and resulting in a relatively significant reduction in cost and improved reliability.

Figure 1A:
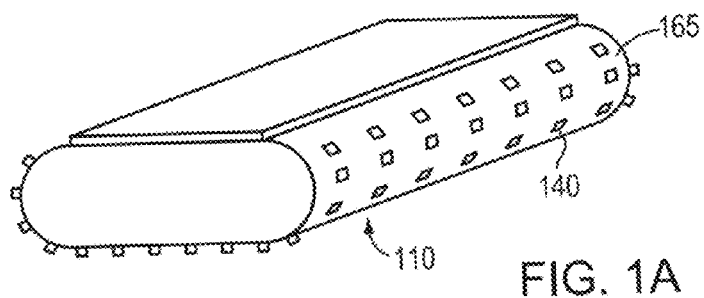
FIG. 1A is an isometric view of a lighting device in accordance with various embodiments of the invention.
Figure 1B:
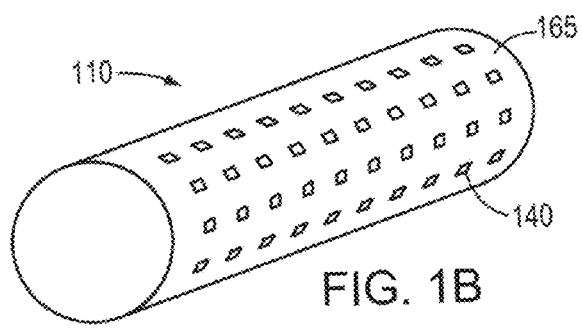
FIG. 1B is an isometric view of a lighting device in accordance with various embodiments of the invention.
Figure 1C:
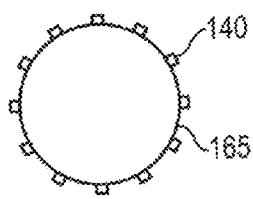
FIG. 1C is a cross-sectional view of the lighting device of FIG. 1B.
Figure 1D:
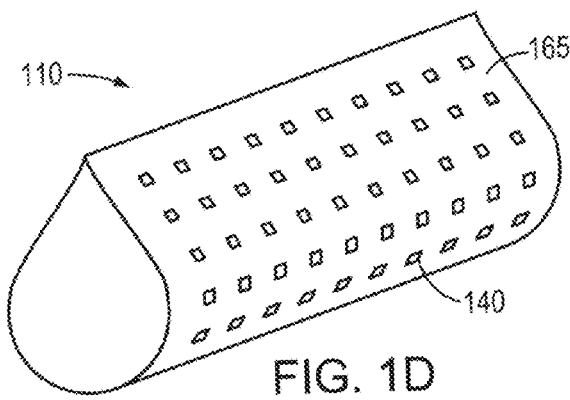
FIG. 1D is an isometric view of a lighting device in accordance with various embodiments of the invention.
Figure 1E:
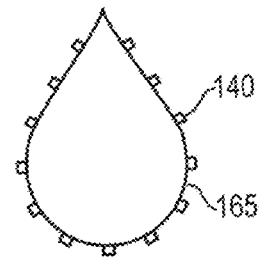
FIG. 1E is a cross-sectional view of the lighting device of FIG. 1D.
Figure 1F:
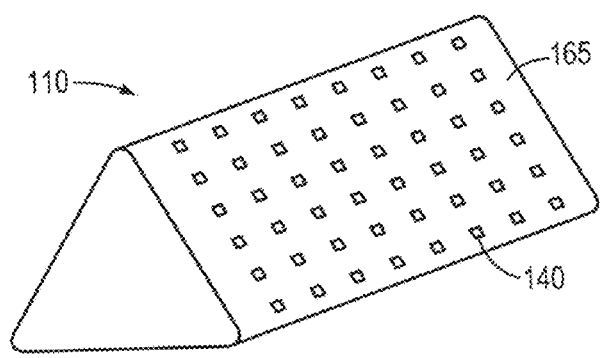
FIG. 1F is an isometric view of a lighting device in accordance with various embodiments of the invention.
Figure 1G:
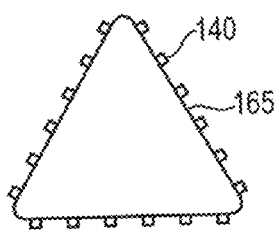
FIG. 1G is a cross-sectional view of the lighting device of FIG. 1F.
Figures 1H, 1I:
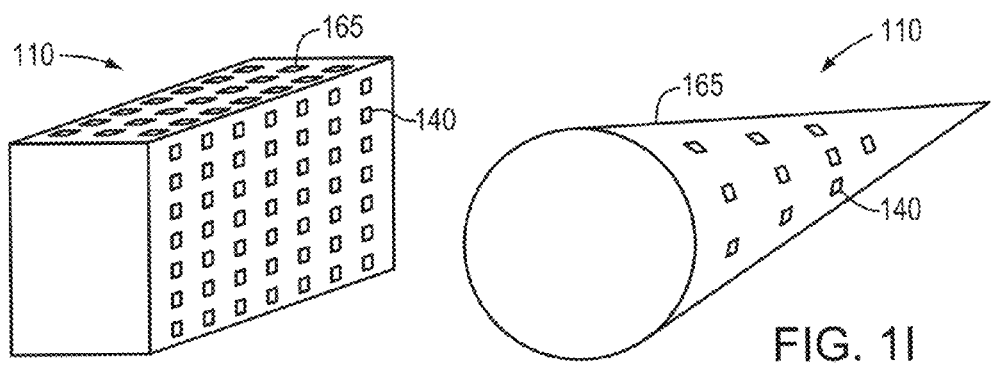
FIGS. 1H-1M are isometric views of lighting devices in accordance with various embodiments of the invention.
Figures 1J, 1K:
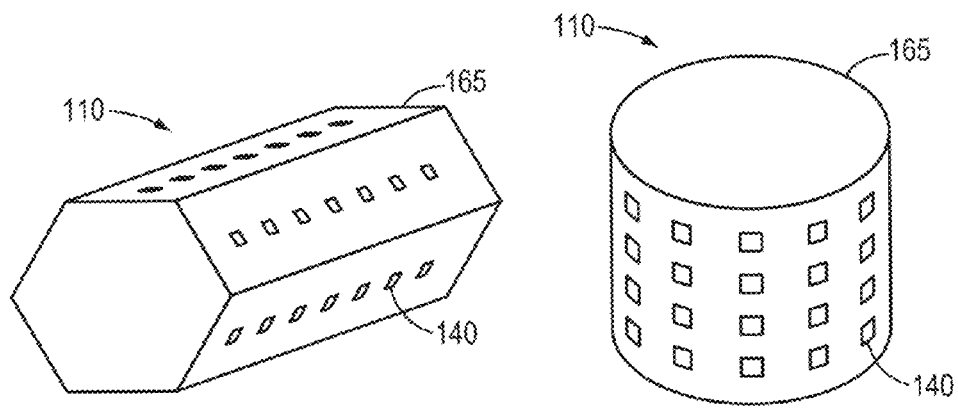
Figures 1L, 1M:
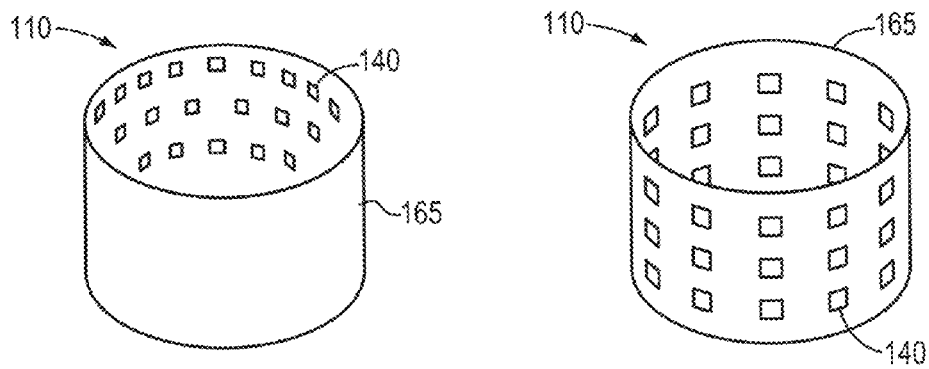

FIG. 1A shows a lighting device that includes a light sheet 110 and has rounded sides and a flat bottom. FIGS. 1B and 1C show isometric and cross-sectional views, respectively, of a lighting device having a substantially tubular shape. FIGS. 1D and 1E show isometric and cross-sectional views, respectively, of a lighting device having a substantially teardrop shape. FIGS. 1F and 1G show isometric and cross-sectional views, respectively, of a lighting device having a substantially triangular shape. FIG. 1H shows a lighting device having a substantially rectangular cross-section. FIG. 1I shows a lighting device having a substantially conical shape. FIG. 1J shows a lighting device having a substantially hexagonal cross-section. FIGS. 1K and 1L show a lighting device having a substantially tubular shape, similar to but oriented differently than the lighting device of FIG. 1B. In the lighting device of FIG. 1K, LEEs 140 are formed on the outside of substrate 165 or light sheet 110, while in FIG. 1L, LEEs 140 are formed on the inside of substrate 165 or light sheet 110. In FIG. 1M, LEE 140s are formed on both the inside and outside of substrate 165 or light sheet 110. FIGS. 1A-1M show examples of embodiments of the present invention, and other embodiments may have different configurations, as discussed herein. For example, the lighting devices shown in FIGS. 1A-1K show lighting devices having LEEs 140 on the outside of substrate 165 or light sheet 110; however, this is not a limitation of the present invention, and in other embodiments lighting devices may have LEEs 140 formed on the inside of substrate 165 or light sheet 110, as shown in FIG. 1L, or formed on both the inside and outside of substrate 165 or light sheet 110, as shown in FIG. 1M. The orientations of the lighting devices shown in FIGS. 1A-1M are exemplary and are not limitations of the present invention. For example, the lighting device shown in FIG. 1B may have the axis parallel to the tube oriented vertically, horizontally, or at any other orientation.

The lighting devices in FIGS. 1A-1M show exemplary structures in which the light sheet 110 is closed or substantially closed on itself, i.e., at least portions of the ends of the light sheet meet or join together. However, this is not a limitation of the invention, and in other embodiments lighting devices may incorporate one or more light sheets that are partially closed or open.

Figure 2A:
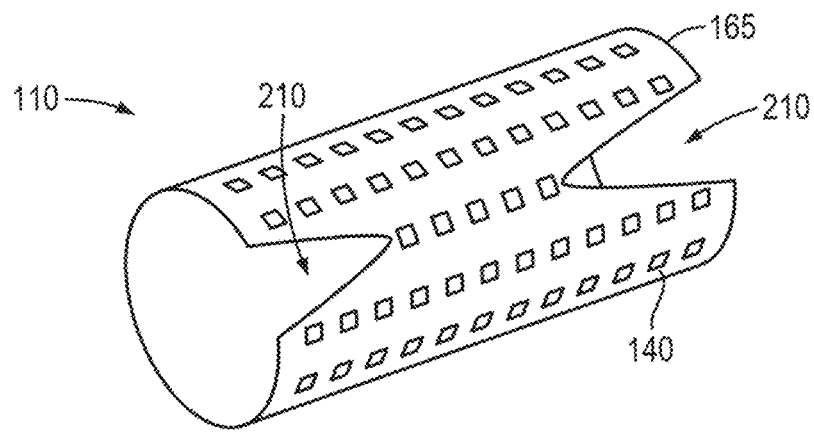
FIGS. 2A-2C are isometric views of lighting devices in accordance with various embodiments of the invention.
Figure 2B:
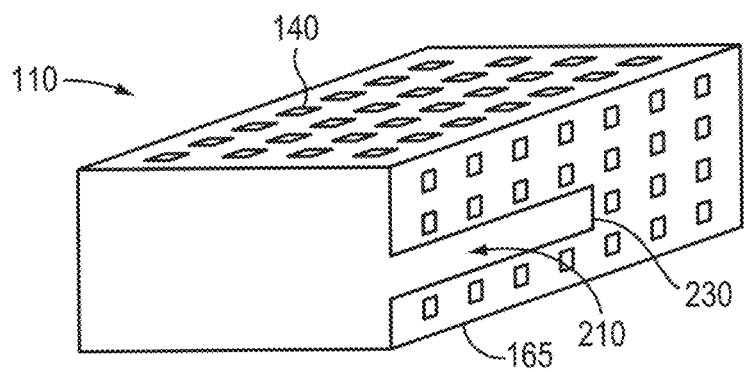
Figure 2C:
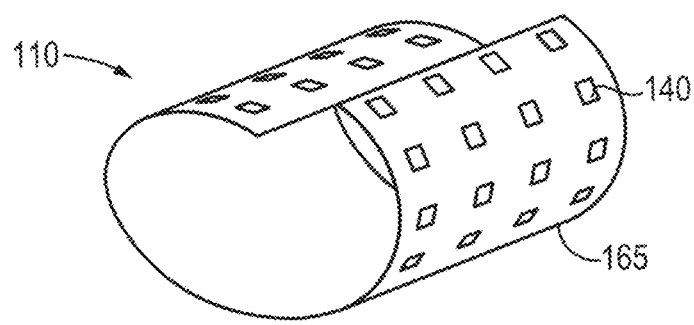

FIGS. 2A-2C show exemplary lighting devices incorporating partially closed light sheets. FIGS. 2A and 2B show examples of lighting devices having cutouts or portions 210 removed from each end. In some embodiments, a cutout 210 may be formed as part of a seam, such as seam 230, where portions of light sheet 210 are joined, or a cutout 210 may be formed in part of light sheet 110 spaced apart from the seam. FIG. 2C shows an example of a lighting device in which the joined edges of light sheet 110 are shifted relative to each other, for example shifted in a direction substantially parallel to the joining edges.

Figure 3A:
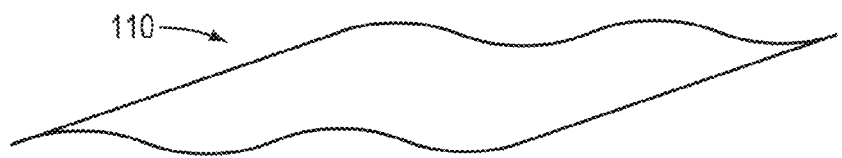
FIG. 3A is an isometric view of a lighting device in accordance with various embodiments of the invention.
Figure 3B:
FIGS. 3B-3D are cross-sectional views of lighting devices in accordance with various embodiments of the invention.
Figure 3C:
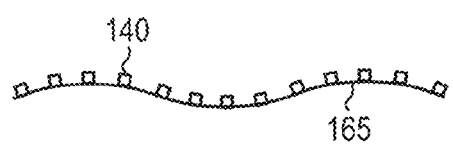
Figure 3D:
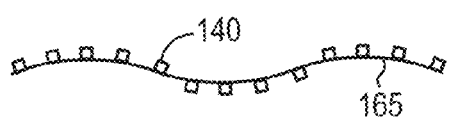
Figure 3E:
FIGS. 3E-3M depict lighting devices in accordance with various embodiments of the invention.
Figure 3F:
Figure 3G:
Figure 3H:
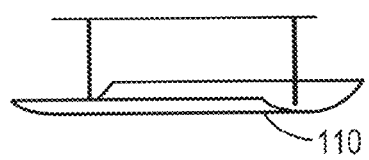
Figure 3I:
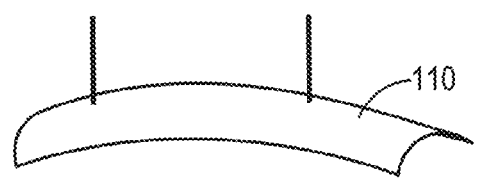
Figure 3J:
Figure 3K:
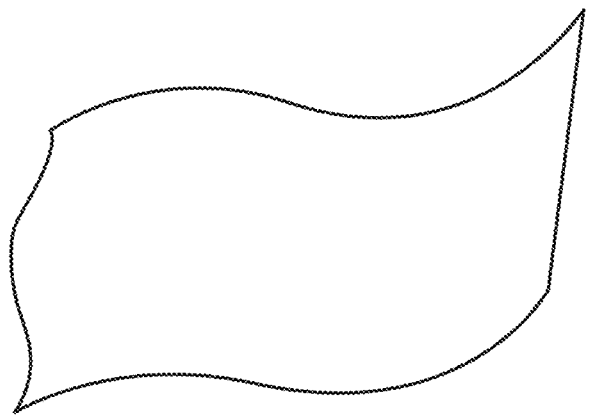
Figure 3L:
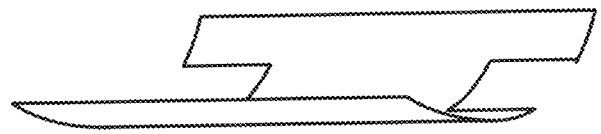
Figure 3M:
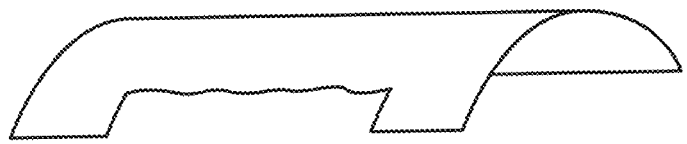

FIGS. 3A-3M show exemplary lighting devices incorporating open light sheets 110. In some of these examples, LEE 140s are not shown for clarity. An open light sheet system incorporates one or more light sheets in which the edges are not joined together. In these examples, the light sheet is shaped to have, for example, one or more concave or convex curves. FIG. 3A shows an exemplary lighting system having multiple concave and convex curves (LEEs 140 are not shown for clarity in FIG. 3A). FIGS. 3B-3D show examples in which LEEs 140 are on the bottom side of substrate 165 (FIG. 3B), on the top side of substrate 165 (FIG. 3C), and on both sides of substrate 165 (FIG. 3D). FIGS. 3E and 3F show examples in which light sheet 110 is attached to an optional housing 310. As used herein, the term "housing" broadly connotes any containment structure or medium to which a light sheet may be mounted and/or for fully or partially overlying a top or bottom surface of the light sheet. A housing may be rigid or flexible, polymeric or other material (e.g., glass), and may interconnect with or be bondable to the light sheet or to another housing over the opposite surface of the light sheet to form a seal, e.g., a water-tight or water-resistant seal, around at least a portion of the light sheet. It should be noted that the presence or absence of one or more housings is not a limitation of the present invention, and in other embodiments lighting systems in accordance with the present invention may include one or more housings or may consist essentially of one or more light sheets alone. In some embodiments, a housing may incorporate a power supply or drive system for driving the LEEs 140 on the light sheet. In some embodiments, a power supply or drive system may be mounted remotely from the light-sheet-based lighting device. FIGS. 3G-3J show examples of lighting devices having curved light sheets. In some embodiments the curve may be in one direction, for example along the length of the light sheet as shown in FIG. 3G, or in an orthogonal direction, for example along the width as shown in FIG. 3H. In some embodiments, curves may be formed in multiple directions, as shown in FIGS. 3I and 3J. FIGS. 3K-3M show additional examples featuring more free-form shapes (FIGS. 3K and 3M) and cut-outs (FIGS. 3L and 3M).

Figure 4A:
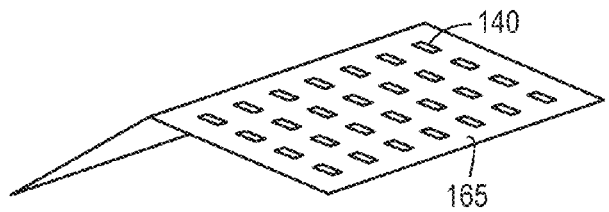
FIG. 4A is an isometric view of a lighting device in accordance with various embodiments of the invention.
Figure 4B:
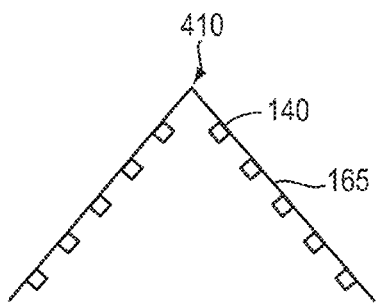
FIGS. 4B-4D are cross-sectional views of lighting devices in accordance with various embodiments of the invention.
Figure 4C:
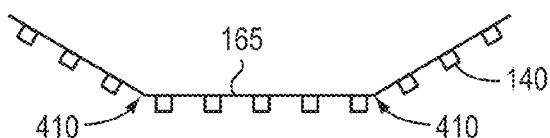
Figure 4D:
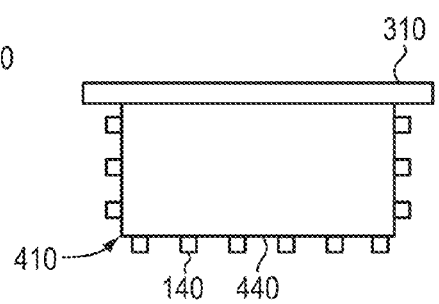
Figure 4E:
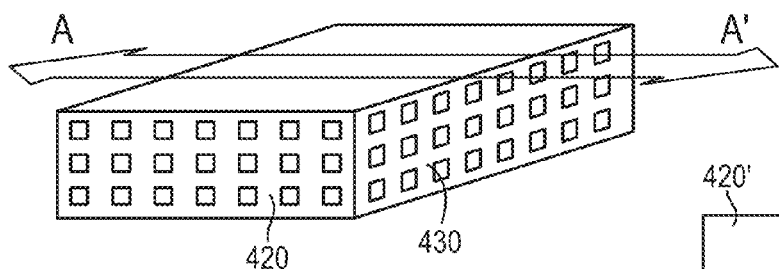
FIG. 4E is an isometric view of a lighting device in accordance with various embodiments of the invention.
Figure 4F:
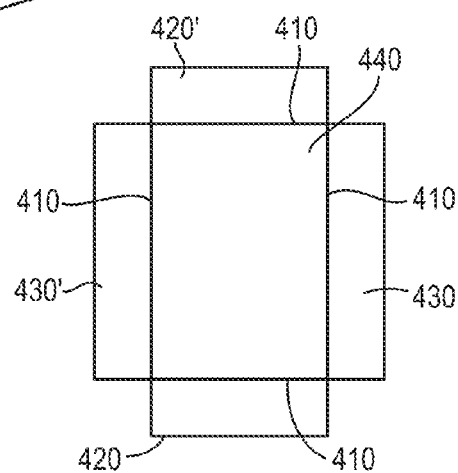
FIG. 4F is a plan view of an unfolded lighting device in accordance with various embodiments of the invention.

Many of the depicted examples show lighting devices having curved light sheets. In other embodiments of the present invention, the light sheet may be folded and/or creased, as shown in FIGS. 4A-4F. FIG. 4A shows an exemplary lighting device having a triangular or tent shape with LEEs 140 on the outside of the fold. In other embodiments, LEEs 140 may be on the inside of the fold, as shown in FIG. 4B, or on both sides of the fold. FIG. 4B shows a crease or fold 410, which is made in a flat light sheet to produce the structure shown in FIG. 4B. FIG. 4C shows a structure having two folds or creases 410, while FIGS. 4D-4F show an example of a lighting device having multiple sides with light sheets on different sides of the device. FIG. 4D shows a cross section of the structure shown in FIG. 4E through cut lines A-A', while FIG. 4F shows the light sheet in its flat form, before folding. As shown in FIG. 4F, the flat light sheet has multiple sections 420, 420', 430, 430', and 440. The sheet is folded along creases 410 to form the structure shown in FIG. 4E. While not shown in FIGS. 4A-4F, light sheets featuring folds or creases may also have more free-form shapes as well as cut-outs.

Figure 5A:
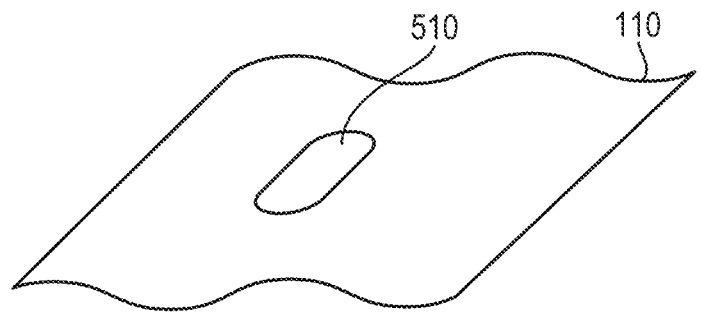
FIGS. 5A and 5B are isometric views of lighting devices with openings therethrough in accordance with various embodiments of the invention.
Figure 5B:
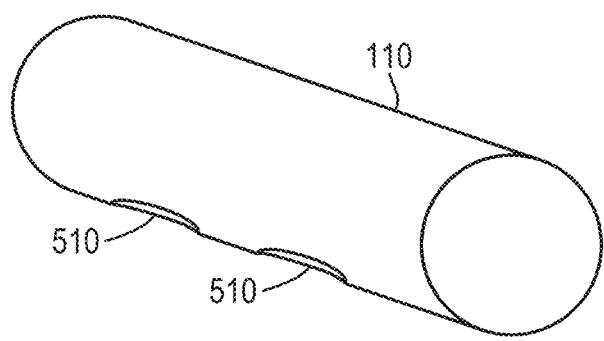

In some embodiments, substrate 165 may define one or more holes, as shown in FIGS. 5A and 5B. In these examples, LEEs 140 are not shown for clarity. FIG. 5A shows an example of a lighting device having one hole 510 in an open-type light sheet. FIG. 5B shows an example of a lighting device having two holes 510 in a closed-sheet light sheet.

Figure 6A:
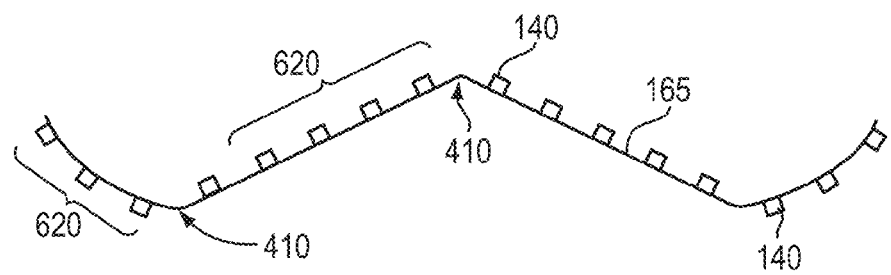
FIGS. 6A, 6B, 7A, and 7B are cross-sectional views of lighting devices in accordance with various embodiments of the invention.
Figure 6B:
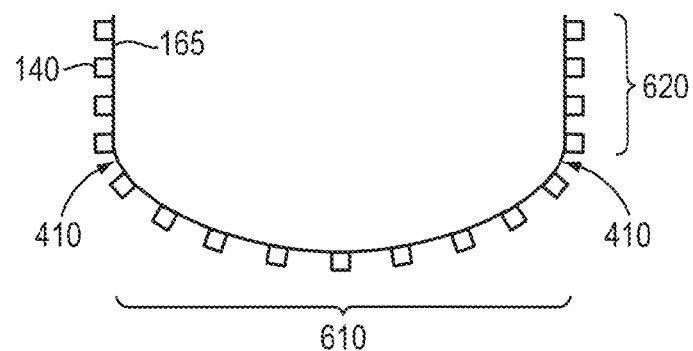

Various embodiments of the present invention combine features of the illustrated exemplary embodiments. For example, FIG. 6A shows an example of a lighting device combining curved shapes and creases. It includes a curved portion 610 and a flat portion 620 separated by a crease 410. FIG. 6B shows another embodiment that features two flat portions 620 and one curved portion 610 separated by creases 410. Note that "creases," as utilized herein, do not connote a particular defined angle between portions of a light sheet on either side of the crease; rather, a crease is typically a sharp corner (rather than a merely curved portion of the light sheet) that separates non-parallel segments of a light sheet from each other.

The spacing between LEEs 140 shown in many of the illustrated embodiments is constant or substantially constant; however, this is not a limitation of the present invention, and in other embodiments the spacing between LEEs 140 may vary. In some embodiments, the light sheet may include two or more regions, each having the same or substantially the same spacing between LEEs 140, but with different spacing in different regions. In other embodiments, the spacing between each pair or group of LEEs 140 may be different.

Figure 7A:

In the examples shown in FIGS. 1A-4F, substrate 165 is substantially covered with an array of LEEs 140; however, in some embodiments one or more portions of substrate 165 may not be populated with LEEs 140. For example, FIG. 7A shows an embodiment of the present invention incorporating both curved and flat surfaces, in which LEEs 140 are formed only on a portion of the curved surface of substrate 165.

Figure 7B:
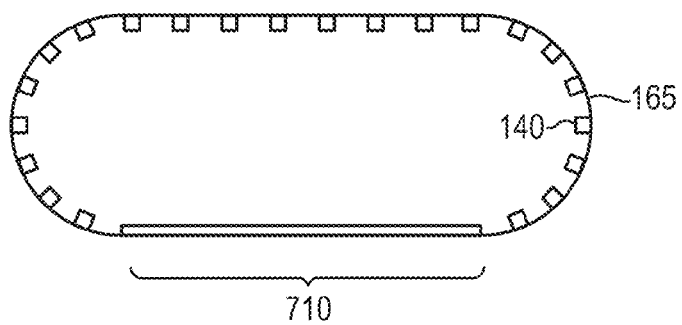

In some embodiments, the optical properties of substrate 165 or a coating material on substrate 165 (e.g., reflectance, transmittance and absorption), may be utilized to further control the optical characteristics of the lighting system. In some embodiments, substrate 165 or a coating on substrate 165 may be a diffuse reflector, while in other embodiments it may be a specular reflector, and in yet other embodiments it may be designed to have a relatively high absorbance for light emitted by LEEs 140. In some embodiments of the present invention, substrate 165 may have a reflectance of at least 50% or at least 75% or at least 85% or at least 95% to a wavelength of light emitted by LEEs 140. In some embodiments of the present invention, substrate 165 may be transparent or substantially transparent to a wavelength of light emitted by LEEs 140, for example having a transmittance of at least 80% or at least 90% or at least 95% to a wavelength of light emitted by LEEs 140. In some embodiments of the present invention, substrate 165 may be absorbing or substantially absorbing to a wavelength of light emitted by LEEs 140, for example having an absorbance of at least 60% or at least 70% or at least 80% to a wavelength of light emitted by LEEs 140. In some embodiments, substrate 165 or portions of substrate 165 may be configured to diffuse a wavelength of light emitted by LEEs 140. In some embodiments, substrate 165 may have two or more regions, where different regions have different optical characteristics. FIG. 7B shows an example of the present invention in which substrate 165 has two different optical properties. In this example substrate 165 acts as a diffuser in region 710, that is it has a diffuse transmittance, or is translucent, to a wavelength of light emitted by LEEs 140. In some embodiments the transmittance of a diffuse region is at least 50%, or at least 70% or at least 80%, or at least 90% to a wavelength of light emitted by LEE 140. The remaining portion of substrate 165 in this embodiment has a reflecting surface that is reflective to a wavelength of light emitted by LEEs 140.

In some embodiments, all LEEs 140 in the lighting system may be driven at the same or substantially the same current; however, this is not a limitation of the present invention, and in other embodiments different LEEs 140 or different groups of LEEs 140 may be driven at different currents.

In some embodiments, all LEEs 140 in the lighting system may have the same optical characteristics, for example luminous or radiant flux, CCT, CRI, R9, spectral power distribution, light-distribution pattern, angular color uniformity or the like; however, this is not a limitation of the present invention, and in other embodiments different LEEs 140 or different groups of LEEs 140 may have different optical characteristics.

The following examples exemplify various aspects of embodiments of the present invention, providing the ability to engineer specific advantageous light intensity distributions from an array of light emitters that individually have a different, relatively less advantageous light intensity distribution (which is typically but not necessarily approximately the same for each light emitter) by (i) modifying the shape of the flexible light sheet and (ii) modifying the spectral properties of the light sheet or substrate material, for example reflectance, without the use of additional or external optical elements. In a specific example, advantageous non-Lambertian luminous intensity distributions may be created utilizing light sheets incorporating arrays of substantially Lambertian emitters, As described herein, in various embodiments, lighting structures having light-emitting elements on a concave surface result in relatively more significant changes in luminous intensity distribution than for structures having light-emitting elements on a convex surface, and light sheet or substrate surfaces having a specular reflectance result in relatively more significant changes in luminous intensity distribution than for structures having a diffuse reflectance.

As utilized herein, and as understood by those of skill in the art, specular reflectance refers to directional reflectance, in which an incident beam is preferentially reflected from a surface at a defined angle (typically the complementary angle to the angle of incidence). This differs from diffuse reflectance, which is omnidirectional, i.e., similar or identical to Lambertian "emission" of a reflected beam by a surface, as described above. Thus, a specular reflectance of a value less than 100% typically refers to the amount of an incident beam that is preferentially reflected at the defined angle, rather than scattered in other directions.

In some embodiments, specular reflectance may be quantified by measuring the intensity of light reflected from a test sample relative to that reflected from a reference sample (for example, a surface having substantially 100% specular reflectance). In this measurement configuration, the probe light source is a relatively collimated beam incident upon the test sample at a specific angle, and the detector is a relatively narrow aperture detector positioned at the complementary angle (i.e., the same angle as the probe beam but azimuthally rotated by about 180°). For example, if the intensity measured for a test sample is about one-half of that for the reference sample, the specular reflectance is then about 50%, compared to the reference sample. In some embodiments, the aperture may be about 1°, or about 5°, or about 10°, and the measurement angle may be between about 20° and about 60°. ANSI/IESNA RP-16-05 "Nomenclature and Definitions for Illuminating Engineering," the entire disclosure of which is incorporated by reference herein, provides a detailed definition of reflectance in Section 7.3.3.

In some embodiments, specular reflectance may be quantified using a gloss measurement. In some embodiments, the gloss measurement may utilize a configuration similar to that for specular reflectance measurements described above. One method of measuring gloss level is to determine the intensity of a probe beam reflected off the test sample relative to the intensity reflected off of a reference sample at a specific angle of incidence for the probe beam and a relatively narrow aperture detector. A number of different standards for measuring gloss level have been developed for different types of materials and gloss levels. In general, lower angles of incidence are used for higher gloss levels. Examples of gloss measurement standards include ASTM D523, ASTM D2457, and DIN 67530 for relatively high gloss levels, the entire disclosure of each of which is incorporated by reference herein. Typical incidence angles for relatively high gloss samples are 20°, 40°, and 60°. Gloss levels range from 0 to 100, with 0 representing a very low level of gloss (i.e., a diffuse surface), while 100 represents a very high gloss level (i.e., a highly specular reflecting surface). In some embodiments of the present invention, the light sheet has a gloss level of at least 10, or at least 20, for a 20° measurement, for example using the procedure in ASTM D523 or ASTM D2457. In some embodiments of the present invention, the light sheet has a gloss level of at least 30, or at least 50, for a 60° measurement, for example using the procedure in ASTM D523 or ASTM D2457.

Example 1

Figure 8A:
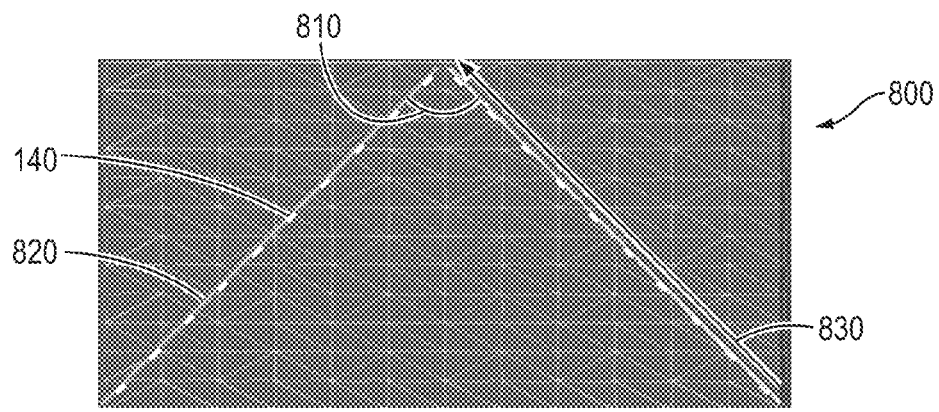
FIG. 8A is a cross-sectional schematic of a lighting device in accordance with various embodiments of the invention.
Figure 8B:
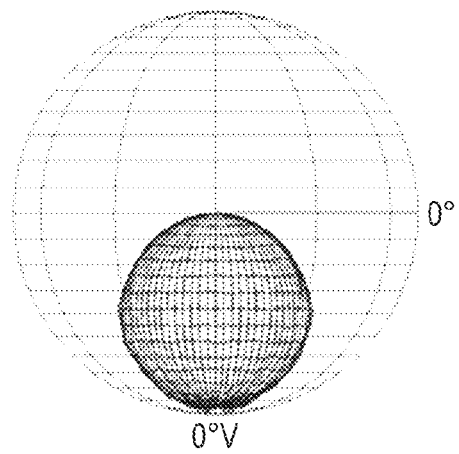
FIGS. 8B and 8C are graphs of luminous intensity distribution of light emitted from lighting devices in accordance with FIG. 8A.

FIG. 8A shows a cross-sectional view of a lighting device 800, in accordance with embodiments of the invention, that includes LEEs 140 formed on the inside (valley) of a creased, V-shaped lighting device. In this example, each side of the V shape has a length 830 of about 120 mm. In this example, each LEE 140 has a substantially Lambertian luminous-distribution pattern, as shown in FIG. 8B. In FIG. 8B, the center of the plot represents the position of LEE 140 that is facing downwards, and the graph represents the luminous flux as a function of angle about LEEs 140. In this example, LEEs 140 have a pitch of about 12 mm, but this is not a limitation of the present invention, and in other embodiments the pitch between LEEs 140 may be different. In this example, the angle 810 between the sheets forming the V is about 90°; however, this is not a limitation of the present invention, and in other embodiments angle 810 may be different.

Figure 8C:
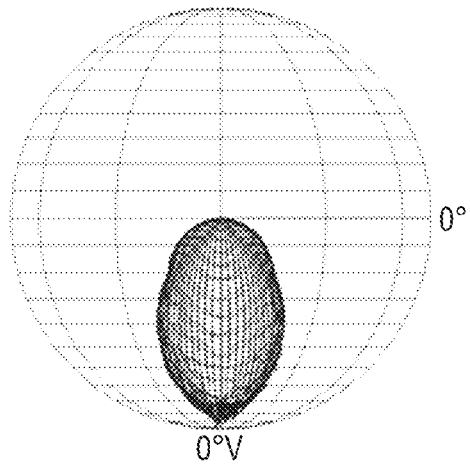
Figure 8D:
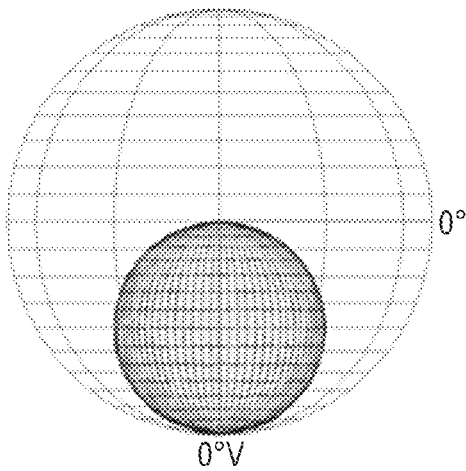
FIG. 8D is a graph of luminous intensity distribution from a Lambertian light emitter in accordance with various embodiments of the invention.
Figure 8E:
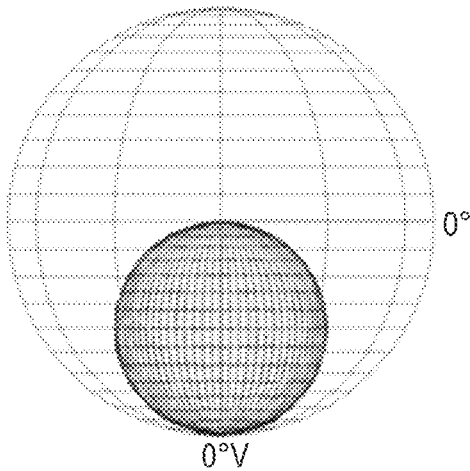
FIG. 8E is a graph of luminous intensity distribution from a flat array of Lambertian light emitters in accordance with various embodiments of the invention.

FIG. 8B shows the luminous intensity distribution for lighting device 800 in which a surface 820 adjacent to LEEs 140 is a diffuse reflector having a reflectance of about 94% and an absorbance of about 4%, while FIG. 8C shows the luminous intensity distribution for the same structure except that surface 820 is a specular reflector having a reflectance of about 94% and an absorbance of about 4%. The luminous intensity distribution of the device in which surface 820 has a diffuse reflectance (FIG. 8B) is quite similar to that of an individual LEE 140 (FIG. 8D), i.e., a Lambertian distribution. The distribution is also similar to that of a flat array of Lambertian LEEs 140, as shown in FIG. 8E. However, the luminous intensity distribution of the device in which surface 820 has a specular reflectance (FIG. 8C) is significantly modified, and in this example the luminous intensity distribution is relatively narrower and similar to, e.g., a spot light having a half power beam width of about 45°. This exemplifies one aspect of embodiments of the present invention—engineering specific non-Lambertian luminous intensity distributions from an array of substantially Lambertian emitters by shaping the substrate and/or controlling the spectral properties of the sheet (e.g., reflectance).

Figure 8F:
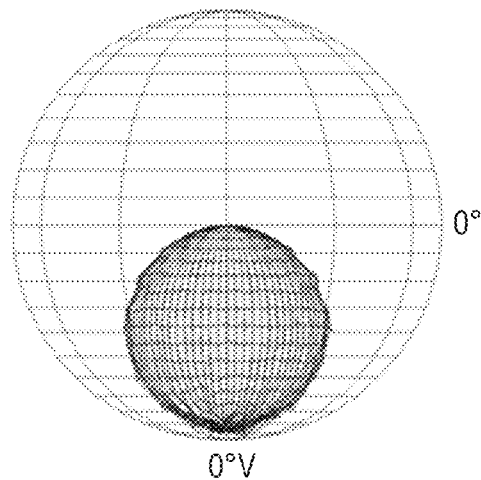
FIGS. 8F-8I are graphs of luminous intensity distribution of light emitted from lighting devices in accordance with FIG. 8A.
Figure 8G:
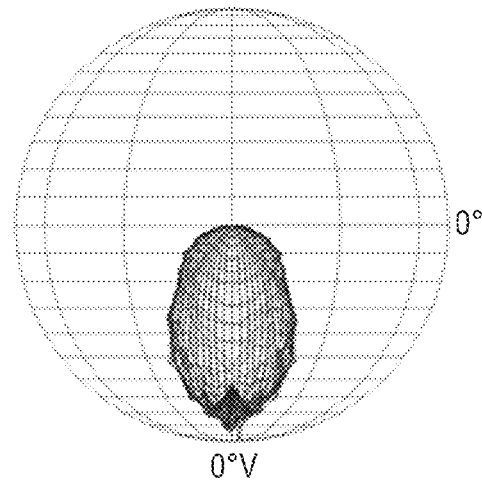

FIGS. 8F and 8G show the luminous intensity distribution of a lighting device having diffuse and specular reflectance surfaces 820 similar to that shown in and discussed in reference to FIG. 8A, with the same 12 mm LEE pitch, but with length 830 of about 60 mm, which is about half that of length 830 for the device of FIG. 8A. Comparisons of FIGS. 8B and 8C to FIGS. 8F and 8G, respectively, demonstrate that the luminous intensity distributions of the smaller lighting device (luminous intensity distribution shown in FIGS. 8F and 8G) having about half as many LEEs 140 is substantially the same as that for the larger lighting devices (luminous intensity distributions shown in FIGS. 8B and 8C). In one embodiment of the present invention, shaped light sheets may be used to create families of different sized lighting devices, all having substantially the same luminous intensity distribution, without the need to significantly engineer or modify the light sheet for different size lighting devices.

Figure 8H:
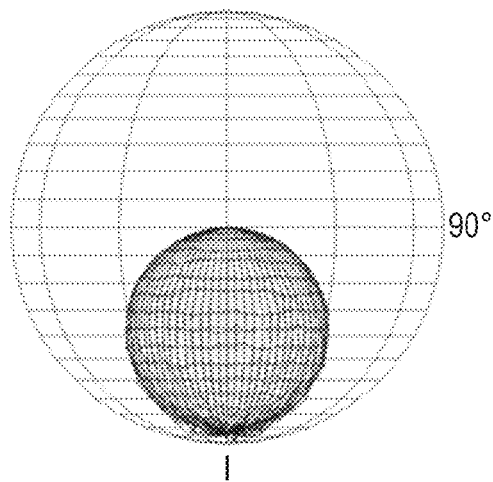
Figure 8I:
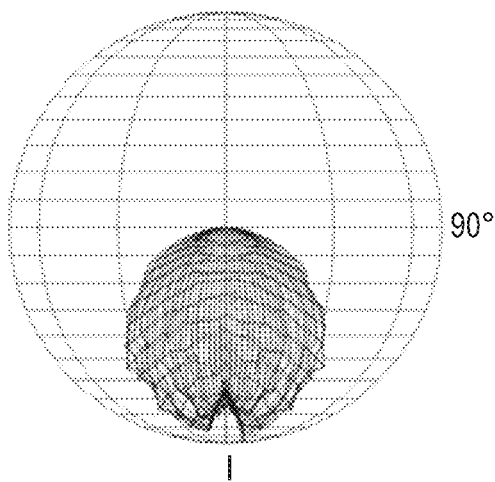

The luminous intensity distributions shown in FIGS. 8B-8G are from the perspective of looking into the structure of FIG. 8A, i.e., perpendicular to the plane of the figure. FIGS. 8H and 8I show a side view of the luminous intensity distribution; that is looking at the lighting device in a direction parallel to the plane of the figure. FIG. 8H is a side view of the luminous intensity distribution of FIG. 8F, while FIG. 8I is a side view of the luminous intensity distribution of FIG. 8G. FIGS. 8H and 8I show that the luminous intensity distribution is relatively Lambertian in the orthogonal direction to that of FIGS. 8F and 8G.

In this example, the lighting device of FIG. 8A exhibits a collimated beam in one dimension, and thus is a linear spot source, without the use of any external optics, for example a refractive optic, a reflective optic, a Fresnel optic, a total internal reflection (TIR) optic or the like. In some embodiments of the present invention, such linear spot sources may have a half-power beam width (in the narrow beam direction) of less than about 40° or less than about 30° or less than about 20° or less than about 10°.

Figure 8J:
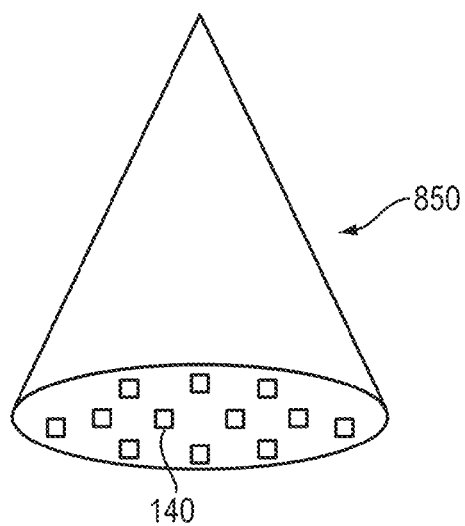
FIG. 8J is a schematic of a conical lighting device in accordance with various embodiments of the invention.

In some embodiments of the present invention, a rotationally symmetric luminous intensity distribution may be engineered by using a rotationally symmetric lighting device, for example as shown in FIG. 8J, which shows a conical lighting device 850 including LEEs 140 on its interior surface. In this embodiment, the luminous distribution is rotationally symmetric with a pattern like that of FIG. 8C or 8G. In some embodiments of the present invention, a relatively narrow collimated beam, or a spotlight pattern, may be engineered using this approach. In some embodiments of the present invention, a collimated beam may have a half-power beam width of less than about 40° or less than about 30° or less than about 20° or less than about 10°. In this example, the lighting device of FIG. 8J exhibits a collimated beam in two dimensions, and thus is a spot source, without the use of any external optics, for example a refractive optic, a reflective optic, a Fresnel optic, a TIR optic or the like.

Figure 8K:
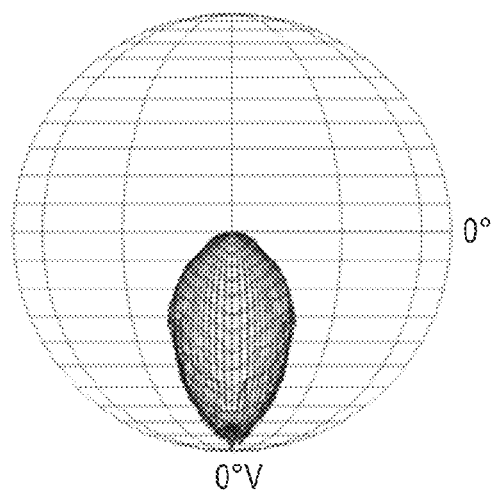
FIGS. 8K and 8L are graphs of luminous intensity distribution of light emitted from lighting devices in accordance with FIG. 8A.
Figure 8L:
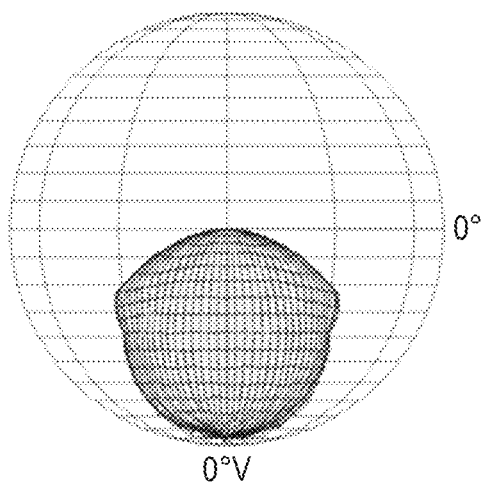

As discussed herein, changing the value of angle 810 permits engineering of the luminous intensity distribution. FIG. 8K shows the luminous intensity distribution of a lighting device similar to that of FIG. 8A in which surface 820 has a specular reflectance to a wavelength of light emitted by LEEs 140, but having a value of angle 810 of about 60°. FIG. 8L shows the luminous intensity distribution of a lighting device similar to that of FIG. 8A in which surface 820 has a specular reflectance to a wavelength of light emitted by LEEs 140, but having a value of angle 810 of about 150°.

In the examples shown in FIGS. 8A-8L, all LEEs 140 are substantially the same; however, this is not a limitation of the present invention, and in other embodiments the lighting device may include more than one region, where each region has a different type of LEEs 140. For example, differences in LEEs 140 may include one or more of the following: CCT, CRI, luminous intensity distribution, spectral power density, overall intensity, or the like.

Example 2

Figure 9A:
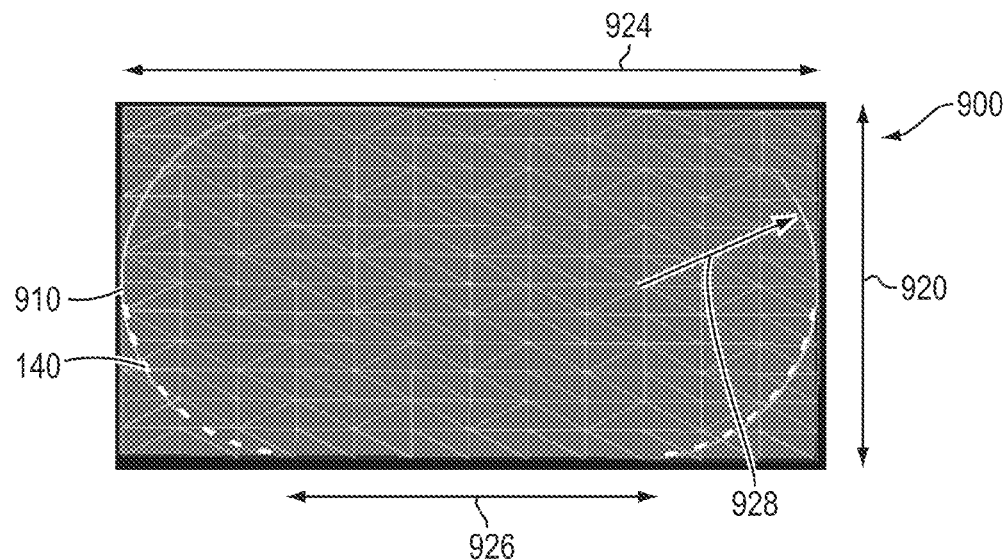
FIG. 9A is a cross-sectional schematic of a lighting device in accordance with various embodiments of the invention.

FIG. 9A shows a cross-sectional view of one embodiment of a lighting device 900 that features LEEs 140 formed on only a portion of an inside surface 910. In this example, the height 920 of the structure is about 80 mm, the length 924 is about 160 mm, the opening length 926 is about 80 mm, and the radius 928 of the end portions is about 40 mm; however, these are not limitations of the present invention, and in other embodiments surface 910 may have a different dimensions or a different shape. In some embodiments of the present invention the shape of lighting device 900 is an oblate cylinder. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different. In this example, LEEs 140 are formed on the inner side of the lower half portion of the half-circular ends of lighting device 900; however, this is not a limitation of the present invention, and in other embodiments LEEs 140 may be formed on different portions of surface 910. In the examples, all LEEs 140 are substantially the same; however, this is not a limitation of the present invention, and in other embodiments the lighting device may include more than one region, where each region has a different type of LEEs 140. For example, differences in LEEs 140 may include one or more of the following: CCT, CRI, luminous intensity distribution, spectral power density, overall intensity or the like.

Figure 9B:
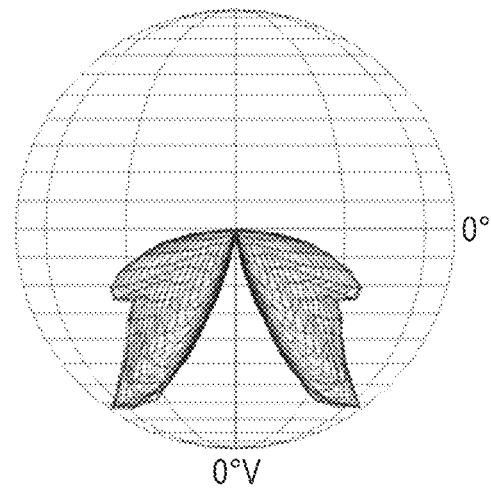
FIGS. 9B-9F are graphs of luminous intensity distribution of light emitted from lighting devices in accordance with FIG. 9A.
Figure 9C:
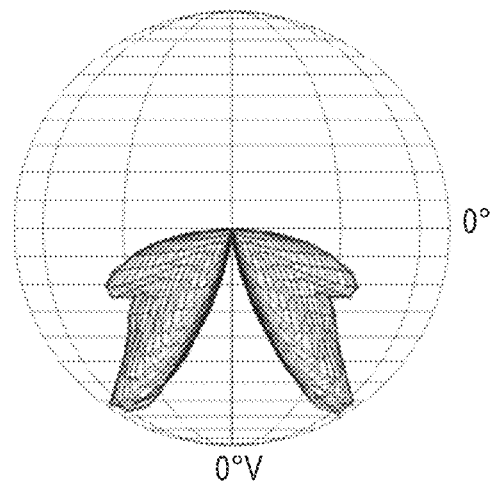
Figure 9D:
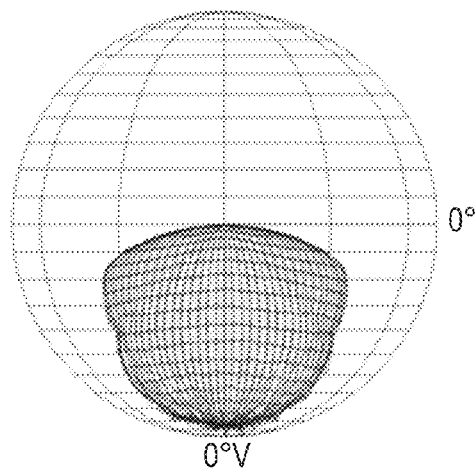

FIG. 9B shows the luminous intensity distribution for lighting device 900 in which the surface 910 adjacent to LEEs 140 is a specular reflector having a reflectance of about 100%, while FIG. 9C shows the luminous intensity distribution for the same structure except that surface 910 is a specular reflector having a reflectance of about 90%. These two figures show that there is not a great deal of sensitivity of the luminous intensity distribution for relatively small changes in reflectance in this structure. FIG. 9D shows the luminous intensity distribution for lighting device 900 in which the surface 910 adjacent to LEEs 140 is a diffuse reflector having a reflectance of about 96% and an absorbance of about 4%. A comparison of FIGS. 9B and 9C with FIG. 9D demonstrates that the luminous intensity distribution for the lighting device of FIG. 9A is significantly different from that of a Lambertian emitter, for both specular and diffuse surfaces, and furthermore, the luminous intensity distribution may be significantly modified by changing from a diffuse to specular reflector. With a specular reflector, the luminous intensity distribution exhibits two high intensity lobes of light at about a 25-45° angle off of normal, two lower intensity lobes at about a 60-80° angle off of normal, and very little luminous flux directly underneath the lighting device (at normal incidence). In contrast, the same structure, but with a diffuse reflector, exhibits a high luminous flux on axis (normal incidence) and decreasing luminous flux levels with increasing off-axis angle and a very strong reduction in luminous flux at high off-axis angles, for example greater than about 75-80°.

Figure 9E:
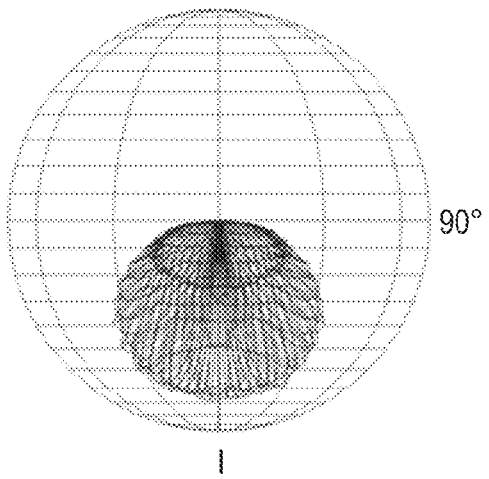
Figure 9F:
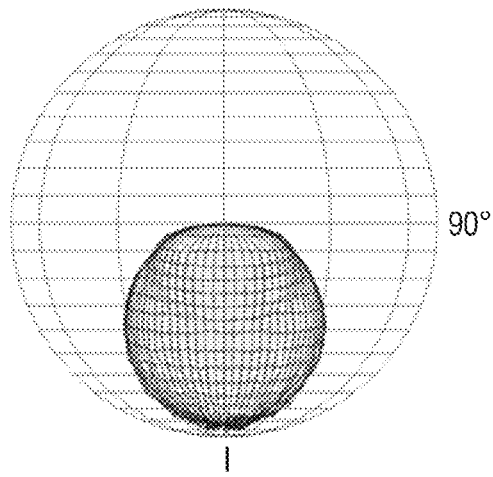

The luminous intensity distributions shown in FIGS. 9B-9D are from the perspective of looking into the structure of FIG. 9A, i.e., perpendicular to the plane of the figure. FIGS. 9E and 9F show side views of the luminous intensity distribution; that is looking at the lighting device in directions parallel to the plane of the figure. FIG. 9E is a side view of the luminous intensity distribution of FIG. 9C, while FIG. 9F is a side view of the luminous intensity distribution of FIG. 9D. FIGS. 9E and 9F show that the luminous intensity distribution is relatively Lambertian in the orthogonal direction to that of FIGS. 8F and 8G.

In this example, the lighting device of FIG. 9A exhibits a split-beam distribution or a split-spot beam distribution, without the use of any external optics such as a refractive optic, a reflective optic, a Fresnel optic, a TIR optic or the like. This is similar to the linear spot source described in Example 1; however, in this example, the lighting device of FIG. 9A produces two linear spots separated in space, for example separated by an angle in the range of about 10° to about 40°. In some embodiments of the present invention, each lobe may have a half-power beam width (in the narrow beam direction) of less than about 40° or less than about 30° or less than about 20° or less than about 10°.

In some embodiments of the present invention, lighting devices in accordance with this example may be used to illuminate a hallway, for example where each lobe of the distribution is aimed at opposite walls of the hallway to create a wall-wash luminaire capable of illuminating two walls simultaneously. In another embodiment of the present invention, the lighting device of FIG. 9A may be used to illuminate pairs of substantially parallel display cases or shelves in a store.

In some embodiments of the present invention, the lighting device of FIG. 9A may have a linear configuration and generate the luminous intensity distributions shown in FIGS. 9B and 9E for front and side views respectively. In some embodiments of the present invention, a similar lighting device may be configured to be rotationally symmetric, that is having the shape of FIG. 9A in cross-section, but a circular shape from the top or bottom, resulting in a beam distribution pattern forming substantially an annulus of light on a work plane below the lighting device, as may be envisioned by rotating the beam distribution pattern of FIG. 9B about the vertical axis.

Example 3

Figure 10A:
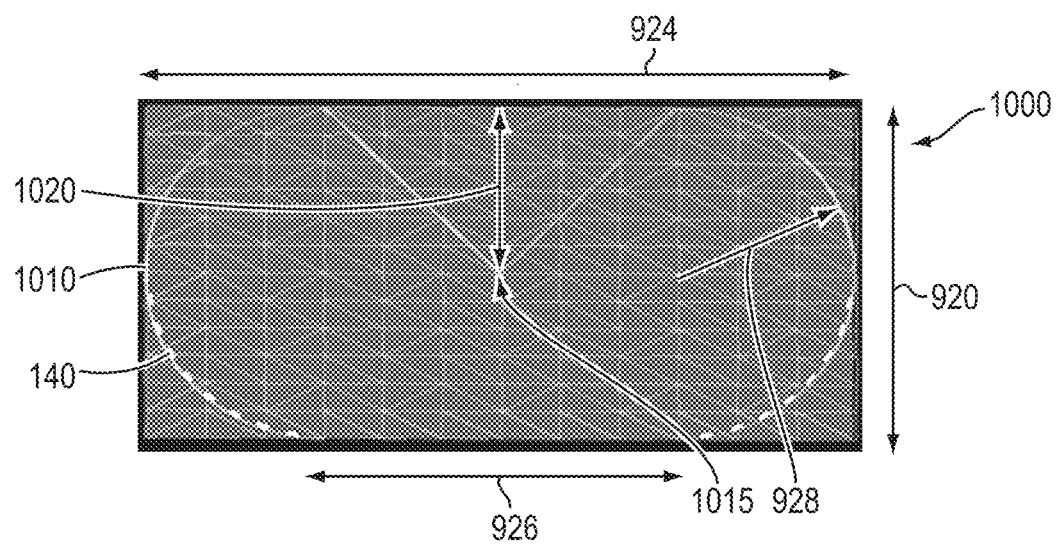
FIG. 10A is a cross-sectional schematic of a lighting device in accordance with various embodiments of the invention.

FIG. 10A shows a cross-sectional view of one embodiment of a lighting device 1000 that features LEEs 140 formed on a portion of the inside of a surface 1010. This example is similar to that described in Example 2; however, instead of a flat top surface, the structure of FIG. 10A has a V-shape with the point 1015 of the V about halfway between the top and bottom surfaces. In other words, a distance 1020 is about 40 mm. In this example, the height 920 of the structure is about 80 mm, the length 924 is about 160 mm, the opening length 926 is about 80 mm, and the radius 928 of the end portions is about 40 mm. These dimensions are not a limitation of the present invention, and in other embodiments surface 1010 may have a different dimensions or a different shape. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different. In this example, LEEs 140 are formed on the lower half portion of the half-circular ends of lighting device 1000; however, this is not a limitation of the present invention, and in other embodiments LEEs 140 may be formed on different portions of surface 1010.

Figure 10B:
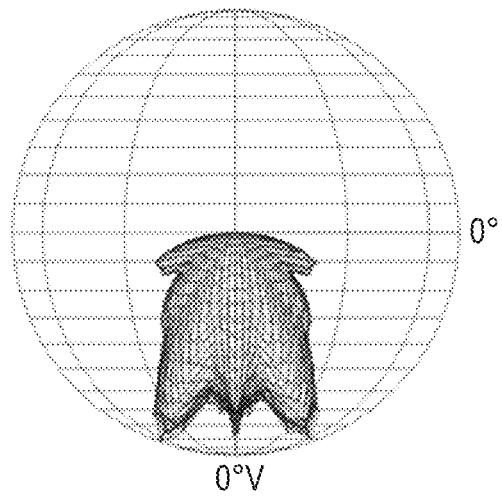
FIGS. 10B and 10C are graphs of luminous intensity distribution of light emitted from lighting devices in accordance with FIG. 10A.
Figure 10C:
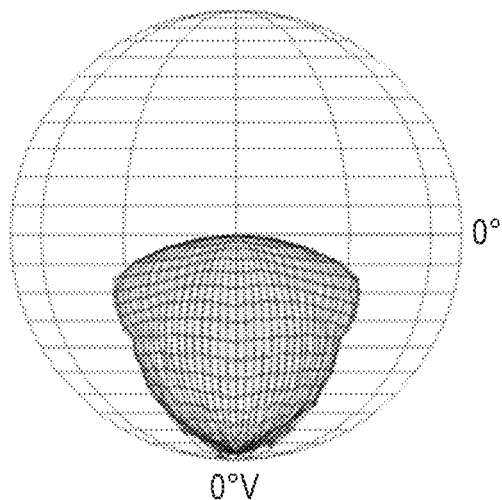

FIG. 10B shows the luminous intensity distribution for lighting device 1000 in which the surface 1010 adjacent to LEEs 140 is a specular reflector having a reflectance of about 100%, while FIG. 10C shows the luminous intensity distribution for lighting device 1000 in which the surface 1010 adjacent to LEEs 140 is a diffuse reflector having a reflectance of about 96% and an absorbance of about 4%. A comparison of FIG. 9B with FIG. 10B demonstrates a large difference in luminous intensity distribution caused by only a shape change. Introduction of the V-shape for a specular reflector causes a significant portion of the light generated within lighting device 1000 to be directed substantially downward. For the diffuse reflectance surface, introduction of the V-shape results in a similar, but relatively less significant modification of the luminous intensity distribution, producing a relatively narrower distribution with less luminous flux at higher off-axis angles, as demonstrated by comparing FIG. 9D and FIG. 10C. The luminous intensity distribution shown in FIG. 10B is similar to that of a narrow batwing distribution, which produces relatively uniform illuminance on a relatively small work plane area under the light, but relatively reduced light intensity at higher angles for reduced glare, again produced without any external optics.

In some embodiments of the present invention, the lighting device of FIG. 10A may have a linear configuration and generate the luminous intensity distributions shown in FIG. 10B. In some embodiments of the present invention, a similar lighting device may be configured to be rotationally symmetric, that is having the shape of FIG. 10A in cross-section, but a circular shape from the top or bottom, resulting in a beam distribution pattern forming substantially a circle of light on a work plane below the lighting device, as may be envisioned by rotating the beam distribution pattern of FIG. 10B about the vertical axis.

Example 4

Figure 11A:
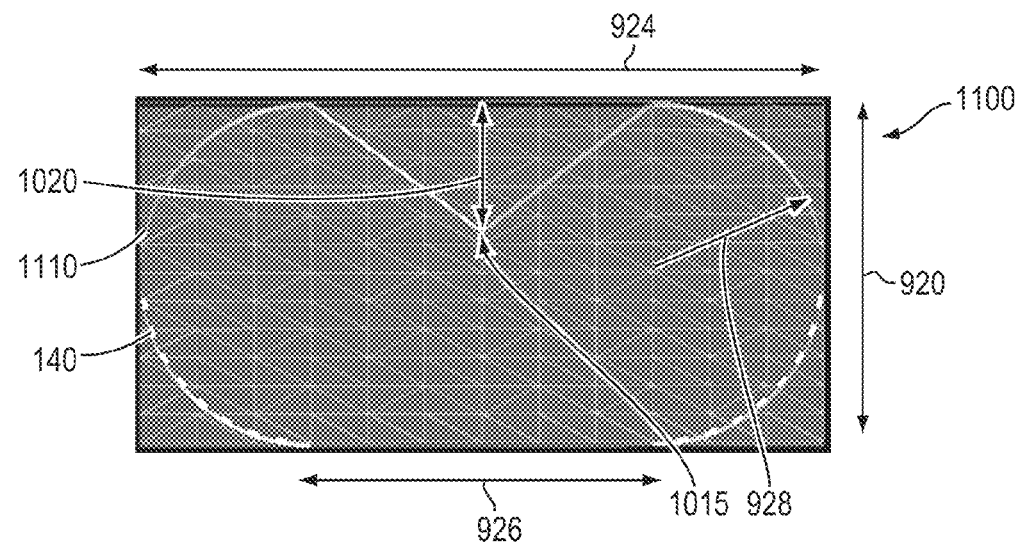
FIG. 11A is a cross-sectional schematic of a lighting device in accordance with various embodiments of the invention.

FIG. 11A shows a cross-sectional view of one embodiment of a lighting device 1100 that includes LEEs 140 formed on a portion of the inside of a surface 1110. This example is similar to that described in Example 3; however, in this example the V-shape is relatively more shallow, as distance 1020 is about 30 mm. In this example, the height 920 of the structure is about 80 mm, the length 924 is about 160 mm, the opening length 926 is about 80 mm, and the radius 928 of the end portions is about 40 mm. These dimensions are not a limitation of the present invention, and in other embodiments surface 1110 may have a different dimensions or a different shape. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different. In this example, LEEs 140 are formed on the lower half portion of the half-circular ends of lighting device 1100; however, this is not a limitation of the present invention, and in other embodiments LEEs 140 may be formed on different portions of surface 1110.

Figure 11B:
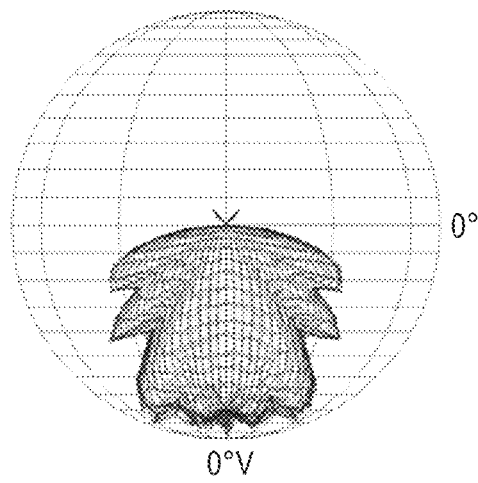
FIGS. 11B and 11C are graphs of luminous intensity distribution of light emitted from lighting devices in accordance with FIG. 11A.
Figure 11C:
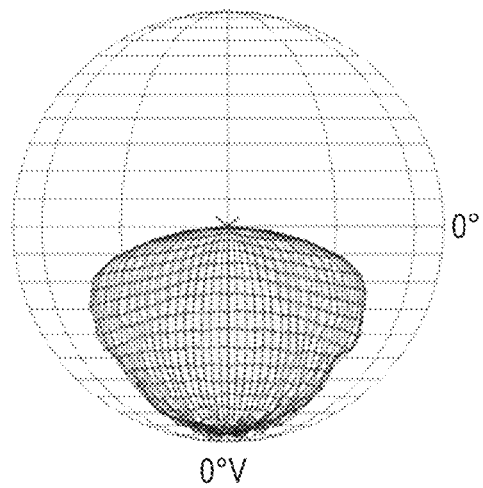

FIG. 11B shows the luminous intensity distribution for lighting device 1100 in which a surface 1110 adjacent to LEEs 140 is a specular reflector having a reflectance of about 100%, while FIG. 11C shows the luminous intensity distribution for lighting device 1100 in which the surface 1110 adjacent to LEEs 140 is a diffuse reflector having a reflectance of about 96% and an absorbance of about 4%. A comparison of FIG. 9B with FIG. 10B and FIG. 11B again demonstrates a large difference in luminous intensity distribution caused by only a shape change. A reduction in the depth of the V-shape for a specular reflector causes a spreading of the light, resulting in a luminous intensity distribution between that of FIGS. 9B and 10B. For the diffuse reflectance surface, a reduction in the depth of the V-shape results in a similar, but relatively less significant spreading of the luminous flux, as demonstrated by comparing FIG. 11C with FIG. 9D and FIG. 10C.

Example 5

Figure 12A:
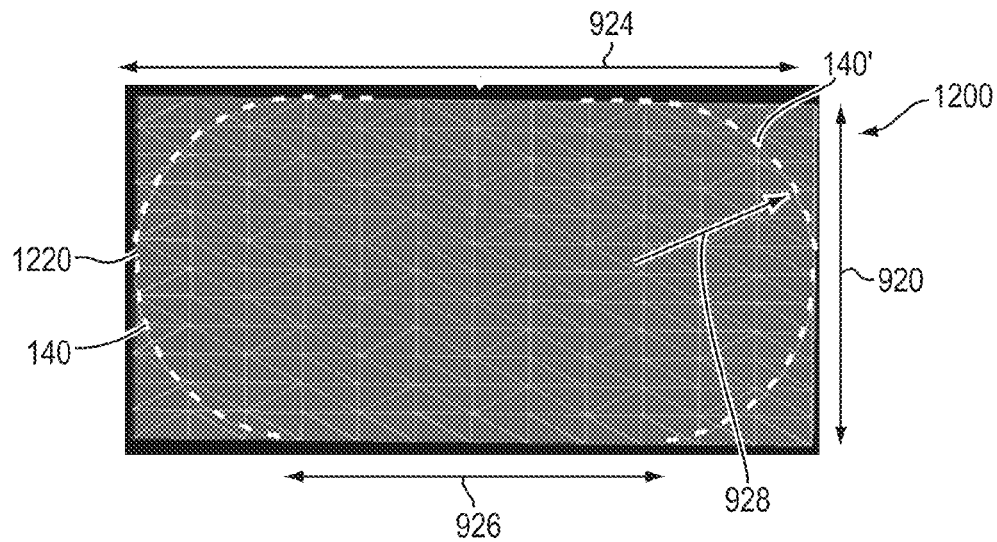
FIG. 12A is a cross-sectional schematic of a lighting device in accordance with various embodiments of the invention.

FIG. 12A shows a cross-sectional view of one embodiment of a lighting device 1200 that includes LEEs 140 formed on a portion of the inside of a surface 1210 and LEEs 140' formed on a portion of the outside of surface 1210. This example is similar to that described in Example 2; however, in this example LEEs 140' are formed on the exterior or outside surface or the top portion of the half-circular ends of lighting device 1200. In this example, the height 920 of the structure is about 80 mm, the length 924 is about 160 mm, the opening length 926 is about 80 mm, and the radius 928 of the end portions is about 40 mm. These dimensions are not a limitation of the present invention, and in other embodiments surface 1210 may have a different dimensions or a different shape. In this example, each LEE 140 and LEE 140' has a substantially Lambertian luminous distribution pattern, as shown in FIG. 8C. In this example, LEEs 140 have a pitch of about 12 mm and LEEs 140' have a pitch of about 12 mm; however, this is not a limitation of the present invention, and in other embodiments the pitch between LEEs 140 and/or LEEs 140' may be different. In this example, LEEs 140 are formed on the lower half portion of the half-circular ends of lighting device 1200 and LEEs 140' are formed on the upper half portion of the half-circular ends of lighting device 1200; however, this is not a limitation of the present invention, and in other embodiments LEEs 140 and/or LEEs 140' may be formed on different portions of surface 1210. This embodiment of the present invention is designed to direct light in both upward and downward directions, and to use shaping of the light sheet and modification of the reflectance of the light sheet to engineer different luminous intensity distributions in the up and down directions. In this example all LEEs 140 and LEEs 140' are substantially the same; however, this is not a limitation of the present invention, and in other embodiments the lighting device may include more than one region, where each region has a different type of LEEs 140 and/or LEEs 140'. For example differences in LEEs 140 and LEEs 140' may include one or more of the following: CCT, CRI, luminous intensity distribution, spectral power density, overall intensity or the like.

Figure 12B:
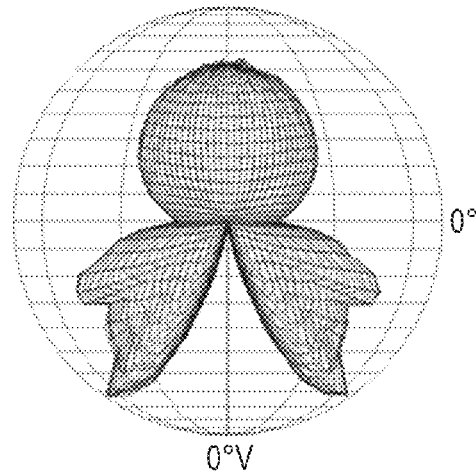
FIGS. 12B and 12C are graphs of luminous intensity distribution of light emitted from lighting devices in accordance with FIG. 12A.
Figure 12C:
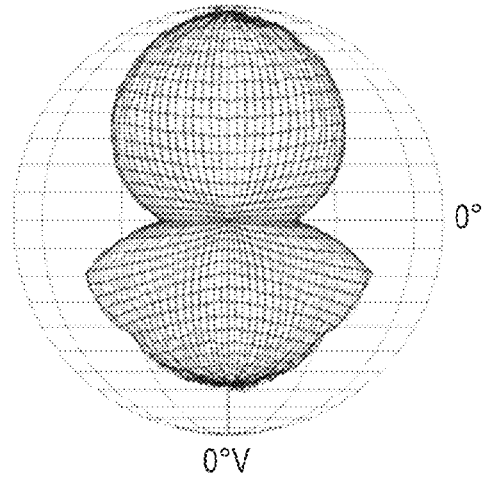

FIG. 12B shows the luminous intensity distribution for lighting device 1200 in which the surfaces adjacent to LEEs 140 and LEEs 140', that is both the interior and exterior of surface 1210, are specular reflectors having a reflectance of about 100%, while FIG. 12C shows the luminous intensity distribution for lighting device 1200 in which the surfaces adjacent to LEEs 140 and LEEs 140', that is both the interior and exterior of surface 1210, are diffuse reflectors having a reflectance of about 96% and an absorbance of about 4%. In the upward direction, the luminous intensity distribution is relatively Lambertian for both the specular and diffuse reflector, while in the downward direction the luminous intensity distributions are similar to that of Example 2.

In this example, the lighting device of FIG. 12A exhibits a split-beam distribution or a split-spot bean distribution, without the use of any external optics such as a refractive optic, a reflective optic, a Fresnel optic, a TIR optic or the like. This is similar to the lighting device described in Example 2; however, in this example, the lighting device of FIG. 12A also has an upward illumination component, generating a substantially Lambertian distribution in the upward direction. In some embodiments of the present invention, the two downward-facing lobes may be separated by an angle in the range of about 10° to about 40°. In some embodiments of the present invention, each lobe may have a half-power beam width (in the narrow beam direction) of less than about 40° or less than about 30° or less than about 20° or less than about 10°.

In some embodiments of the present invention the lighting device of FIG. 12A may be suspended below a ceiling and used for applications discussed in reference to Example 2, while providing additional upward indirect ambient illumination.

In some embodiments of the present invention, the lighting device of FIG. 12A may have a linear configuration and generate the luminous intensity distributions shown in FIG. 12B. In some embodiments of the present invention, a similar lighting device may be configured to be rotationally symmetric, that is having the shape of FIG. 12A in cross-section, but a circular shape from the top or bottom, resulting in a beam distribution pattern forming substantially an annulus of light on a work plane below the lighting device, as may be envisioned by rotating the beam distribution pattern of FIG. 12B about the vertical axis.

Example 6

Figure 13A:
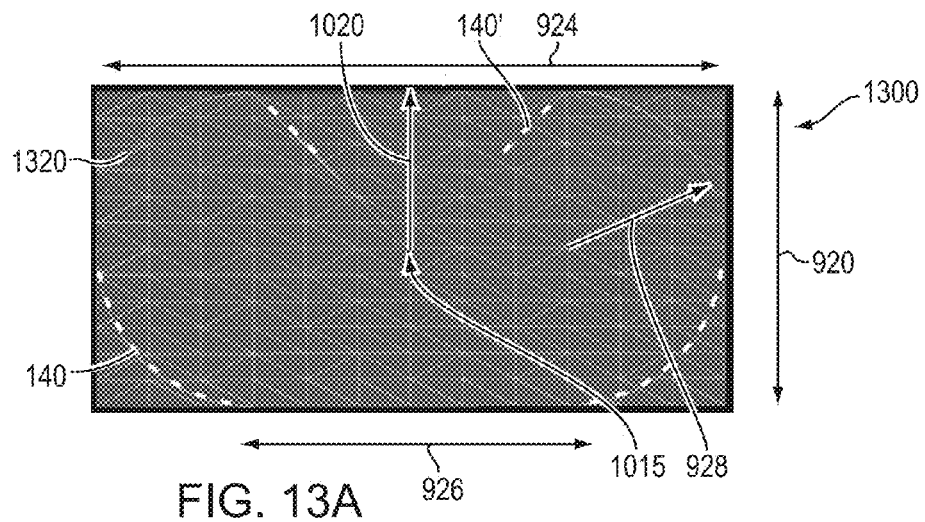
FIG. 13A is a cross-sectional schematic of a lighting device in accordance with various embodiments of the invention.

FIG. 13A shows a cross-sectional view of one embodiment of a lighting device 1300 that includes LEEs 140 formed on a portion of the inside of surface 1320 and LEEs 140' formed on a portion of the outside of surface 1320. This example is similar to that described in Example 3; however, in this example LEEs 140' are formed on a portion of the exterior surface of the V-shaped region. The structure of FIG. 13A has a V-shape with the point 1015 of the V about halfway between the top and bottom surfaces. In other words distance 1020 is about 40 mm. In this example the height 920 of the structure is about 80 mm, the length 924 is about 160 mm, the opening length 926 is about 80 mm, and the radius 928 of the end portions is about 40 mm. These dimensions are not a limitation of the present invention, and in other embodiments surface 1320 may have a different dimensions or a different shape. In this example each LEE 140 and LEE 140' has a substantially Lambertian luminous distribution pattern, as shown in FIG. 8C. In this example, LEEs 140 have a pitch of about 12 mm and LEEs 140' have a pitch of about 12 mm; however, this is not a limitation of the present invention, and in other embodiments the pitch between LEEs 140 and/or LEEs 140' may be different. In this example, LEEs 140 are formed on the lower half portion of the half-circular ends of lighting device 1200 and LEEs 140' are formed on the upper half portion of the V-shape; however, this is not a limitation of the present invention, and in other embodiments LEEs 140 and/or LEEs 140' may be formed on different portions of surface 1320. In the examples all LEEs 140 and LEEs 140' are substantially the same; however, this is not a limitation of the present invention, and in other embodiments the lighting device may include more than one region, where each region has a different type of LEEs 140 and/or LEEs 140'.

This embodiment of the present invention is designed to direct light in both upward and downward directions and to use shaping of the light sheet and modification of the reflectance of the light sheet to engineer different luminous intensity distributions in the up and down directions.

Figure 13B:
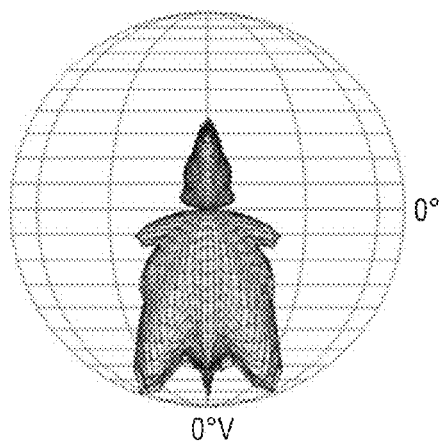
FIGS. 13B-13E are graphs of luminous intensity distribution of light emitted from lighting devices in accordance with FIG. 13A.
Figure 13C:
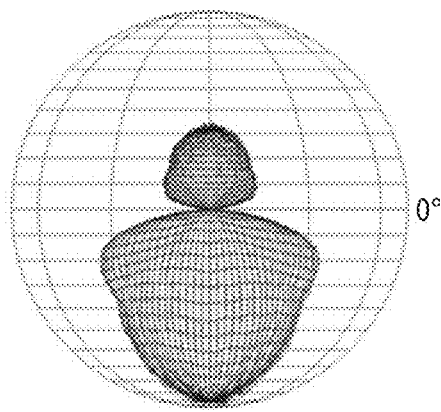
Figures 13D, 13E:
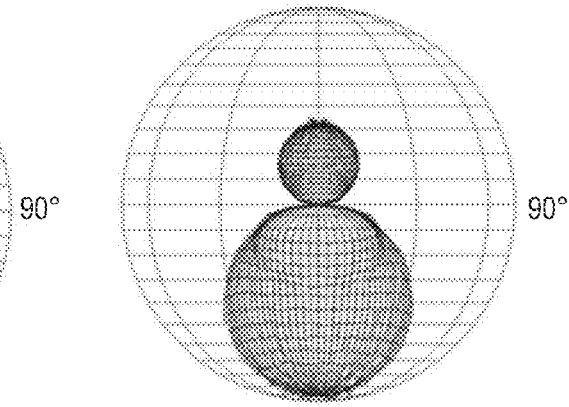

FIGS. 13B and 13D show direct and side views, respectively, of the luminous intensity distribution for lighting device 1300 in which the surface adjacent to LEEs 140 and LEEs 140', that is both the interior and exterior of surface 1320, is a specular reflector having a reflectance of about 100%, while FIGS. 13C and 13E show direct and side views of the luminous intensity distribution for lighting device 1300 in which the surface adjacent to LEEs 140 and LEEs 140', that is both the interior and exterior of surface 1320, is a diffuse reflector having a reflectance of about 96% and an absorbance of about 4%. For the specular reflector, the luminous intensity distribution is significantly changed from that of Example 5 in the upward direction, as seen when comparing FIG. 12B and FIG. 13B. In the downward direction, the luminous intensity distribution is similar to that from Example 3, as demonstrated by a comparison of FIG. 10B with FIG. 13B, because the downward-facing characteristics of lighting device 1300 and 1000 are relatively similar. For the diffuse reflector in the upward direction, the luminous intensity distribution is broader than for the diffuse reflector, as demonstrated by a comparison of FIG. 13B with FIG. 13C. In the downward direction, the luminous intensity distribution is similar to that from Example 3, as demonstrated by a comparison of FIG. 10C with FIG. 13C, because the downward-facing characteristics of lighting devices 1300 and 1000 are relatively similar.

In this example, the lighting device of FIG. 13A exhibits a distribution in the downward direction similar to that of the lighting device of FIG. 10A, without the use of any external optics such as a refractive optic, a reflective optic, a Fresnel optic, a TIR optic or the like. However, in this example, the lighting device of FIG. 13A also has an upward illumination component, generating a substantially Lambertian distribution in the upward direction.

In some embodiments of the present invention, the lighting device of FIG. 13A may be suspended below a ceiling and used for applications discussed in reference to Example 3, while providing additional upward indirect ambient illumination.

In some embodiments of the present invention, the lighting device of FIG. 13A may have a linear configuration and generate the luminous intensity distributions shown in FIGS. 13B and 13D for direct and side views respectively. In some embodiments of the present invention, a similar lighting device may be configured to be rotationally symmetric, that is having the shape of FIG. 13A in cross-section, but a circular shape from the top or bottom, resulting in a beam distribution pattern forming substantially a circle of light on a work plane below the lighting device, as may be envisioned by rotating the beam distribution pattern of FIG. 13B about the vertical axis.

Example 7

Figure 14A:
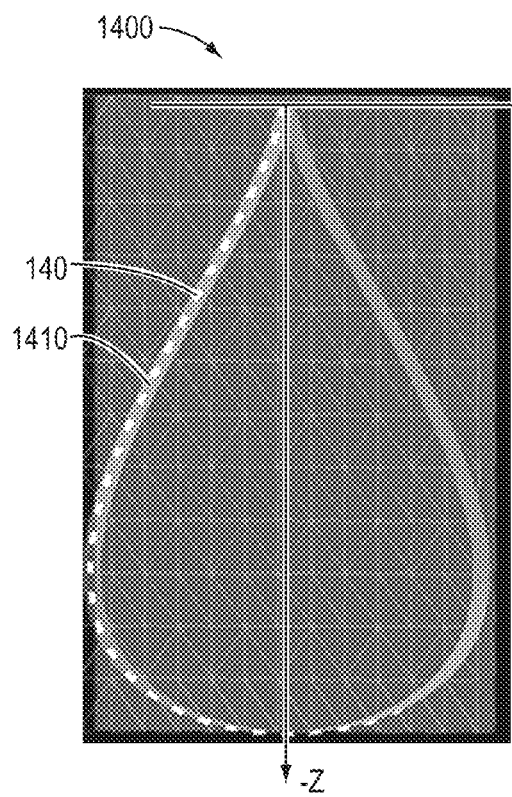
FIG. 14A is a cross-sectional schematic of a lighting device in accordance with various embodiments of the invention.

FIG. 14A shows a cross-sectional view of one embodiment of a lighting device 1400 including LEEs 140 formed on the outside of a teardrop-shaped surface 1410. This is similar to the structure shown in FIG. 1E. In some embodiments of the present invention, the curvature of the surface is given by the equation:

$$b^2\left(\frac{x}{c}\right)^2 = -\left(\frac{z}{d}\right)^3\left(a + \frac{z}{d}\right),$$

where a=5, b=1, c=6, and d=30 and the x and z axes are indicated in FIG. 14A. However, this is not a limitation of the present invention, and in other embodiments surface 1410 may have a different value for the constants "a," "b," "c," and "d" or may be defined by a different equation or have a different shape. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different.

Figure 14B:
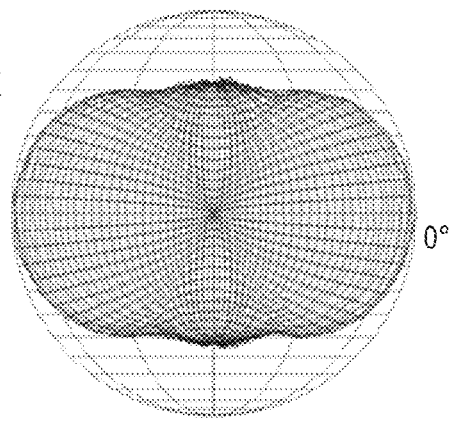
FIGS. 14B-14E are graphs of luminous intensity distribution of light emitted from lighting devices in accordance with FIG. 14A.
Figure 14C:
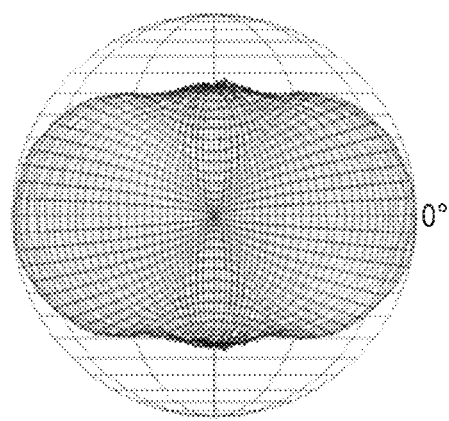
Figure 14D:
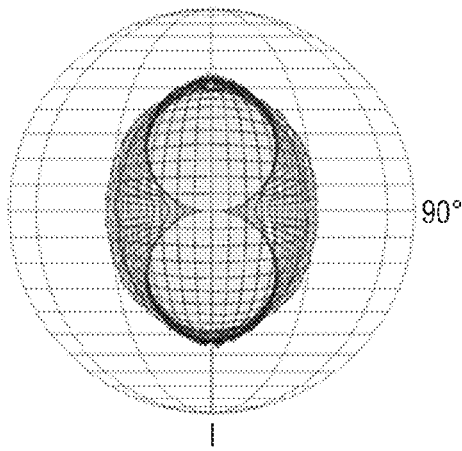
Figure 14E:
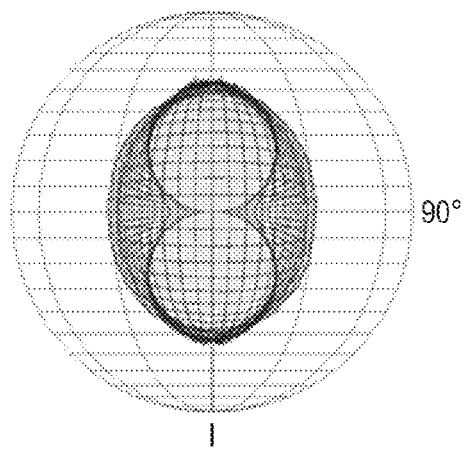

FIGS. 14B and 14D show direct and side views, respectively, of the luminous intensity distribution for lighting device 1400 in which the surface 1410 adjacent to LEEs 140 is a diffuse reflector having a reflectance of about 100%, while FIGS. 14C and 14E show direct and side views of the luminous intensity distribution for the same structure, except that surface 1410 is a specular reflector having a reflectance of about 96% and an absorbance of about 4%. As demonstrated in FIGS. 14B-14E, this luminaire design exhibits a relatively similar luminous intensity distribution for both specular and diffuse reflectance surfaces, and also exhibits a significantly increased amount of side light when looking at the side of the luminaire on which LEEs 140 are formed. The similar nature of the luminous intensity distributions for the specular and diffuse reflectance surfaces is in part related to the fact that in this specific design, LEEs 140 are substantially facing outward, and light is emitted from the lighting device without substantial reflection of the light from substrate 165. Thus, the specific optical characteristics of substrate 165 have less of an impact on the luminous intensity distribution of this lighting device than one in which some or all LEEs 140 emit more directly onto a portion of substrate 165, for example the lighting device of FIG. 10A.

Example 8

Figure 15A:
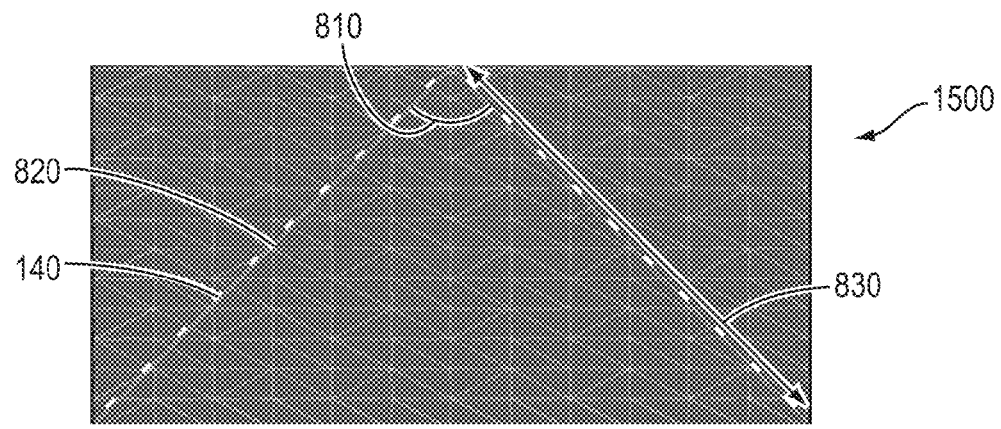
FIG. 15A is a cross-sectional schematic of a lighting device in accordance with various embodiments of the invention.

FIG. 15A shows a cross-sectional view of one embodiment of a lighting device 1500 that includes LEEs 140 formed on the outside (or "mountain") of a V-shaped lighting device. In this example, each side of the V shape has a length 830 of about 120 mm. In this example, each LEE 140 has a substantially Lambertian luminous distribution pattern, as shown in FIG. 8B. In this example, LEEs 140 have a pitch of about 12 mm, but this is not a limitation of the present invention, and in other embodiments the pitch between LEEs 140 may be different. In this example, the angle 810 between the sheets forming the V is about 90°; however, this is not a limitation of the present invention, and in other embodiments angle 810 may be different.

Figure 15B:
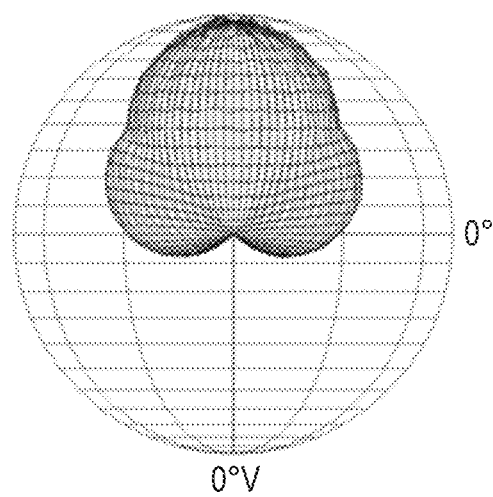
FIGS. 15B and 15C are graphs of luminous intensity distribution of light emitted from lighting devices in accordance with FIG. 15A.
Figure 15C:
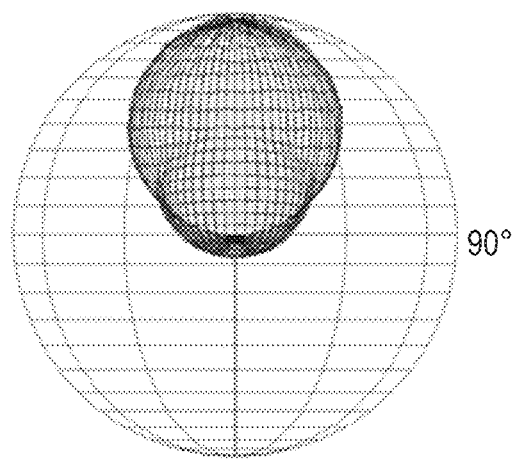

FIGS. 15B and 15C show direct and side views of the luminous intensity distribution for lighting device 1500 in which the surface 820 adjacent to LEEs 140 is a specular reflector having a reflectance of about 100%. In this embodiment, the luminous intensity emitting from the surface on which LEEs 140 are formed has a relatively larger luminous intensity at higher angles, away from normal incidence; this light distribution pattern is referred to herein as an inverted batwing distribution. In some embodiments of the present invention, this may be useful for an indirect lighting source, for example in which the peak of the device in FIG. 15A is pointing towards the ceiling and LEEs 140 emit up, resulting in a relatively wide spread of light along the ceiling perpendicular to the lighting device and providing a relatively higher illuminance uniformity in ambient lighting applications.

Example 9

Figure 16A:
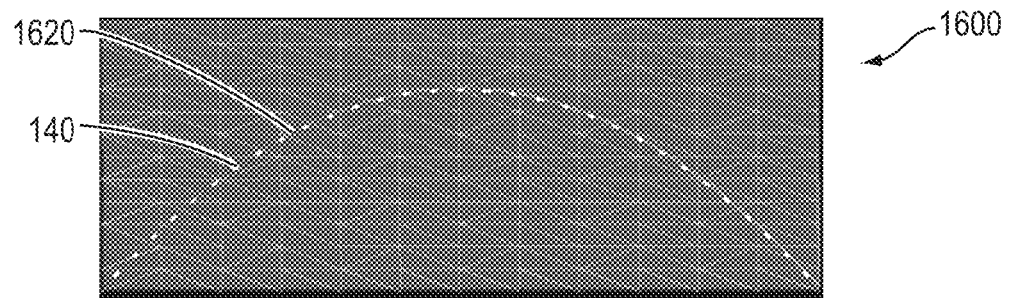
FIG. 16A is a cross-sectional schematic of a lighting device in accordance with various embodiments of the invention.

FIG. 16A shows a cross-sectional view of one embodiment of a lighting device 1600 that includes LEEs 140 formed on the inside (concave side) of a curved surface 1620. In some embodiments of the present invention, the curvature of the surface 1620 is given by the equation $z=ax^2$, where $a=-14/4050$; however, this is not a limitation of the present invention, and in other embodiments surface 1620 may have a different value for the constant "a" or be defined by a different equation or have a different shape. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different.

Figure 16B:
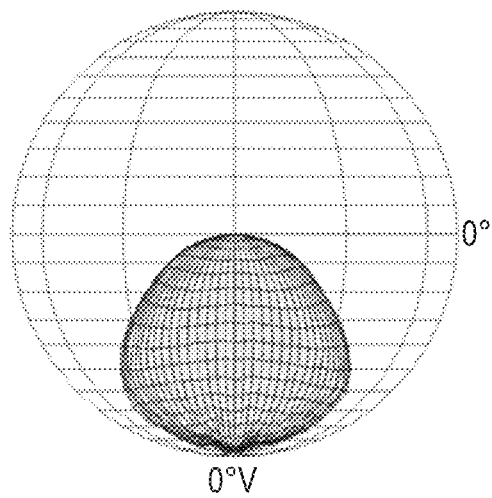
FIGS. 16B and 16C are graphs of luminous intensity distribution of light emitted from lighting devices in accordance with FIG. 16A.
Figure 16C:
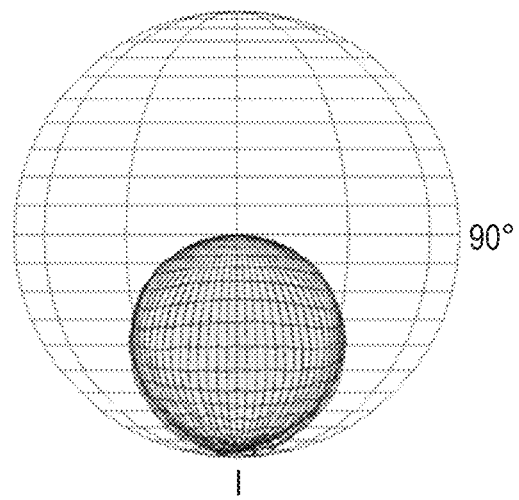

FIGS. 16B and 16C show direct and side views of the luminous intensity distribution for lighting device 1600 in which the surface 1620 adjacent to LEEs 140 is a specular reflector having a reflectance of about 100%. In this embodiment, the luminous intensity distribution is relatively Lambertian in the side view, and exhibits an increased intensity at angles relatively close to normal, for example between about normal incidence and about 45°. The luminous intensity distribution shown in FIG. 16B is similar to that of a batwing distribution, which produces relatively uniform illuminance on a work plane under the light, but relatively reduced light intensity at higher angles, for reduced glare without the use of any external optics such as a refractive optic, a reflective optic, a Fresnel optic, a TIR optic or the like.

Example 10

Figure 17A:
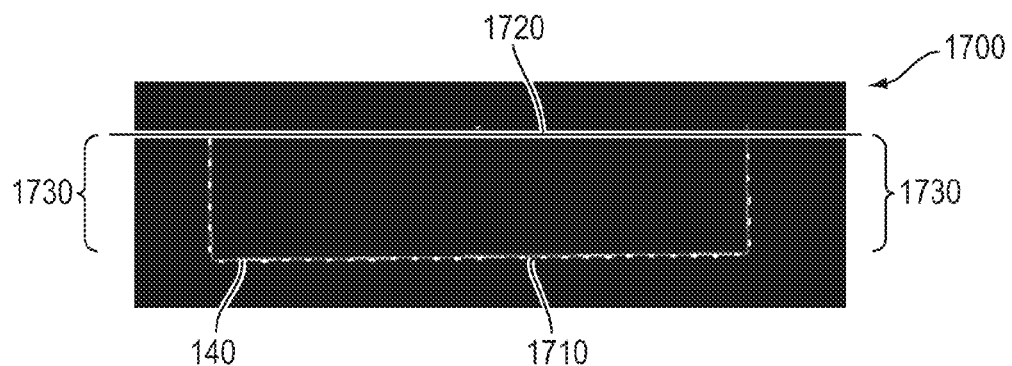
FIG. 17A is a cross-sectional schematic of a lighting device in accordance with various embodiments of the invention.

FIG. 17A shows a cross-sectional view of one embodiment of a lighting device 1700 that includes LEEs 140 formed on the outside of three sides of a substantially rectangular surface 1710. In some embodiments of the present invention, lighting device may be attached to a surface 1720; however, this is not a limitation of the present invention, and in other embodiments lighting device 1700 may be mounted vertically or at any other angle or orientation, or may be suspended or mounted in a different fashion. In some embodiments of the present invention, surface 1710 may have a different aspect ratio than shown, or for example be a substantially square shape. In this example, each LEE 140 has a substantially Lambertian luminous distribution pattern, as shown in FIG. 8C. In this example, LEEs 140 have a pitch of about 12 mm, but this is not a limitation of the present invention and in other embodiments the pitch between LEEs 140 may be different.

Figure 17B:
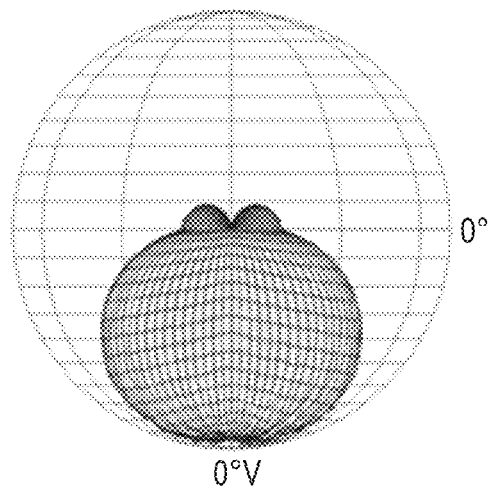
FIGS. 17B-17E are graphs of luminous intensity distribution of light emitted from lighting devices in accordance with FIG. 17A.
Figure 17C:
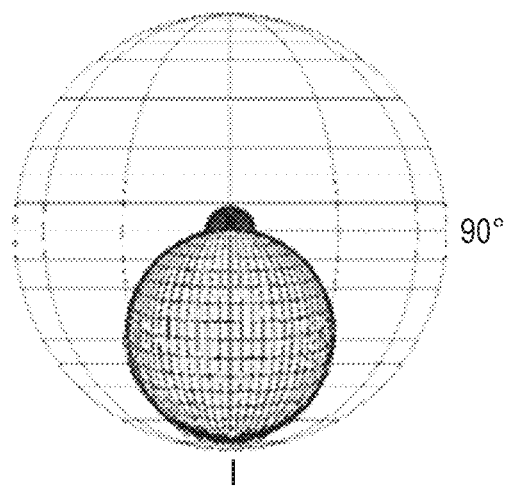

FIGS. 17B and 17C show direct and side views of the luminous intensity distribution for lighting device 1700 in which the surface 1710 adjacent to LEEs 140 is a specular reflector having a reflectance of about 100%. In this embodiment, the luminous intensity distribution is relatively Lambertian in the side view (at least below 90°—the characteristics for angles greater than 90° are discussed separately) and exhibits an increased intensity at higher angles, away from normal incidence, because of the LEEs 140 that are on the side surfaces 1730. Another feature of the luminous intensity distribution of FIG. 17B are the two bumps above the plane of surface 1720. These are a result of the high-angle light emission from LEEs 140 on surfaces 1730, which results in a certain amount of light emitted at 90° and decreasing amounts of light visible at higher angles. Note that substantially no light is visible at 180°. The results for a surface 1710 having a diffuse reflectance are substantially the same as for a specular surface.

Figure 17D:
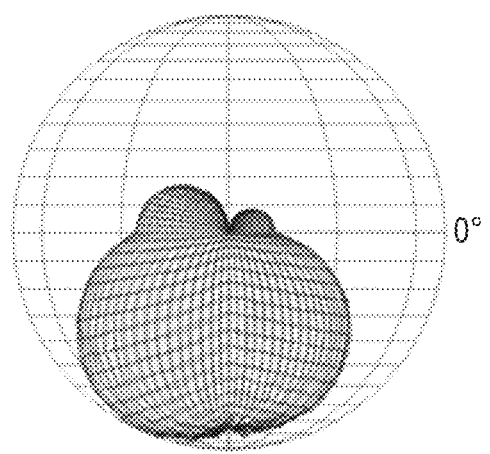
Figure 17E:
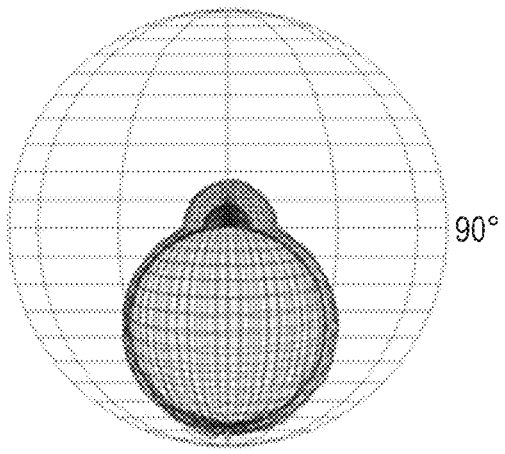

FIGS. 17D and 17E show direct and side views of the luminous intensity distribution for lighting device 1700 in which the surface 1710 adjacent to LEEs 140 is a specular reflector having a reflectance of about 100%. Moreover, LEEs 140 on the left vertical surface 1730 emit two times the luminous flux emitted by LEEs 140 on the other two sides of lighting device 1700. In this embodiment, the luminous intensity distribution exhibits a significant increase at most of the angular range between about 5° and about 90° because of the larger luminous flux of LEEs 140 on that side of the device.

Figure 17F:
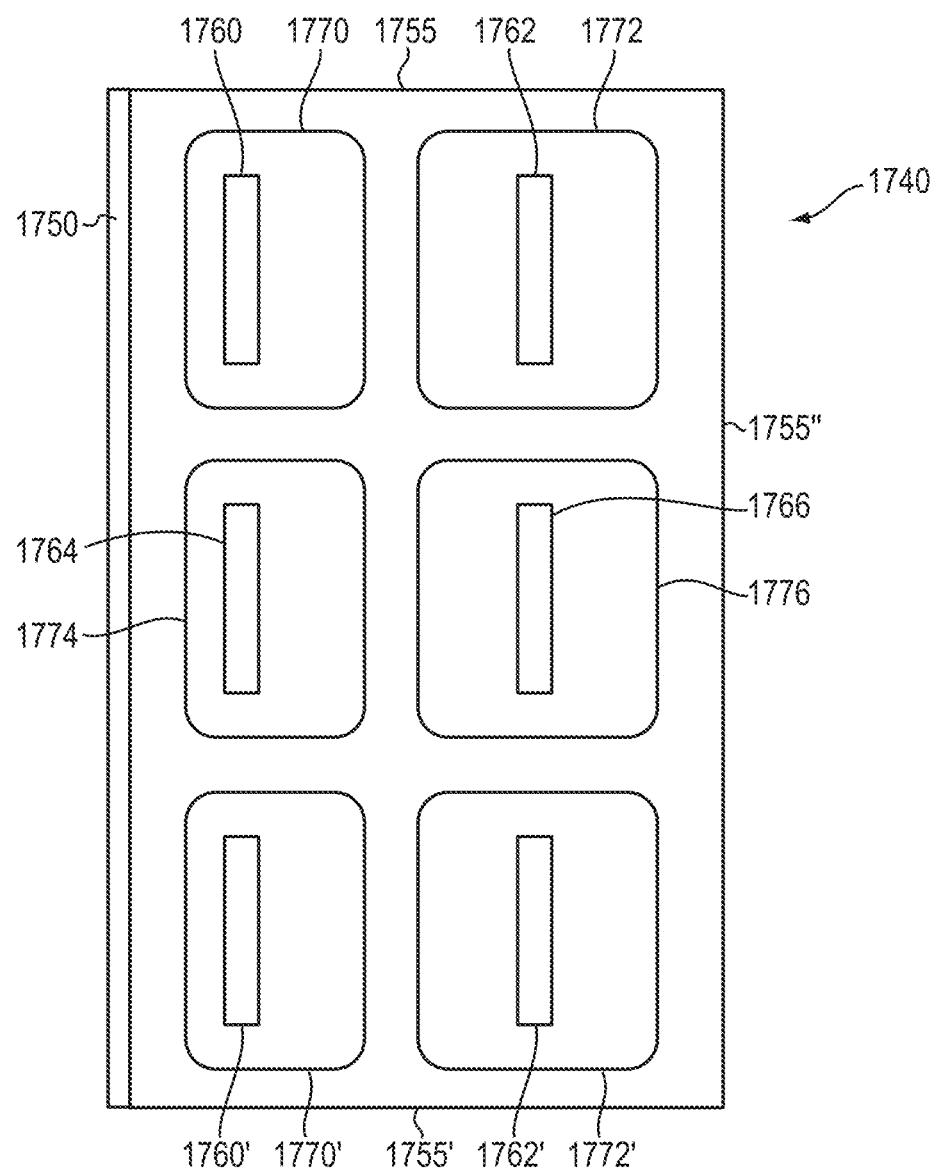
FIG. 17F is a schematic plan view of an installation featuring multiple lighting devices in accordance with various embodiments of the invention.

In some embodiments of the present invention, the density of LEEs 140 may be varied within one lighting device and/or the luminous flux from each LEE 140 may be varied within one lighting device (as described with reference to FIGS. 17D and 17E. In some embodiments, these approaches may be utilized separately or in combination with other approaches to provide a variable light density, or luminous intensity distribution within one lighting device or within a group of lighting devices. FIG. 17F shows an example of a room 1740 having three walls 1755, 1755', and 1755", none of which have windows, and a fourth "window wall" 1750 that features a full-length window. In room 1740 are six lighting devices: lighting devices 1760 and 1760' are located near the corner of wall 1755 and window wall 1750 and the corner of wall 1755' and window wall 1750 respectively, lighting device 1764 is located at window wall 1750 between lighting devices 1760 and 1760', lighting devices 1762 and 1762' are located near the corner of wall 1755 and wall 1755 and the corner of wall 1755' and wall 1750, respectively, and lighting device 1766 is located between lighting devices 1762 and 1762'. Each lighting device has a different luminous intensity distribution, shown in FIG. 17F by the grey regions identified as 1770, 1770', 1772, 1772', 1774, and 1776. Lighting devices 1760, 1760', and 1764 are designed to produce less light on the side facing window wall 1750. For example, in some embodiments the desired lighting level is achieved by a combination of light from the lighting devices and ambient light entering room 1740 through window wall 1750. In some embodiments of the present invention, using ambient light, otherwise known as daylight harvesting, may be used to achieve the desired lighting levels while saving energy used to power the lighting devices. Lighting devices 1760 and 1762 emit less light in the direction of wall 1755, and lighting devices 1760' and 1762' emit less light in the direction of wall 1755'. In some embodiments of the present invention, less light may be required in the direction of the nearest or a nearby wall, for example because it is a relatively small, or relatively unused space. The ability to modify the luminous intensity distribution of the lighting devices provides one way to engineer the desired lighting profile within a space or room. In some embodiments of the present invention, lighting devices may be combined with sensors and control systems to provide additional control and/or dynamic control of lighting levels and/or to increase efficiency. In some embodiments of the present invention, other characteristics of the lighting devices, for example total intensity, CCT, CRI, R9, spectral power density, or luminous intensity distribution, may be changed dynamically, for example during the day, to provide additional functionality to such lighting systems.

Example 11

Figure 18A:
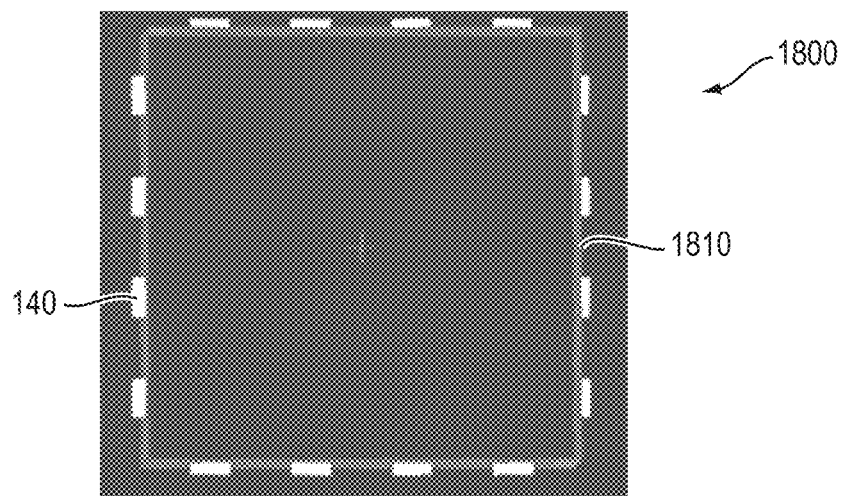
FIG. 18A is a cross-sectional schematic of a lighting device in accordance with various embodiments of the invention.

FIG. 18A shows a cross-sectional view of one embodiment of a lighting device 1800 that includes LEEs 140 formed on the outside surfaces of four sides of a surface 1810 that defines a substantially square cross-section. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different.

Figure 18B:
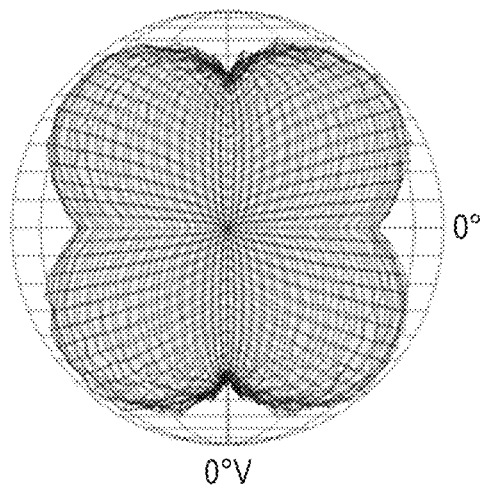
FIGS. 18B and 18C are graphs of luminous intensity distribution of light emitted from lighting devices in accordance with FIG. 18A.
Figure 18C:
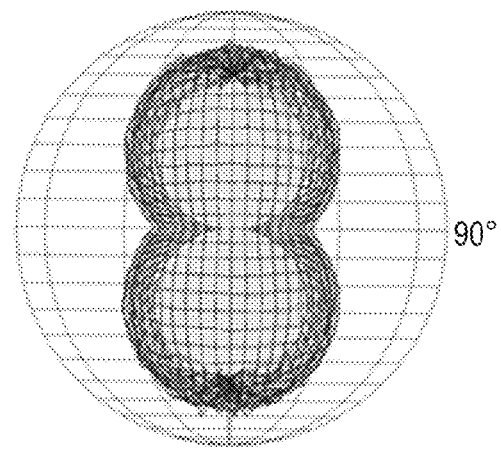

FIGS. 18B and 18C show direct and side views of the luminous intensity distribution for lighting device 1800 in which the surface 1810 adjacent to LEEs 140 is a specular reflector having a reflectance of about 100%. In this embodiment, the luminous intensity distribution is has a four-lobed distribution, i.e., a four-leaf clover shape. The highest luminous flux is along the diagonals of the square, at about 45°, at about 135°, at about 225°, and at about 315°. The highest intensity is located in the regions of the vertices of the square, and this light intensity is composed of light emitted from LEEs 140 on adjacent sides of the square.

Example 12

Figure 19A:
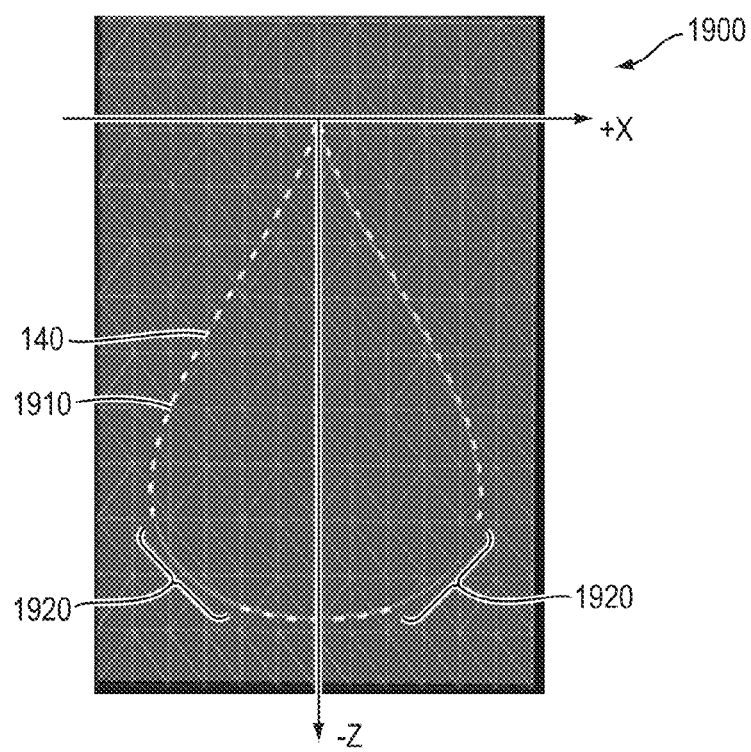
FIG. 19A is a cross-sectional schematic of a lighting device in accordance with various embodiments of the invention.

FIG. 19A shows a cross-sectional view of one embodiment of a lighting device 1900 that includes LEEs 140 formed on the outside of a tear-drop shaped surface 1910, which is the identical to surface 1410 shown in FIG. 14A. However, in the embodiment of FIG. 19A, LEEs 140 are only formed on a portion of the surface, as shown. In some embodiments of the present invention, the curvature of the surface is given by the equation $$b^2 \left(\frac{x}{c}\right)^2 = -\left(\frac{z}{d}\right)^3 \left(a + \frac{z}{d}\right),$$

where a=5, b=1, c=6, and d=30 and the x and z axes are as indicated in FIG. 19A; however, this is not a limitation of the present invention, and in other embodiments surface 1910 may have a different value for the constants "a," "b," "c," and "d" or be defined by a different equation or have a different shape. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different.

Figure 19B:
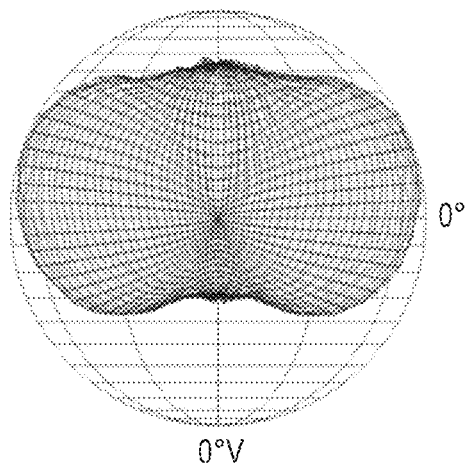
FIGS. 19B and 19C are graphs of luminous intensity distribution of light emitted from lighting devices in accordance with FIG. 19A.
Figure 19C:
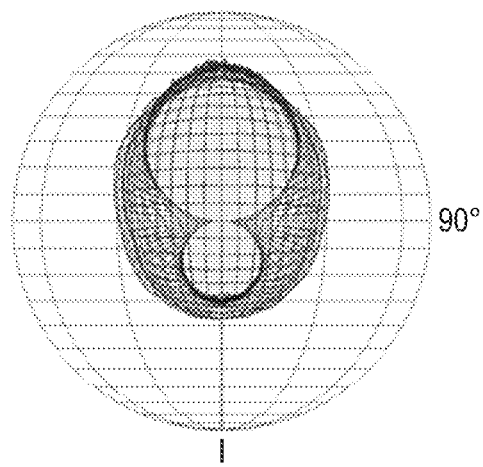

FIGS. 19B and 19C show direct and side views, respectively, of the luminous intensity distribution for lighting device 1900 in which the surface 1910 adjacent to LEEs 140 is a specular reflector having a reflectance of about 100%. Comparing FIG. 19B with FIG. 14C indicates that eliminating LEEs 140 at the lower left and right regions 1920 results in a reduction in luminous flux in the regions without LEEs 140 as well as in adjacent regions. The reason for the reduction of luminous flux in the regions adjacent to the region without LEEs 140 is that, in these regions, there is no longer a contribution from side emission of LEEs 140 in the region without LEEs 140. For example, the luminous intensity at normal incidence is less in FIG. 19B than in FIG. 14C, even though there are LEEs 140 in this region in both lighting devices, because, in the lighting device of FIG. 19A, there is no longer a contribution to the luminous intensity from LEEs 140 in regions 1920.

Example 13

Figure 20A:
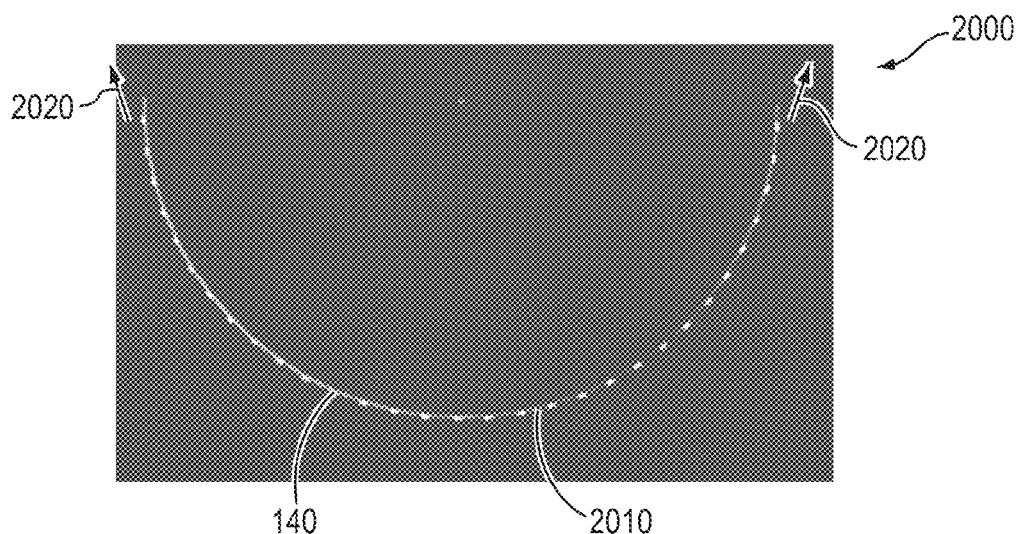
FIG. 20A is a cross-sectional schematic of a lighting device in accordance with various embodiments of the invention.

FIG. 20A shows a cross-sectional view of one embodiment of a lighting device 2000 that includes LEEs 140 formed on the outside (convex side) of a semi-circular or oblate hemispherical surface 2010. In this example, each LEE 140 has a substantially Lambertian luminous distribution pattern, as shown in FIG. 8C. In this example, LEEs 140 have a pitch of about 12 mm, but this is not a limitation of the present invention, and in other embodiments the pitch between LEEs 140 may be different.

Figure 20B:
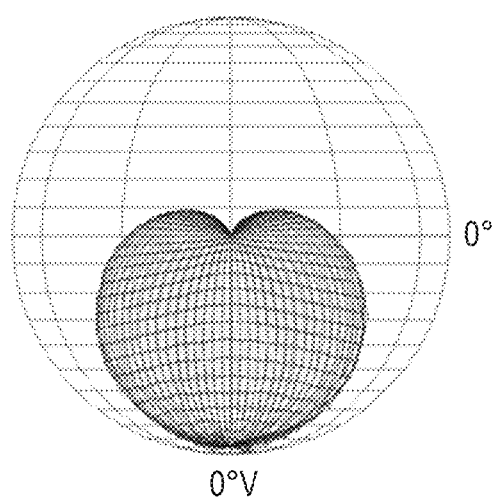
FIGS. 20B and 20C are graphs of luminous intensity distribution of light emitted from lighting devices in accordance with FIG. 20A.
Figure 20C:
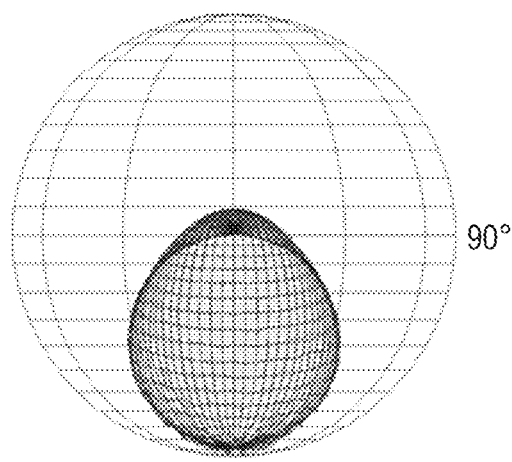

FIGS. 20B and 20C show direct and side views of the luminous intensity distribution for lighting device 2000 in which the surface 2010 adjacent to LEEs 140 is a specular reflector having a reflectance of about 100%. The luminous distribution pattern shown in FIG. 20B is similar to that of a cardioid, or heart-shaped, pattern. Similar to Examples 10-12, the luminous intensity distribution for the direct view is characterized by light at least somewhat beyond the region containing LEEs 140, because of side emission therefrom. In the case of the structure of FIG. 20A, light emitted from the side of LEEs 140 in an upwards direction 2020 is the source of the light emitted at angles greater than 90° in the luminous intensity distribution shown in FIG. 20B.

Figure 21A:
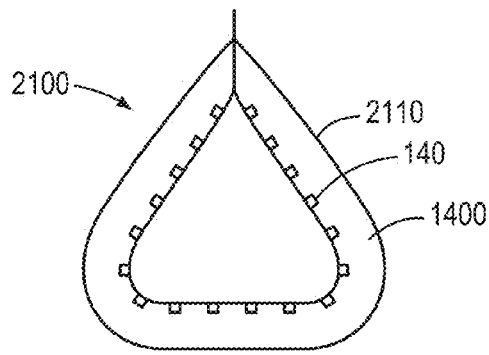
FIGS. 21A-21C are schematic cross-sections of lighting devices in accordance with various embodiments of the invention.
Figure 21C:
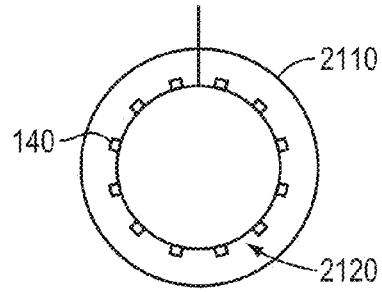
Figure 21B:
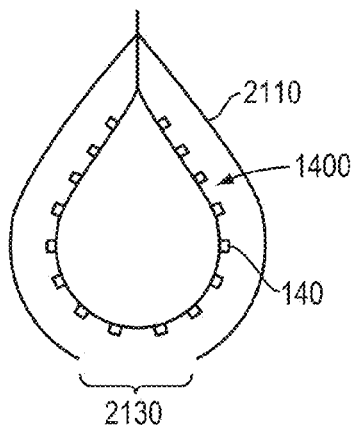
Figure 21D:
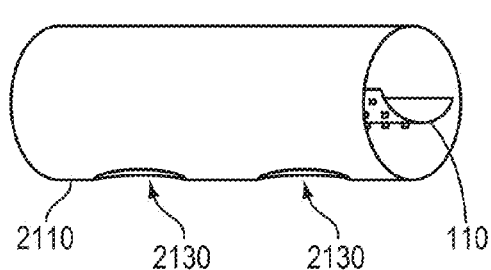
FIG. 21D is an isometric view of a lighting device in accordance with various embodiments of the invention.

Another aspect of embodiments of the present invention includes the use of diffusers in combination with a shaped light sheet and/or modifications of the optical properties of the light sheet. For example, FIG. 21A shows a lighting device 2100 that combines the lighting device 1400 of FIG. 14A with a diffuser 2110 spaced apart from the outside surface of lighting device 1400. While FIG. 21A shows diffuser 2110 as covering all or substantially all of lighting device 1400, this is not a limitation of the present invention, and in other embodiments diffuser 2110 may have one or more openings 2130, as shown in FIG. 21B. FIG. 21C shows another embodiment of the present invention having a shape different from that of lighting device 2100. In this example, the light sheet is curved to form a cylinder 2120 and is surrounded by a substantially cylindrical diffuser 2110 having a substantially circular cross-section. While FIG. 21B shows diffuser 2110 having one opening 2130, this is not a limitation of the present invention, and in other embodiments there may be more than one opening in diffuser 2110, and the one or more openings may have any shape. For example, FIG. 21D shows an embodiment of the present invention of a lighting device having two openings 2130 in diffuser 2110 which surrounds light sheet 110 having a half-circular cross-sectional shape. In this embodiment of the present invention, light sheet 110 is open, i.e., curved but not closed on itself.

Figure 21F:
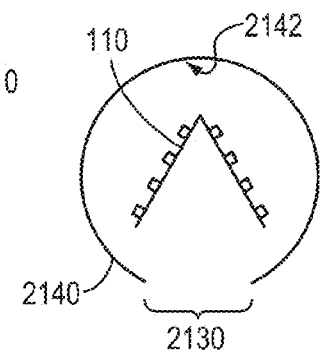
FIGS. 21E-21G are schematic cross-sections of lighting devices in accordance with various embodiments of the invention.
Figures 21E, 21G:
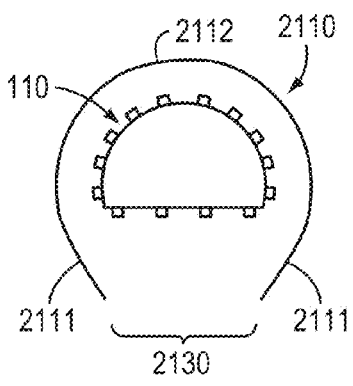

While FIGS. 21A and 21C show embodiments having light sheets having a tear drop or cylindrical shape, this is not a limitation of the present invention, and in other embodiments other shapes may be utilized, for example triangular, square, hexagonal or any other shape. For example, FIG. 21E shows an embodiment of the present invention that features diffuser 2110 having a curved portion 2112 and two straight portions 2111. Diffuser 2110 partially surrounds light sheet 110, which has a substantially half circular cross-sectional shape with LEEs 140 positioned over substantially all of the surface. Diffuser 2110 partially surrounds light sheet 110, having opening 2130 as shown in FIG. 21E.

In some embodiments of the present invention, in addition to or instead of one or more openings, portions of diffuser 2110 may have different optical properties. For example, in some embodiments of the present invention, diffuser 2110 may have one or more portions that are substantially transparent to a wavelength of light emitted by LEEs 140, for example having a transmittance greater than about 90% to a wavelength of light emitted by LEEs 140. FIG. 21F shows an example of one embodiment of the present invention having portion 2111 of diffuser 2110 that has a transmittance greater than 90% to a wavelength of light emitted by LEE 140.

In other embodiments of the present invention, one or more portions of diffuser may be opaque and/or may have a high absorbance for a wavelength of light emitted by LEEs 140 and/or may have a high reflectance, for example a specular or diffuse reflectance to a wavelength of light emitted by LEEs 140. FIG. 21G shows an example of one embodiment of the present invention in which light sheet 110 is surrounded by a shade 2140. In this example, the interior surface of shade 2140 has a specular reflectance greater than 90% to a wavelength of light emitted by LEEs 140 and light exits shade 2140 through opening 2130. The structures of FIGS. 21E and 21G demonstrate another aspect of embodiments of the present invention: the shape of light sheet 110 need not match that of the shade or diffuser. In the structure of FIG. 21G, the light sheet has a V-shape with the point of the V pointing up and LEEs 140 on the outside of the surface of the V-shape, while shade 2140 has a substantially circular shape in cross-section. In other embodiments of the present invention, the light sheet and/or the shade or diffuser may have any shapes.

In other embodiments of the present invention, a lighting device may include a connector or socket, for example any one of the many standard sockets or connectors used for lamps, such as an Edison A19 base, pin bases such as used in fluorescent lamps, MR16 lamps, miniature threaded bases, or the like. The type of base or connector is not a limitation of the present invention. FIG. 21H shows an example of one embodiment of the present invention that includes a standard A19 Edison base 2220, light sheet 110, and diffuser 2110. FIG. 21I shows one example of an embodiment of a fluorescent lamp replacement that includes a diffuser/housing 2150 and connection pins 2225. FIG. 21J shows a cross-section of the structure of FIG. 21I through cut line A-A', showing light sheet 110 having a circular cross-section. In some embodiments, light sheet 110 may have a different shape within housing 2150, for example a triangle, a square, a pentagonal or a hexagonal cross-section or any arbitrarily shaped cross-section.

In some embodiments of the present invention, spacers 2155 may be used to position light sheet 110 a specific and consistent distance away from an outer diffuser or housing, as shown in FIG. 21K. In some embodiments of the present invention, spacers 2155 may be formed separately from housing 2150 and light sheet 110; however, this is not a limitation of the present invention, and in other embodiments spacers 2155 may be part of housing 2150 and/or light sheet 110. In some embodiments, spacers 2155 may be formed by creating an inward-facing dimple in housing 2150.

In some embodiments, the cross-sectional shape of light sheet 110 is engineered to provide a relatively more directional luminous intensity distribution pattern. FIG. 21L shows an example of an embodiment of the present invention that includes a light sheet 110 having a curved shape and surrounded by diffuser 2150, where a portion 2142 of diffuser 2150 has a reflective coating on the interior surface, resulting in substantially all of the light emitting through the uncoated portion of diffuser 2150.

FIG. 21M shows another embodiment of the present invention that includes a base 2160 and a shade 2165. In some embodiments of this aspect of the present invention, shade 2165 includes or consists essentially of light sheet 110; however, this is not a limitation of the present invention, and in other embodiments shade 2165 may include light sheet 110 and a diffuser, for example a diffuser spaced apart from the light sheet. In some embodiments, base 2160 may include or consist essentially of a conventional lamp connector, for example an Edison base, miniature screw base, or preferably a pin base.

In other embodiments of the present invention, light sheet 110 and other optional features, for example a diffuser, reflector or the like, may be incorporated to make standing lamps, for example floor lamps, torchieres, desk lamps, and the like.

In some embodiments of the present invention, the diffuser or shade may include or consist essentially of at least one of plastic, metal, wood, glass, fabric, stone, rubber, or the like. In some embodiments of the present invention, the diffuser or shade may be coated with one or more materials, for example to achieve a surface having a substantial reflectance to a wavelength of light emitted by LEEs 140. In some embodiments of the present invention, the coating may include or consist essentially of at least one of aluminum, gold, copper, silver, chromium, platinum, iron, or the like. In some embodiments, the shade or diffuser may have one or more openings or holes defined therewithin. In some embodiments, features such as designs, letter, images, or the like may be formed on or in the shade or diffuser. In some embodiments of the present invention, a shade or diffuser having a reflective coating or being reflective itself may have a relatively intermediate reflectance value and a relatively low absorbance value, resulting in the reflection of a substantial portion of the light, transmission through the shade or diffuser of a relatively substantial portion of the light, and relatively little absorption of the light in the shade or diffuser. In some embodiments of the present invention, such an arrangement may be used to provide a controlled light distribution pattern, for example an indirect/direct light distribution pattern where a portion of the light is directed onto a work plane to provide task lighting, and a portion of the light is directed upward to the ceiling, to provide ambient lighting.

In some embodiments of the present invention, a second layer may be added between the light sheet and the diffuser or external to the diffuser. In some embodiments of the present invention, this second layer may cover substantially all of the light sheet or cover substantially all of the diffuser; however, this is not a limitation of the present invention, and in other embodiments the second material may only cover portions of the light sheet and/or diffuser. In some embodiments, the second material may include or consist essentially of at least one of plastic, metal, wood, glass, fabric, stone, rubber, or the like. In some embodiments of the present invention, the second material may be coated with one or more materials, for example to achieve a surface having a substantial reflectance to a wavelength of light emitted by LEEs 140. In some embodiments of the present invention, the coating may include or consist essentially of at least one of aluminum, gold, copper, silver, chromium, platinum, iron, or the like. In some embodiments, the second material may have one or more openings or holes defined therewithin. In some embodiments, features such as designs, letters, images, or the like may be formed on or in the second material.

Figure 22A:
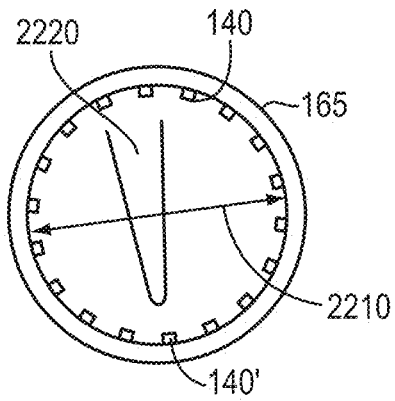
FIGS. 22A-22D are schematic cross-sections of lighting devices in accordance with various embodiments of the invention.

In some embodiments of the present invention, the light sheet may form a closed shape with LEEs 140 on the interior surface, for example as shown in FIG. 22A. In some embodiments of the present invention, an optional diffuser or shade may be formed around all or a portion of the structure shown in FIG. 22A. In some embodiments of the present invention, this or similar configurations may be used to reduce pixelization, i.e., the observation of individually illuminated LEEs 140. In some embodiments of the present invention, the distance between LEEs 140 and an opposite side 2210 (see FIG. 22A, in which this dimension is approximately equal to the diameter of the structure) may be at least 1.5 or at least 2 or at least 4 times the spacing between LEEs 140 (the LEE 140 pitch). In such configurations, substrate 165 may include or consist essentially of a translucent material, or one that is a diffuser, and the combination of LEE 140 pitch and overall structure size may result in a relatively diffuse light when observed from a distance. In some embodiments, the spatial light distribution pattern from each LEE 140 may be modified to be relatively more collimated, to prevent external visualization of each LEE 140 resulting from light emitted at relatively high off-normal angles. A schematic of such a configuration is shown for LEE 140' in FIG. 22A, in which LEE 140' has a relatively narrow light distribution pattern 2220.

Figure 22B:
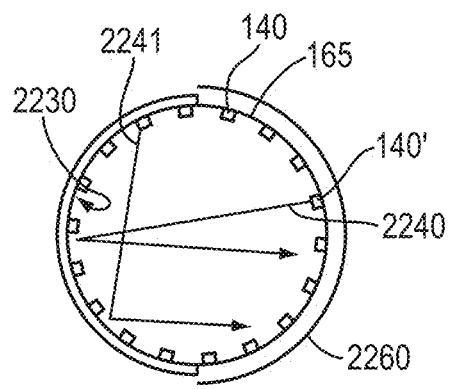

In some embodiments of the present invention, all or a portion of the interior surface of a closed structure, for example that shown in FIG. 22A, may have a coating that is reflective to a wavelength of light emitted by LEEs 140. In some embodiments of the present invention, this coating may be formed on a transparent substrate 165. In some embodiments of the present invention, a reflecting coating may be designed to reflect a portion of the light and transmit substantially all of the non-reflected light. In some embodiments, a reflecting surface or coating may be formed on only a portion of the surface of substrate 165, for example as shown in FIG. 22B. FIG. 22B shows a lighting device having a transparent substrate 165, which is partially coated with a reflecting coating 2230. Light emitted from LEEs 140 opposite reflective coating 2230, for example LEE 140', is reflected back and may exit the lighting device through transparent substrate 165, as represented by light ray 2240. Light emitted at off-normal angles by LEEs on the portion of substrate 165 coated with coating 2230 is also reflected from coating 2230 and exits through transparent substrate 165, as represented by light ray 2241. In some embodiments of the present invention, an optional diffuser or shade 2260 may be placed in front of at least a portion of the transparent portion of substrate 165, as shown in FIG. 22B. In some embodiments of the present invention, the transparent portion of substrate 165 may be coated with a diffusing material, or replaced with a diffusing material, for example, to reduce pixelization.

In some embodiments of the present invention, substrate 165 may act as a light guide, in which light emitted by LEEs 140 is coupled into substrate 165. In some embodiments of the present invention, this may be advantageous, while in other embodiments it may be undesirable. In embodiments where it is undesirable, the inner surface of substrate 165 may be roughened or textured to reduce the coupling of light into substrate 165. In some embodiments, the structure may be designed to encourage coupling of light into substrate 165, and in some embodiments substrate 165 may then have features or texture to extract light (light-extraction features) in certain locations or substantially uniformly over the surface of substrate 165.

Figure 22C:
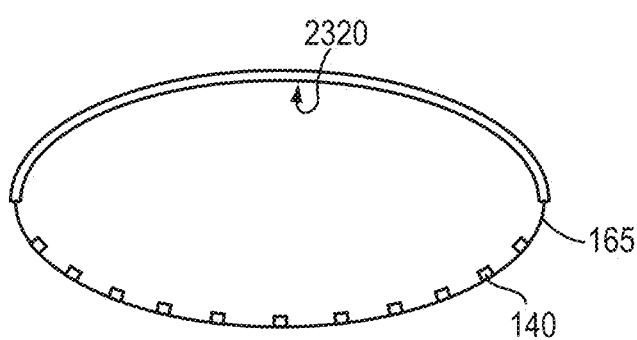
Figure 22D:
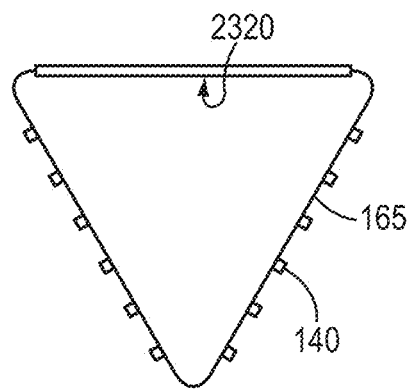

While FIGS. 22A and 22B show lighting devices that are substantially circular in cross-section, this is not a limitation of the present invention, and in other embodiments other configurations may be utilized. For example, FIG. 22C shows one example of an embodiment of the present invention including transparent or diffusing substrate 165 having a substantially oval shape, which is partially coated with a reflecting coating 2320 on a portion of the surface opposite that on which LEEs 140 are formed. Coating 2320 may have a relatively high reflectance, for example greater than 90% to a wavelength of light emitted by LEEs 140, resulting in substantially all of the light being emitted in a downward direction, that is exiting the lighting device through the non-coated portion of substrate 165. However, this is not a limitation of the present invention, and in other embodiments coating 2320 may have a lower reflectance for a wavelength of light emitted by LEEs 140, thereby permitting a portion of the light to be emitted in the upward direction. FIG. 22D shows another example of an embodiment of the present invention, including transparent or diffusing substrate 165 having a substantially triangular shape, which is partially coated with a reflecting coating 2320 on the interior of one side and LEEs 140 formed on the interior of the other two sides.

Figure 22E:
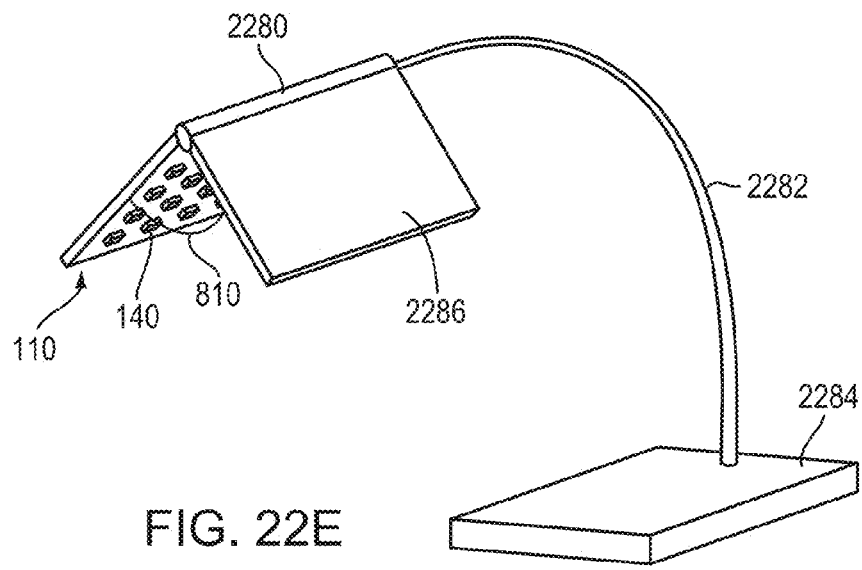
FIG. 22E is an isometric schematic of a reconfigurable lighting device in accordance with various embodiments of the invention.

In some embodiments of the present invention, all or a portion of light sheet 110 may be positionable or movable, enabling a lighting system having a variable luminous intensity distribution. For example, lighting system 800 of FIG. 8A may be configured to have a variable angle 810, and by varying angle 810, the luminous intensity distribution may be changed, as described herein. In some embodiments, angle 810 may be varied manually (i.e., by hand), for example, in a desk lamp, pendant, table lamp, torchiere, or other lighting device. FIG. 22E shows an example of one embodiment of a desk lamp that includes a folded light sheet 110 disposed on an optional backing 2286 and connected to a base 2284 by a support 2282. A hinge 2280 permits manual adjustment of angle 810, which results in a variation in the luminous intensity distribution of the lighting system as detailed herein.

Figures 22F, 22G, 22H:
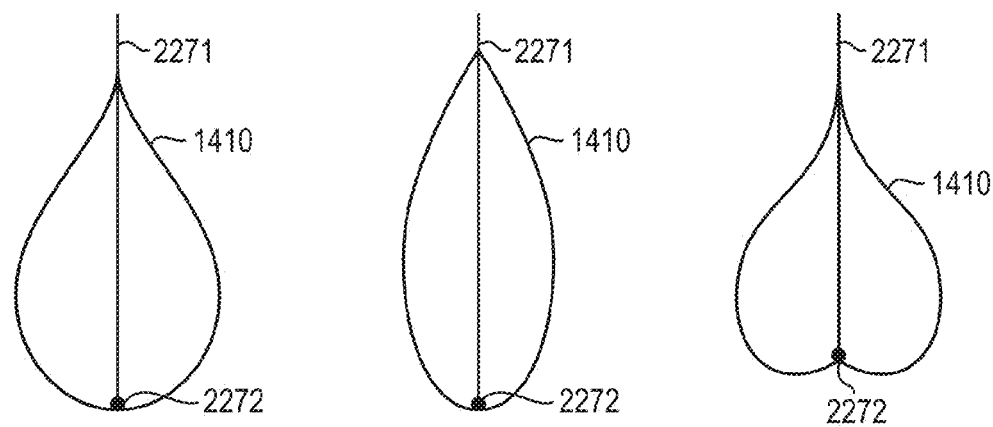
FIGS. 22F-22H are schematic cross-sections of a reconfigurable lighting device in different configurations, in accordance with various embodiments of the invention.

FIG. 22E shows an embodiment of the present invention including a folded light sheet 110; however, this is not a limitation of the present invention, and in other embodiments light sheet 110 may be curved or curved and folded. For example, for the structure of FIG. 9A, the shape of surface 910 may be modified to change the luminous intensity distribution, or for the structure of FIG. 10A, the distance 1020 may be varied or point 1015 may be shifted to change the luminous intensity distribution. For the structure of FIG. 14A, the extent of the lighting device in the z-direction may be changed. In one embodiment of the present invention, the shape of surface 1410 may be changed by moving a connecting rod 2271, mated to surface 1410 at a mating point 2272, up or down, as shown in FIGS. 22F-22H, to change the luminous intensity distribution. However, this is not a limitation of the present invention, and in other embodiments the shape of surface 1410 may be modified in other ways, for example by disposing light sheet 110 on a support that is deformable and positionable (i.e., the support may be deformed, and after deformation, it remains in substantially the deformed position). In another embodiment of the present invention, the shape of a lighting system similar to that shown in FIG. 16A may be modified by changing its radius of curvature.

In some embodiments of the present invention, the shape of light sheet 110 may be modified manually; however, this is not a limitation of the present invention, and in other embodiments the shape of light sheet 110 may be modified by other means, for example by a motor, by fluid or hydraulic pressure (e.g., air pressure), by piezoelectric actuation, or by other means. In some embodiments of the present invention, the modification may be controlled manually, for example as in FIG. 22E; however, this is not a limitation of the present invention, and in other embodiments the modification may be controlled by a remote switch, by an integrated building control system, by a mobile phone or tablet, or by any other means.

Figure 22I:
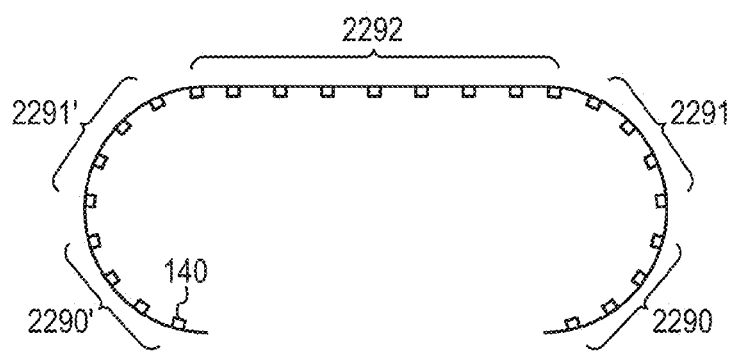
FIG. 22I is a schematic cross-section of a lighting device with individually energizable groups of light-emitting elements in accordance with various embodiments of the invention.

In some embodiments of the present invention, the luminous intensity distribution may be modified by changing the distribution of illuminated LEEs 140 on substrate 165. In some embodiments, this may be carried out without changing the shape of light sheet 110, while in other embodiment changing the shape of light sheet 110 may be combined with changing the distribution of illuminated LEEs 140 on substrate 165. For example, FIG. 22I shows a schematic of a lighting device similar that shown in FIG. 9A; however, the lighting device of FIG. 22I includes five groups of LEEs 140. In the structure of FIG. 22I, groups 2290, 2290', 2291, and 2291' are symmetrically positioned on opposite sides of the lighting device, while a group 2292 is positioned in the center of the lighting device. When only groups 2290 and 2290' are energized, the lighting device has a luminous intensity distribution similar to that shown in FIG. 9B. Energizing any one or combinations of groups 2291, 2291', or 2292 will result in a change in luminous intensity distribution. In some embodiments, the symmetric groups may be energized or de-energized together, for example groups 2290, 2290' and groups 2291, 2291', while in other embodiments these may be energized or de-energized separately, for example group 2290 may be energized while group 2290' may be de-energized. The examples provided herein with respect to changing sheet shape and energization and de-energization of different groups of LEEs 140 are meant to be exemplary, and in other embodiments other light sheet 110 shapes as well as different groups of LEEs 140 all fall within the scope of the present invention.

An aspect of various embodiments of the present invention is a thin light sheet that does not require any additional heat sinking or thermal management. In some embodiments, the light sheet may also be flexible and may be curved or folded to achieve one or more specific characteristics or attributes, for example in some embodiments to permit manufacture of a compact, foldable system and/or to achieve a specific light-distribution pattern.

In some embodiments of the present invention, the light sheet typically includes or consists essentially of an array of light-emitting elements (LEEs) electrically coupled by conductive elements formed on a flexible substrate, for example as described in U.S. patent application Ser. No. 13/799,807, filed Mar. 13, 2013 (the '807 application), or U.S. patent application Ser. No. 13/970,027, filed Aug. 19, 2013 (the '027 application), the entire disclosure of each of which is herein hereby incorporated by reference.

Figure 23A:
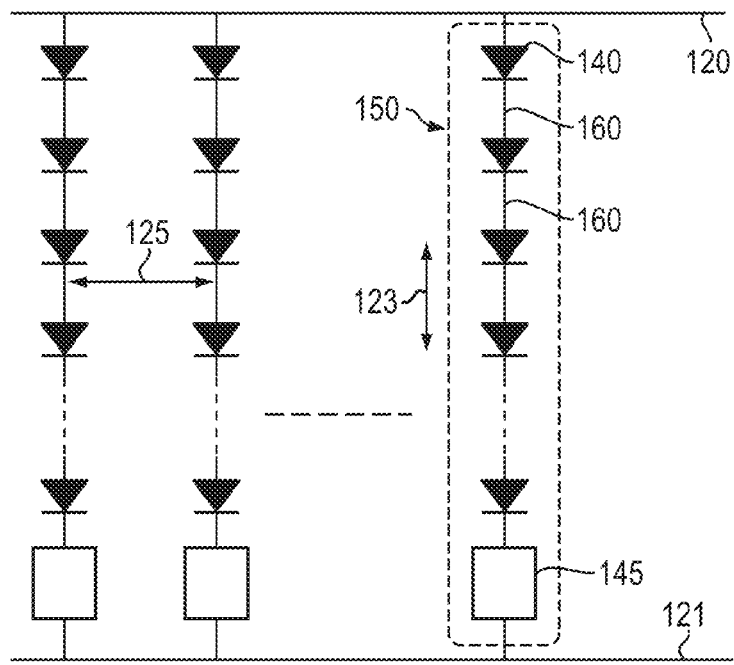
FIG. 23A is a circuit diagram of a portion of a light sheet in accordance with various embodiments of the invention.

FIG. 23A depicts an exemplary circuit topology of one embodiment of a light sheet, in accordance with embodiments of the present invention, which features conductive elements 160, at least two power conductors 120, 121, multiple LEEs 140, and control elements (CEs) 145. In some embodiments, LEEs 140 may be configured in a regular periodic array, for example a substantially square or rectangular array, where LEEs 140 are separated by pitch (or "spacing") 123 in one direction (for example vertical direction) and by pitch 125 in a substantially orthogonal direction. In some embodiments, pitch 125 is the same as or substantially the same as pitch 123. While the geometrical layout and pitches 123 and 125 are described in connection with the circuit schematic shown in FIG. 23A, such geometry, layout, and pitches are not limitations of the present invention, and in other embodiments the physical layout of the circuit elements may be different than the circuit topology shown in FIG. 23A. Additionally, other embodiments may have different circuit topologies, for example LEEs 140 may be electrically coupled in parallel, in a combination of series and parallel, or any other arrangement. In some embodiments, more than one group of electrically connected LEEs 140 may be electrically coupled to one CE 145, while other embodiments may not require any CEs 145. The specific circuit topology is not a limitation of the present invention.

FIG. 23A shows two power conductors 120 and 121, which may be used to provide power to strings 150 of LEEs 140. Each string 150 may include two or more electrically coupled LEEs 140. LEEs 140 in string 150 may be electrically coupled in series, as shown in FIG. 23A; however, this is not a limitation of the present invention, and in other embodiments other examples of electrical coupling may be utilized, for example LEEs 140 in parallel or in any combination of series and parallel connections. FIG. 23A shows CEs 145 connected in series with LEEs 140 of string 150; however, this is not a limitation of the present invention, and in other embodiments CEs 145 may have different electrical coupling between power conductors 120, 121, or may be absent altogether. For example, in some embodiments CEs 145 may be separately electrically coupled to power conductors 120, 121 and to the LEE string, while in other embodiments each CE 145 may be electrically coupled to two or more strings. The number of strings electrically coupled to each CE 145 is not a limitation of the present invention. Combinations of structures described herein, as well as other electrical connections, all fall within the scope of the present invention. Power conductors 120, 121 may be used to provide power to strings 150, for example AC power, DC power, or power modulated by any other means.

Figure 23B:
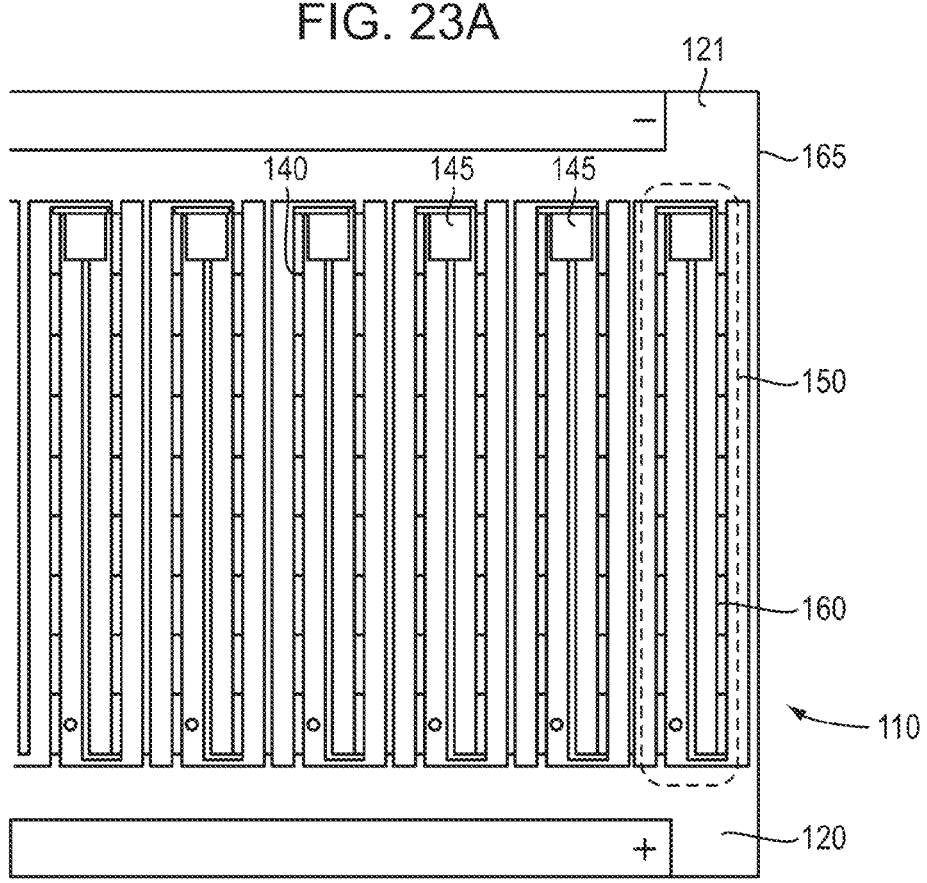
FIGS. 23B and 23C are schematic plan views of light sheets in accordance with various embodiments of the invention.
Figure 23C:
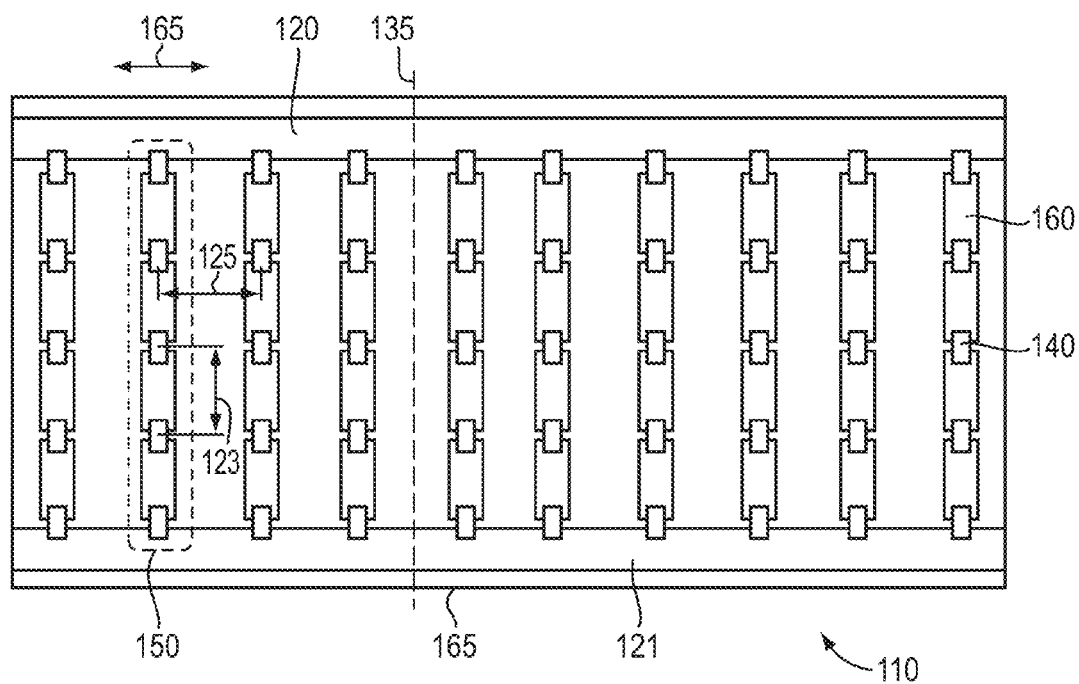

Referring to FIGS. 23B and 23C that depict schematics of exemplary light sheets 110, light sheet 110 features an array of LEEs 140 each electrically coupled between conductive traces 160, and power conductors 120 and 121 providing power to conductive traces 160 and CEs 145, all of which are disposed over a substrate 165. As utilized herein, a "wiring board" refers to a substrate for LEEs with or without additional elements such as conductive traces or CEs. A wiring board may also be referred to as a light sheet or a circuit board. FIG. 23B shows a portion of light sheet 110.

In the exemplary embodiment depicted in FIG. 23B, power conductors 120, 121 are spaced apart from each other and light-emitting strings (or simply "strings") 150 are connected in parallel across power conductors 120, 121. In some embodiments, for example as shown in FIG. 23B, strings 150 do not cross (i.e., intersect) each other. In other words, power conductors 120, 121 are oriented in one direction and strings 150 are oriented such that they span power conductors 120, 121 in a different direction. As shown in FIG. 23B, strings 150 are substantially perpendicular to power conductors 120, 121. However, this is not a limitation of the present invention, and in other embodiments at least some segments (i.e., portions connecting two or more LEEs 140), or even the entire strings 150, may define a line (not necessarily a straight line) that is not perpendicular to power conductors 120, 121 yet is (at least for an entire string 150) not parallel to power conductors 120, 121. In other embodiments strings 150 may intersect, for example one string 150 splitting into two or more strings 150, or two or more strings 150 joining to form a reduced number of strings 150. In some embodiments, conductive elements may cross over each other without being electrically coupled, and in some embodiments strings 150 may cross over or under each other without being electrically coupled. In some embodiments all or a portion of one or more strings 150 may be outside of the area bound by power conductors 120, 121. Various examples of string geometries and conformations utilized in embodiments of the present invention are described in the '807 and '027 applications.

As shown, LEEs 140 are positioned across substrate 165 in a regular periodic array, although this is not a limitation of the present invention, and in other embodiments LEEs 140 may occupy any positions on light sheet 110. Power conductors 120 and 121 provide power to each LEE string, for example the string 150 encircled by the dashed line in FIG. 23B. Each LEE string 150 typically includes multiple conductive traces 160 that interconnect multiple LEEs 140, as well as one or more CEs 145, which in FIG. 23B is in series with LEEs 140. String 150 shown in FIG. 23B is a folded string, i.e., a string that has three segments electrically coupled in series but positioned as three adjacent segments. A string segment is a portion of a string spanning all or a portion of the region between power conductors 120 and 121 in FIG. 23B. In light sheet 110, some string segments may include LEEs 140 while others do not. However, in other embodiments the distribution and position of LEEs 140 along conductive elements 160 and string segments may be different. In some embodiments, a string 150 may be a straight string, i.e., a string with no folds, as shown in FIG. 23C. (For simplicity, the example shown in FIG. 23C does not depict CEs 145). One end of string 150 is electrically coupled to power conductor 120, while the other end of string 150 is electrically coupled to power conductor 121. As will be discussed, the number of segments in a string 150 is not a limitation of the present invention. Various examples of straight and folded strings utilized in embodiments of the present invention are detailed in the '807 and '027 applications.

FIGS. 23A and 23B illustrate three aspects in accordance with embodiments of the present invention. The first is the multiple strings 150 that are powered by the set of power conductors 120, 121. The second is the positional relationship between the locations of LEEs 140 and CE 145, which is disposed between the conductive traces 160 and between power conductors 120, 121, such that the pitch between LEEs 140 is not disrupted by the placement or position of CE 145. The third is the inclusion of a CE 145 in each string of series-connected LEEs 140. Combinations of these three aspects enable light sheet 110 to be economically manufactured in very long lengths, for example in a roll-to-roll process, and cut to specified lengths, forming light sheets, while maintaining the ability to tile, or place light sheets adjacent to each other (e.g., in the length direction), with no or substantially no change in pitch between LEEs 140 or in the optical characteristics across the joint between two adjacent light sheets, as discussed in more detail in the '807 and '027 applications.

In an exemplary embodiment, CE 145 is configured to maintain a constant or substantially constant current through LEEs 140 of string 150. For example, in some embodiments, a constant voltage may be applied to power conductors 120, 121, which may, under certain circumstances may have some variation, or the sum of the forward voltages of LEEs 140 in different strings may be somewhat different, for example as a result of manufacturing tolerances, or the component and/or operational values of the element(s) within CE 145 may vary, for example as a result of manufacturing tolerances or changes in operating temperature, and CE 145 acts to maintain the current through LEEs 140 substantially constant in the face of these variations. In other words, in some embodiments the input to the light sheet is a constant voltage that is applied to power conductors 120, 121, and CEs 145 convert the constant voltage to a constant or substantially constant current through LEEs 140. The design of CE 145 may be varied to provide different levels of control or variation of the current through LEEs 140. In some embodiments, CEs 145 may control the current through LEEs 140 to be substantially constant with a variation of less than about ±25%. In some embodiments, CEs 145 may control the current through LEEs 140 to be substantially constant with a variation of less than about ±15%. In some embodiments, CEs 145 may control the current through LEEs 140 to be substantially constant with a variation of less than about ±10%. In some embodiments, CEs 145 may control the current through LEEs 140 to be substantially constant with a variation of less than about ±5%.

In some embodiments, CEs 145 may, in response to a control signal, act to maintain a constant or substantially constant current through LEEs 140 until instructed to change to a different constant or substantially constant current, for example by an external control signal. In some embodiments, as detailed herein, all CEs 145 on a sheet may act in concert, that is maintain or change the current through all associated LEEs 140; however, this is not a limitation of the present invention, and in other embodiments one or more CEs 145 may be individually instructed and/or energized.

In some embodiments LEEs 140 may include or consist essentially of light-emitting diodes (LEDs) or lasers. In some embodiments, light emitted from light sheet 110 is in the form of an array of bright spots, or light-emission points, resulting in a pixelated pattern. However, this is not a limitation of the present invention, and in other embodiments light sheet 110 includes different types of light emitters, for example organic LEDs (OLEDs). In some embodiments, light sheet 110 may emit light homogeneously or substantially homogeneously, for example light sheet 110 may include an array of LEEs 140 behind an optic or diffuser that spreads the light from LEEs 140 homogeneously or substantially homogeneously. In some embodiments, light sheet 110 may include one or more OLEDs emitting homogeneously or substantially homogeneously over light sheet 110.

In the embodiment depicted in FIG. 23B, LEEs 140 are distributed substantially uniformly over light sheet 110; however, this is not a limitation of the present invention, and in other embodiments, LEEs 140 may have a non-uniform distribution. As will be understood, the distributions of LEE 140 on light sheet 110 shown in FIG. 23B are not limitations of the present invention, and other embodiments may have other distributions of LEEs 140. In some embodiments, one or more portions of light sheet 110 may be unpopulated with LEEs 140. In some embodiments, the distribution of LEEs 140 on light sheet 110 is specifically chosen to achieve one or more characteristics, for example optical, electrical, thermal or the like, as described herein. In some embodiments, the distribution of LEEs 140 on light sheet 110 may be chosen to create a certain decorative look.

In some embodiments, light sheet 110 may also be cut to length, as discussed in more detail in the '807 and '027 applications. For example, in some embodiments of the present invention light sheet 110 may be cut between strings 150.

In some embodiments, light sheet 110 does not require any additional thermal management or heat-sinking, i.e., the heat generated by LEEs 140 is at least partially accommodated by the structure of light sheet 110 itself, for example substrate 165 and/or conductive elements 160 and/or power conductors 120, 121.

In some embodiments of the present invention substrate 165 is substantially covered with an array of LEEs 140; however, in some embodiments one or more portions of substrate 165 may not be populated with LEEs 140.

In some embodiments, all LEEs 140 in the lighting system may be driven at the same or substantially the same current; however, this is not a limitation of the present invention, and in other embodiments different LEEs 140 or different groups of LEEs 140 may be driven at different currents.

In some embodiments, all LEEs 140 in the lighting system may have the same optical characteristics, for example luminous or radiant flux, CCT, CRI, R9, spectral power distribution, light distribution pattern, angular color uniformity or the like; however, this is not a limitation of the present invention, and in other embodiments different LEEs 140 or different groups of LEEs 140 may have different optical characteristics.

Figure 24A:
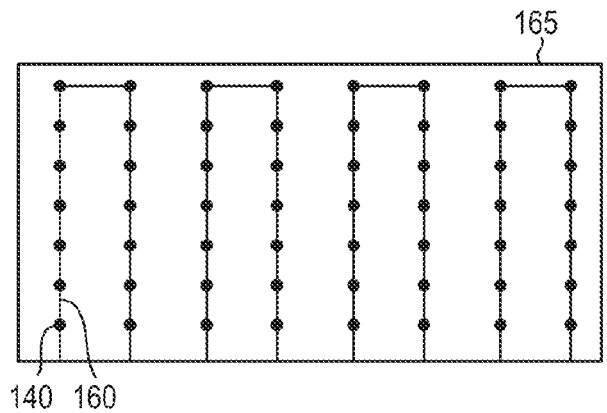
FIG. 24A is a schematic plan view of a light sheet in accordance with various embodiments of the invention.
Figure 24B:
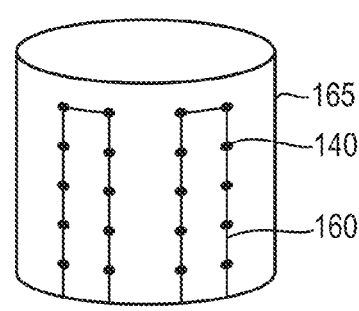
FIG. 24B is an isometric view of the light sheet of FIG. 24A in a rolled configuration.
Figure 24C:
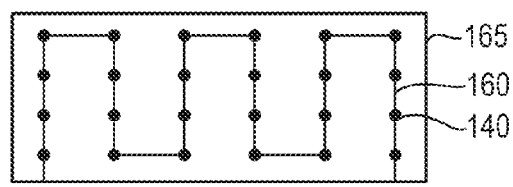
FIGS. 24C and 24D are schematic plan views of light sheets in accordance with various embodiments of the invention.
Figure 24D:
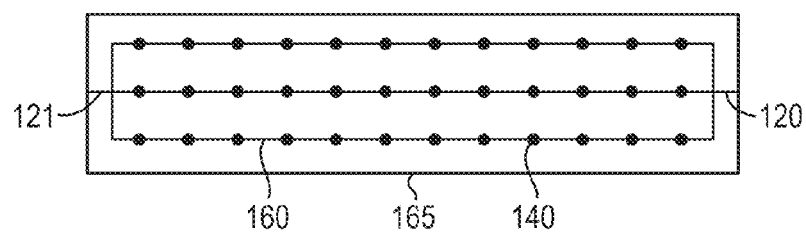
Figure 24E:
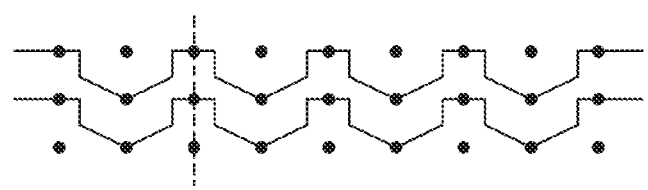
FIG. 24E is a schematic plan view of a portion of a light sheet in accordance with various embodiments of the invention.

In some embodiments of the present invention the pattern of conductive traces may be modified to accommodate different lighting device configurations. For example, FIGS. 24A and 24B show one embodiment of a conductive trace pattern for a light sheet featuring all connections at one end (i.e., the light-emitting strings are folded and both terminal ends of the strings are disposed at the same edge of the light sheet). FIG. 24A shows the light sheet in flat form, while FIG. 24B shows it rolled into a cylinder. While FIG. 24B shows the light sheet rolled into a cylinder, this is not a limitation of the invention, and in other embodiments the light sheet may be formed into other shapes. FIG. 24C shows an example of another embodiment of the present invention, in which a relatively large number of LEEs 140 are electrically coupled in series. In this case, the voltage across the string is given approximately by the product of the number of LEEs 140 in the string and the forward voltage of an LEE 140 at the operating current. FIG. 24D shows an example of another embodiment of the present invention that has a relatively large aspect ratio of length to width. In some embodiments, this configuration may be utilized for a fluorescent lamp replacement, as described herein. In the structure shown in FIG. 24D, the ends of each string are electrically coupled together and to power conductors 120, 121; however, this is not a limitation of the invention, and in other embodiments the strings may be separate, as shown in FIG. 24A. FIG. 24E shows an example of an embodiment of the present invention in which the electrical coupling between LEEs 140 is staggered, so that approximately every other LEE 140 in the array is part of and energized through a different string. In some embodiments, this configuration may be used when different strings have different types of LEEs 140, or may be used to reduce the visual impact of a string failure, as described in U.S. Pat. No. 8,653,539, filed Jul. 15, 2011, the entire disclosure of which is incorporated by reference.

Figure 25A:
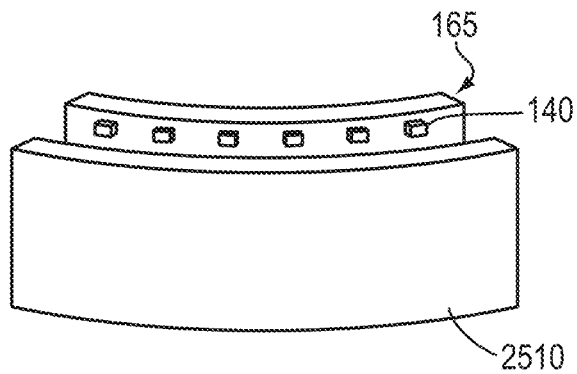
FIG. 25A is an isometric view of a lighting device in accordance with various embodiments of the invention.
Figure 25B:
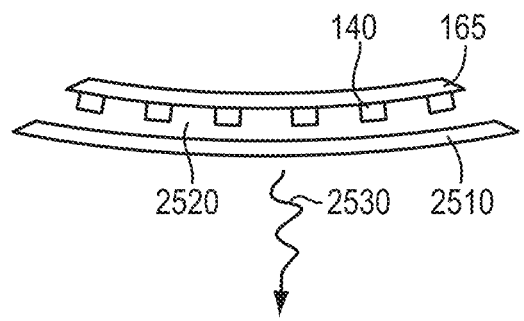
FIG. 25B is a cross-sectional view of the lighting device of FIG. 25A.

In another embodiment, a light sheet may include LEEs 140 that provide energy for or pump a wavelength-conversion material that is not integrated into and/or not in contact with LEEs 140. For example, FIG. 25A shows an embodiment of the present invention in which the lighting device includes substrate 165 over which are formed LEEs 140 and a wavelength-conversion material 2510. A portion of the light 2520 emitted from LEEs 140 is absorbed by wavelength-conversion material 2510 and re-emitted at a different wavelength as light 2530. The light that is observed from this lighting device is a combination of the light 2520 emitted by LEEs 140 and light 2530 emitted by wavelength-conversion material 2510. For example, in one embodiment of the present invention, LEEs 140 emit substantially blue light, for example in the wavelength range of about 440 nm to about 460 nm, and wavelength-conversion material 2510 emits light in the green-yellow-red wavelength region, the combination appearing white to a human observer.

Figure 26:
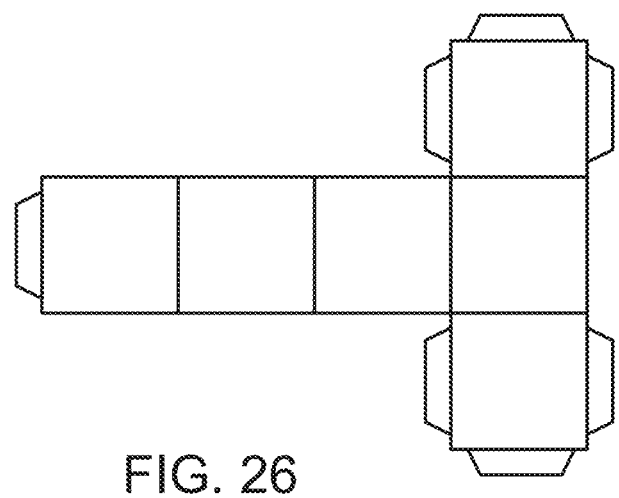
FIG. 26 is a schematic plan view of an unfolded lighting device in accordance with various embodiments of the invention.

In some embodiments of the present invention, light sheet 110 may be creased and or folded to form three-dimensional objects in a manner similar to origami paper folding. In some embodiments of the present invention, a starting light sheet may be a square or rectangle, while in other embodiments the light sheet may be pre-cut before or during folding. FIG. 26 shows an example of one embodiment of the present invention of a pre-cut light sheet that may be folded to form a cube. In some embodiments of the present invention, LEEs 140 may be formed on any number of faces of the cube. In some embodiments, a battery may be formed on the light sheet or within the cube to energize LEEs 140. In some embodiments of the present invention, substrate 165 may include or consist essentially of paper; however, this is not a limitation of the present invention, and in other embodiments other materials, as described herein, may be used. In some embodiments, such lighting devices may be shipped flat, to reduce shipping volume and cost, and be assembled at the job or customer site. In some embodiments, pre-applied glue or tape may be utilized to simplify assembly.

Figure 27A:
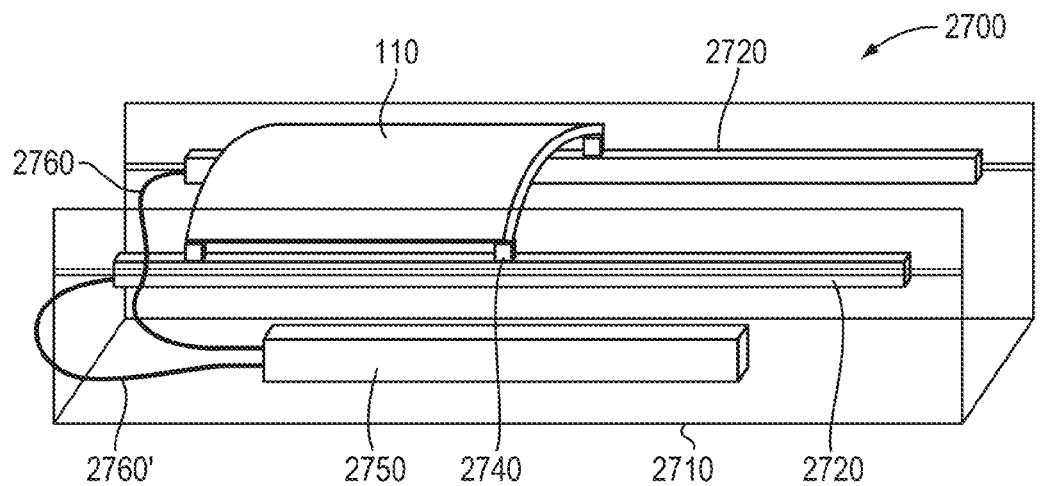
FIG. 27A is an isometric view of a lighting device in accordance with various embodiments of the invention.
Figure 27B:
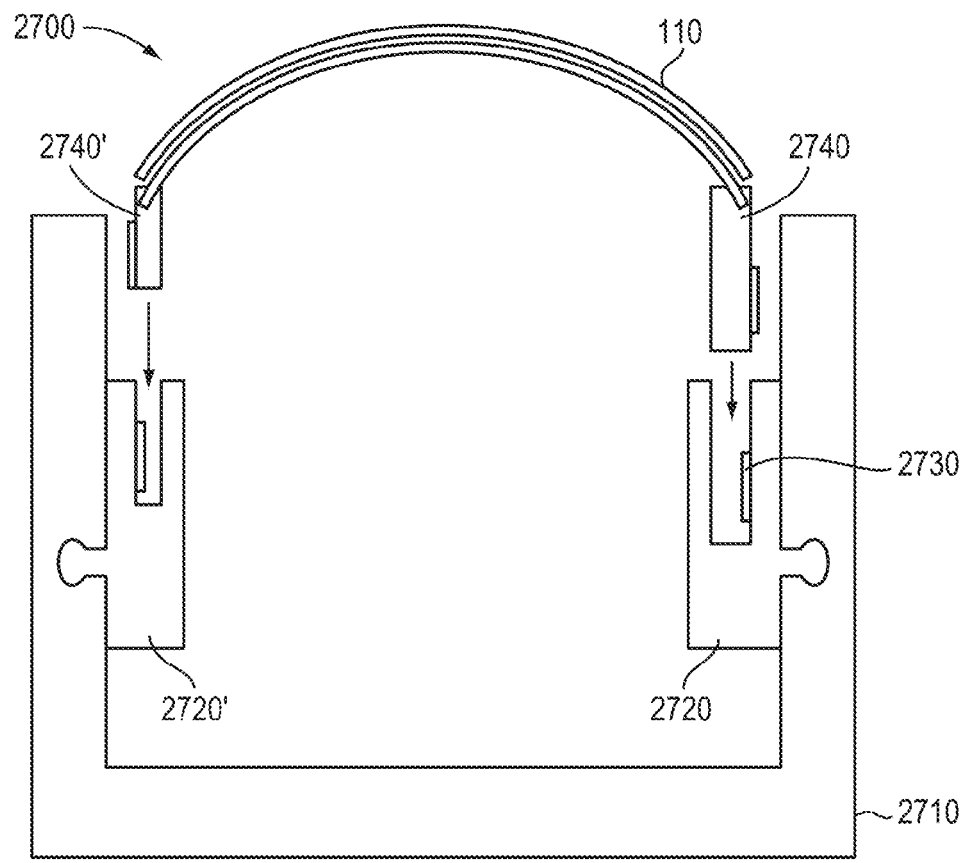
FIG. 27B is a cross-sectional view of the lighting device of FIG. 27A.

FIGS. 27A and 27B show a lighting device 2700 that is an example of another embodiment of the present invention, including a channel 2710 on which is mounted a connector 2720. As shown, light sheet 110 has one or more tabs 2740 that may serve a dual purpose. First, they provide mechanical support for light sheet 110 in channel 2710. Second, they provide electrical coupling of light sheet 110 to a conductor 2730 that is disposed within connector 2720. A power supply or driver 2750 is coupled to light sheet 110 through wires 2760 and 2760', which are connected to conductors 2730 and 2730' within connectors 2720 and tabs 2740.

In some embodiments of the present invention, tabs 2740 may include or consist essentially of a portion of substrate 165 and portions of one or more conductive elements on substrate 165, for example portions of power conductors 120, 121. In this embodiment, tabs 2740 may be relatively flexible. However, this is not a limitation of the present invention, and in other embodiments tabs 2740 may include or consist essentially of portions of substrate 165 and portions of one or more conductive elements backed by a stiffener to provide additional rigidity and robustness to tabs 2740. In some embodiments, the stiffener (not shown in FIGS. 27A and 27B) may include or consist essentially of an electrically insulating material such as plastic, or may include or consist essentially of an electrically conductive material such as metal. In some embodiments of the present invention, tabs 2740 may include or consist essentially of a rigid or flexible connective element attached to light sheet 110, for example as shown in FIG. 27B.

In some embodiments, connector 2720 and tab 2740 may be polarized or keyed, as shown in FIG. 27B, such that light sheet 110 may only be installed in channel 2710 in one configuration. In some embodiments, this may be used to ensure the correct polarity of the electrical connection between driver 2750 and light sheet 110, for example the connection to power conductors 120, 121 in FIG. 23A.

In some embodiments of the present invention, one or more light sheets 110 may be positioned and re-positioned along channel 2710. For example, in some embodiments, one or more channels 2710 may be mounted to a surface, for example a ceiling, and one or more light sheets 110 may be mounted in channel 2710, for example where required by the layout and use of the space. If the layout and/or use of the space changes, light sheet 110 may be re-positioned to accommodate these changes. In some embodiments, different light sheets 110 may be utilized, for example having different optical characteristics, for example different CCT, CRI, R9, spectral power distribution, luminous intensity distribution, different LEEs 140, different substrate characteristics, for example reflectance, different curvature, or the like. In some embodiments, different light sheets 110 may be coupled with different optics to achieve different luminous intensity distributions.

In some embodiments of the present invention, tabs 2740 may only provide mechanical support. The curvature of light sheet 110 is in part determined by the relative width of channel 2710 and light sheet 110. The larger the width of light sheet 110 relative to the width of channel 2710, the larger will be the curvature of light sheet 110 after installation in channel 2710. In some embodiments of the present invention, light sheet 110 may be installed into channel 2710 by inserting tabs 2740 into connector 2720. In embodiments in which tab 2740 provides electrical coupling to light sheet 110, a portion of tab 2740 is also electrically coupled to conductor 2730. In some embodiments, a portion of substrate 165 is extended and may itself form tab 2740 (with or without conductive elements for electrical coupling to conductor 2730, or may be incorporated into tab 2740 for the same purpose.

Figure 27C:
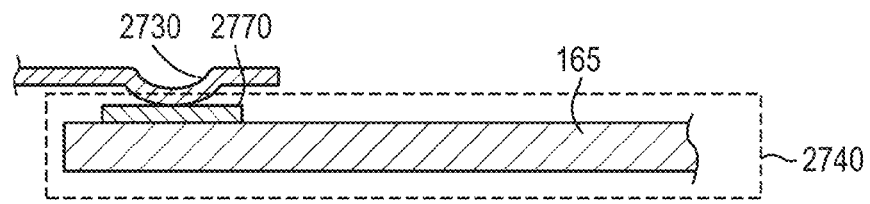
FIGS. 27C-27G are cross-sectional schematics of electrical connections formed in lighting devices in accordance with various embodiments of the invention.

FIG. 27C shows one embodiment of a connection scheme between light sheet 110 and a conductor 2730. In this embodiment, a conductor 2770 (for example power conductor 120 or 121) on light sheet 165 mechanically mates and electrically couples with conductor 2730 in channel 2720.

Figure 27D:
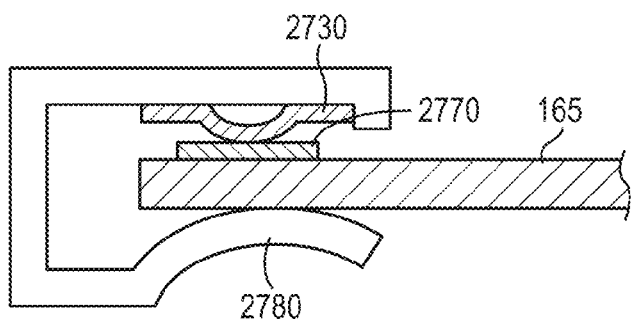

FIG. 27D shows one embodiment of a connection scheme between light sheet 110 and a conductor 2730. In this embodiment, a conductor 2770 (for example power conductor 120 or 121) on light sheet 165 corresponds to a tab 2740 and mechanically mates and electrically couples with conductor 2730, which is held in place by a clip 2780. In some embodiments of the present invention, clip 2780 is a spring-loaded clip that holds substrate 165 in place. In some embodiments of the present invention, clip 2780 may be attached to or part of channel 2710.

Figure 27E:
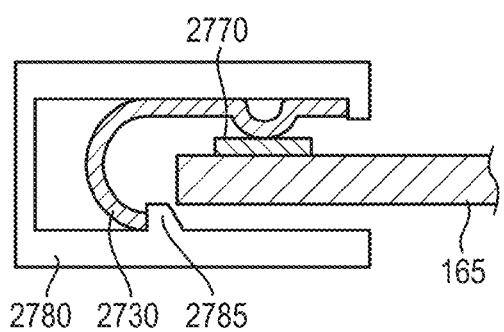
Figure 27F:
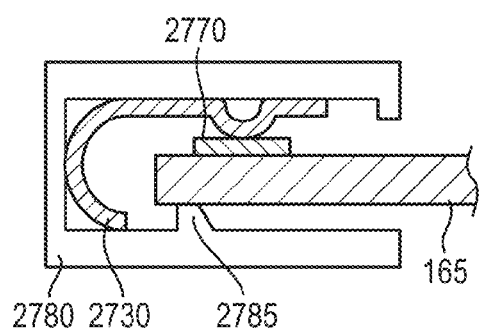

FIGS. 27E and 27F show one embodiment of a connection scheme between light sheet 110 and a conductor 2730. In this embodiment, conductor 2730 is spring-loaded within clip 2780. FIG. 27E shows substrate 165 prior to insertion. When substrate 165 is pushed in, it rides over a protrusion 2785 and is compressed between protrusion 2785 and conductor 2730, making electrical contact between conductor 2730 and conductor 2770 on substrate 165. In some embodiments of the present invention, clip 2780 may be attached to or part of channel 2710.

Figure 27G:
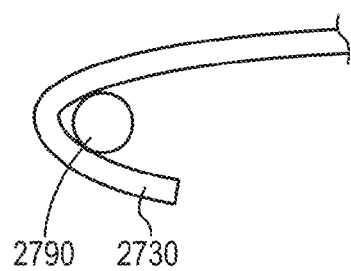

In some embodiments of the present invention, conductor 2730 may be electrically coupled to a wire. In one embodiment of the present invention, a wire 2790 may be crimp-connected to conductor 2730, as shown in FIG. 27G. However, this is not a limitation of the present invention, and in other embodiments wire 2790 may be electrically coupled to conductor 2730 by other means, for example solder, conductive adhesive, rivet, wire wrapping, or the like.

While FIG. 27A shows power supply/driver 2750 inside channel 2710, this is not a limitation of the present invention, and in other embodiments power supply/driver may be outside of or not part of channel 2710.

Figure 28A:
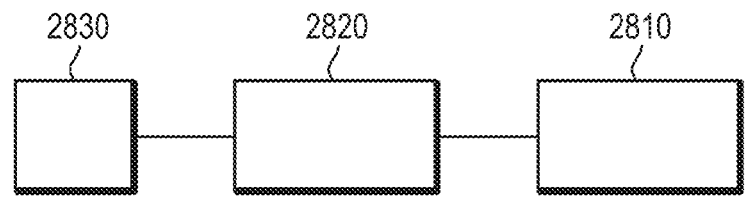
FIGS. 28A-28D are schematic diagrams of electrical connectivity between components of lighting systems in accordance with various embodiments of the invention.

FIG. 28A shows one embodiment of the present invention including a lighting device 2810 and a driver or power supply 2820. Driver 2820 is powered by, e.g., an AC mains 2830, for example having a voltage of about 120 VAC or a voltage of about 240 VAC or about 277 VAC. However, the value of the voltage and/or its time dependence, AC or DC or another arbitrary waveform, are not limitations of the present invention. In some embodiments of the present invention, driver 2820 is a substantially constant-voltage supply. In some embodiments of the present invention, the output of driver 2820 is pulse-width modulated to facilitate dimming of LEEs 140. In some embodiments, driver 2820 has a UL class 2 rating, having a voltage output not exceeding 60 V. In some embodiments of the present invention, driver 2820 may include a battery backup system to provide power to lighting system 2810 in case of a failure of main power 2830.

Figure 28B:
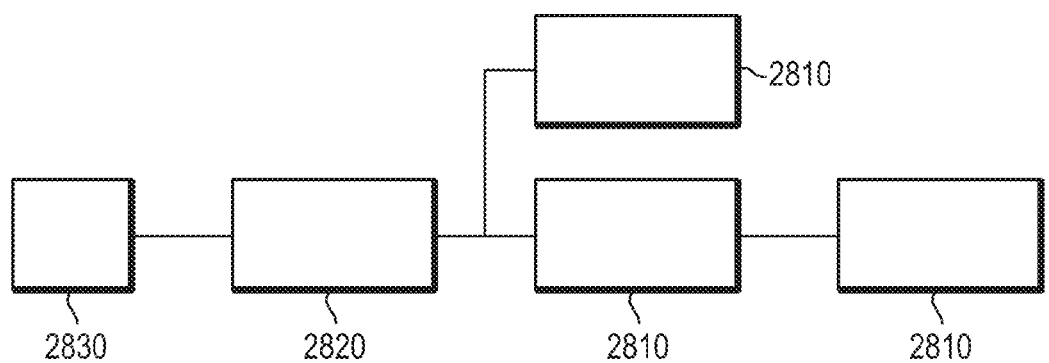
Figure 28C:
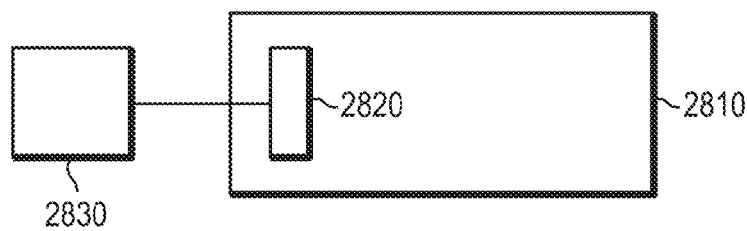

In some embodiments of the present invention, driver 2820 is located outside of lighting device 2810, where for example lighting device 2810 is similar to the lighting devices shown in FIGS. 2A, 2B, 2E, 2E, 2F or the like. In some embodiments, one driver 2820 may power one lighting device 2810, as shown in FIG. 28A, while in other embodiments driver 2820 may power more than one lighting device 2810, as shown in FIG. 28B. FIG. 28B shows one embodiment of the present invention including three lighting devices 2810, with two connected electrically in series and one connected electrically in parallel; however, this is not a limitation of the present invention, and in other embodiments all lighting devices may be connected in series, or all lighting devices may be connected in parallel, or they may be connected in any other configuration. While FIG. 28B shows three lighting devices 2810; this is not a limitation of the present invention, and in other embodiments fewer or more lighting devices 110 may be utilized. FIG. 28B shows three lighting devices 2810 that are substantially the same, but this is not a limitation of the present invention, and in other embodiments driver 2820 may provide power to different types of lighting devices 2810, for example having different sizes, different numbers of LEEs 140 or different spectral or optical characteristics. In some embodiments driver 2820 may be incorporated in the housing, as shown in FIG. 28C.

In some embodiments, control and/or communication signals, either to or from the lighting system, or in two-way communication with the lighting system, may also be provided to embodiments of the present invention. For example such signals may include a dimming signal, signals providing sensor output (e.g., a sensor such as a light sensor, occupancy sensor or the like), connection to a lighting control system (e.g., DALI, DMX or the like), or a facilities management system, a safety system, or the like. In some embodiments of the present invention, such sensors may be incorporated within driver 2820, or within lighting device 2810 or on light sheet 110, while in other embodiments such sensors may be incorporated externally to lighting device 2810 and driver 2820.

In some embodiments of the present invention, such signals may provide control information to the lighting system, for example to energize it, to de-energize it, to change the light level (dimming), to change the CCT, to change the spectral power density, to change the luminous intensity distribution or the like. In some embodiments of the present invention, such signals may provide information about the lighting system, for example a defect or failure in lighting device 2810 and/or driver 2820, the temperature of lighting device 2810 and/or driver 2820, the location of lighting device 2810 and/or driver 2820, the optical characteristics of lighting device 2810 or the like.

Figure 28D:
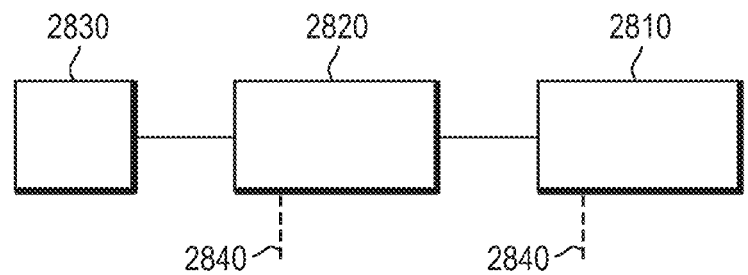

In some embodiments of the present invention, one or more control and/or communication signals may be coupled to driver 2820, while in other embodiments one or more control and/or communication signals may be coupled to lighting device 2810, or in other embodiments one or more control and/or communication signals 2840 may be coupled to both driver 2820 and lighting device 2810, as shown in FIG. 28D. In some embodiments of the present invention, such control and/or communication signals may be coupled to lighting device 2810 and/or driver 2820 wirelessly, for example using light-based communication such as infra-red (IR) or ultra-violet (UV) or visible light, radio-based communication, for example WIFI, Bluetooth or the like. The method and/or protocol of control and communication signals to driver 2820 and/or lighting device 2810 is not a limitation of the present invention.

In some embodiments, warning or other annunciation signals may be displayed by lighting device 2810. In some embodiments of the present invention, light sheet 110 or portions of light sheet 110 or lighting device 2810 may be energized and de-energized to provide a blinking indication. In some embodiments of the present invention, light sheet 110 may be cut or formed into one or more shapes, symbols or letters, to provide additional information or indications. For example light sheet 110 may be shaped into an arrow, a stop sign, a cross or other shapes. In some embodiments of the present invention LEEs 140 on light sheet 110 may be positioned to form one or more shapes, symbols or letters, for example an arrow, a "DO NOT ENTER" sign, a no smoking symbol, a no entry symbol, a symbol for fire, or the like.

As utilized herein, the term "light-emitting element" (LEE) refers to any device that emits electromagnetic radiation within a wavelength regime of interest, for example, visible, infrared or ultraviolet regime, when activated, by applying a potential difference across the device or passing a current through the device. Examples of light-emitting elements include solid-state, organic, polymer, phosphor-coated or high-flux LEDs, laser diodes or other similar devices as would be readily understood. The emitted radiation of an LEE may be visible, such as red, blue or green, or invisible, such as infrared or ultraviolet. An LEE may produce radiation of a continuous or discontinuous spread of wavelengths. An LEE may feature a phosphorescent or fluorescent material, also known as a light-conversion material, for converting a portion of its emissions from one set of wavelengths to another. In some embodiments, the light from an LEE includes or consists essentially of a combination of light directly emitted by the LEE and light emitted by an adjacent or surrounding light-conversion material. An LEE may include multiple LEEs, each emitting essentially the same or different wavelengths. In some embodiments, a LEE is an LED that may feature a reflector over all or a portion of its surface upon which electrical contacts are positioned. The reflector may also be formed over all or a portion of the contacts themselves. In some embodiments, the contacts are themselves reflective. Herein "reflective" or "reflecting" is defined as having a reflectivity greater than 65% for a wavelength of light emitted by the LEE on which the contacts are disposed. In some embodiments, an LEE may include or consist essentially of an electronic device or circuit or a passive device or circuit. In some embodiments, an LEE includes or consists essentially of multiple devices, for example an LED and a Zener diode for static-electricity protection. In some embodiments, an LEE may include or consist essentially of a packaged LED, i.e., a bare LED die encased or partially encased in a package. In some embodiments, the packaged LED may also include a light-conversion material. In some embodiments, the light from the LEE may include or consist essentially of light emitted only by the light-conversion material, while in other embodiments the light from the LEE may include or consist essentially of a combination of light emitted from an LED and from the light-conversion material. In some embodiments, the light from the LEE may include or consist essentially of light emitted only by an LED.

One or more non-LEE devices such as Zener diodes, transient voltage suppressors (TVSs), varistors, etc., may be placed on each light sheet to protect the LEEs 140 from damage that may be caused by high-voltage events, such as electrostatic discharge (ESD) or lightning strikes. In one embodiment, conductive trace segments shown in FIG. 23B or 23C between the LEE strings 150 may be used for placement of a single protection device per light sheet, where the device spans the positive and negative power traces, for example power conductors 120, 121. These trace segments also serve to provide a uniform visual pattern of lines in the web direction, which may be more aesthetically pleasing than a light sheet with noticeable gaps between LEE strings 150. In a more general sense, in addition to conductive traces 160 that are part of string 150, additional conductive traces 160 that may or may not be electrically coupled to other strings 150 and/or power conductors 120, 121 may be formed on substrate 165, for example to provide additional power conduction pathways or to achieve a decorative or aesthetically pleasing look to the pattern on the light sheet or to provide a communication pathway to one or more CEs 145, for example to provide a control signal to the one or more CEs 145. These trace segments also serve to provide a uniform visual pattern of lines in the web direction, which may be more aesthetically pleasing than a light sheet with noticeable gaps between LEE strings 150.

In one embodiment, an LEE 140 includes or consists essentially of a bare semiconductor die, while in other embodiments LEE 140 includes or consists essentially of a packaged LED.

In some embodiments, LEE 140 may include or consist essentially of a "white die" that includes an LED that is integrated with a light-conversion material (e.g., a phosphor) before being attached to the light sheet, as described in U.S. patent application Ser. No. 13/748,864, filed Jan. 24, 2013, or U.S. patent application Ser. No. 13/949,543, filed Jul. 24, 2013, the entire disclosure of each of which is incorporated by reference herein.

In some embodiments, LEEs 140 may emit light in a relatively small wavelength range, for example having a full width at half maximum in the range of about 20 nm to about 200 nm. In some embodiments, all LEEs 140 may emit light of the same or substantially the same wavelength, while in other embodiments different LEEs 140 may emit light of different wavelengths. In some embodiments LEEs 140 may emit white light, for example that is perceived as white light by the eye. In some embodiments, the white light may be visible light with a spectral power distribution the chromaticity of which is close to the blackbody locus in the CIE 1931 xy or similar color space. In some embodiments, white light has a color temperature in the range of about 2000 K to about 10,000 K. The emission wavelength, full width at half maximum (FWHM) of the emitted light or radiation or other optical characteristics of LEEs 140 may not be all the same and are not a limitation of the present invention.

Advantageously, embodiments of the present invention produce light sheet 110 having controlled optical characteristics. In some embodiments of the present invention it is advantageous to have multiple light sheets, each of which as a similar CCT, preferably the average CCT of each light sheet during manufacture or use having a relatively narrow CCT distribution. One measure of white color temperature is defined as a MacAdam ellipse. A MacAdam ellipse represents a region of colors on a chromaticity chart, for example the CIE chromaticity diagram, and a one-step MacAdam ellipse represents the range of colors around the center of the ellipse that are indistinguishable to the average human eye, from the color at the center of the ellipse. The contour of a one-step MacAdam ellipse therefore represents barely noticeable differences of chromaticity.

Multiple-step MacAdam ellipses may be constructed that encompass larger ranges of color around the center point. While there are many recommendations as to how tight the color temperature uniformity should be (as measured by MacAdam ellipses or other units), a variation encompassed within a smaller step number of MacAdam ellipses (smaller ellipse) is more uniform than one encompassed within a larger step number of MacAdam ellipses (larger ellipse). For example, a four-step MacAdam ellipse encompasses about a 300K color temperature variation along the black body locus, centered at 3200K, while a two-step MacAdam ellipse encompasses about a 150K color temperature variation along the black body locus, centered at 3200K.

In some embodiments of the present invention, the variation in average CCT between different light sheets 110 is less than 4 MacAdam ellipses, or less than 3 MacAdam ellipses, or less than 2 MacAdam ellipses.

Substrate 165 may include or consist essentially of a semicrystalline or amorphous material, e.g., polyethylene naphthalate (PEN), polyethylene terephthalate (PET), polycarbonate, polyethersulfone, polyester, polyimide, polyethylene, fiberglass, FR4, metal core printed circuit board, (MCPCB), and/or paper. Substrate 165 may include multiple layers, for example, a semicrystalline or amorphous material, e.g., PEN, PET, polycarbonate, polyethersulfone, polyester, polyimide, polyethylene, and/or paper formed over a second substrate for example comprising, acrylic, aluminum, steel and the like. Depending upon the desired application for which embodiments of the invention are utilized, substrate 165 may be substantially optically transparent, translucent, or opaque. For example, substrate 165 may exhibit a transmittance or a reflectivity greater than 70% for optical wavelengths ranging between approximately 400 nm and approximately 700 nm. In some embodiments substrate 165 may exhibit a transmittance or a reflectivity of greater than 70% for one or more wavelengths emitted by LEE 140. Substrate 165 may also be substantially insulating, and may have an electrical resistivity greater than approximately 100 ohm-cm, greater than approximately $1\times10^6$ ohm-cm, or even greater than approximately $1\times10^{10}$ ohm-cm. In some embodiments substrate 165 may have a thickness in the range of about 10 µm to about 500 µm.

Conductive elements, e.g., power conductors 120, 121 and conductive traces 160, may be formed via conventional deposition, photolithography, and etching processes, plating processes, lamination, lamination and patterning, evaporation sputtering or the like or may be formed using a variety of different printing processes. For example, power conductors 120, 121 and conductive traces 160 may be formed via screen printing, flexographic printing, ink-jet printing, and/or gravure printing. Power conductors 120, 121 and conductive traces 160 may include or consist essentially of a conductive material (e.g., an ink or a metal, metal film or other conductive materials or the like), which may include one or more elements such as silver, gold, aluminum, chromium, copper, and/or carbon. Power conductors 120, 121 and conductive traces 160 may have a thickness in the range of about 50 nm to about 1000 µm. In some embodiments, the thickness of power conductors 120, 121 and conductive traces 160 may be determined by the current to be carried thereby. While the thickness of one or more of power conductors 120, 121 and conductive traces 160 may vary, the thickness is generally substantially uniform along the length of the trace to simplify processing. However, this is not a limitation of the present invention, and in other embodiments the thickness and/or material of power conductors 120, 121 and conductive traces 160 may vary. In some embodiments, all or a portion of power conductors 120, 121 and conductive traces 160 may be covered or encapsulated. In some embodiments, a layer of material, for example insulating material, may be formed over all or a portion of power conductors 120, 121 and conductive traces 160. Such a material may include, e.g., a sheet of material such as used for substrate 165, a printed layer, for example using screen, ink jet, stencil or other printing means, a laminated layer, or the like. Such a printed layer may include, for example, an ink, a plastic and oxide, or the like. The covering material and/or the method by which it is applied is not a limitation of the present invention.

In some embodiments of the present invention, all or a portion of substrate 165 and/or power conductors may be covered by a layer having pre-determined 120, 121 and conductive traces 160 optical properties. In some embodiments the optical properties of substrate 165 or a coating material on substrate 165, for example reflectance, transmittance and absorption, may be utilized to further control the optical characteristics of the lighting system. In some embodiments, substrate 165 or a coating on substrate 165 may be a diffuse reflector, while in other embodiments it may be a specular reflector, and in yet other embodiments it may be designed to have a relatively high absorbance for light emitted by LEEs 140. In some embodiments of the present invention, substrate 165 may have a reflectance of at least 50% or at least 75% or at least 85% or at least 95% to a wavelength of light emitted by LEEs 140. In some embodiments of the present invention, substrate 165 may be transparent or substantially transparent to a wavelength of light emitted by LEEs 140, for example having a transmittance of at least 80% or at least 90% or at least 95% to a wavelength of light emitted by LEEs 140. In some embodiments of the present invention, substrate 165 may be absorbing or substantially absorbing to a wavelength of light emitted by LEEs 140, for example having an absorbance of at least 60% or at least 70% or at least 80% to a wavelength of light emitted by LEEs 140. In some embodiments, substrate 165 or portions of substrate 165 may be configured to diffuse a wavelength of light emitted by LEEs 140. In some embodiments, substrate 165 may have two or more regions, where different regions have different optical characteristics. In some embodiments, the transmittance of a diffuse region is at least 50%, or at least 70% or at least 80%, or at least 90% to a wavelength of light emitted by LEEs 140. The remaining portion of substrate 165 in this embodiment has a reflecting surface that is it is reflecting to a wavelength of light emitted by LEEs 140.

In one embodiment, conductive traces 160 are formed with a gap between adjacent conductive traces 160, and LEEs 140 and CEs 145 are electrically coupled to conductive traces 160 using conductive adhesive, e.g., an isotropically conductive adhesive and/or an ACA, as described in U.S. Pat. No. 8,384,121, filed on Jun. 29, 2011, the entire disclosure of which is incorporated herein by reference. ACAs may be utilized with or without stud bumps and embodiments of the present invention are not limited by the particular mode of operation of the ACA. For example, the ACA may utilize a magnetic field rather than pressure (e.g., the ZTACH ACA available from SunRay Scientific of Mt. Laurel, N.J., for which a magnetic field is applied during curing in order to align magnetic conductive particles to form electrically conductive "columns" in the desired conduction direction). Furthermore, various embodiments utilize one or more other electrically conductive adhesives, e.g., isotropically conductive adhesives, non-conductive adhesives, in addition to or instead of one or more ACAs. In other embodiments, LEEs 140 and CEs 145 may be attached to and/or electrically coupled to conductive traces 160 by other means, for example solder, reflow solder, wave solder, wire bonding, or the like. The method by which LEEs 140 and CEs 145 are attached to conductive traces 160 is not a limitation of the present invention.

CE 145 may be one component or multiple active and/or passive components. In one embodiment, power conductors 120, 121 provide a DC voltage or substantially DC voltage and CE 145 includes or consists essentially of a resistor, e.g. a current-limiting resistor. The choice of the resistance value may be a trade-off between a number of parameters and characteristics that may include, e.g., efficiency and current stability. In general, a larger resistance will result in reduced efficiency but greater current stability, while a smaller resistance will result in increased efficiency but reduced current stability. Variations in the current may result from variations in the input voltage (for example across power conductors 120, 121), variations in forward voltage of the LEEs 140 within the string, variations in the value of the current-limiting resistor, variations in current that may occur if one or more LEEs 140 in the string become short-circuited or the like. In the case of CE 145 including or consisting essentially of a resistor, in some embodiments CE 145 is a discrete resistor formed within or on conductive traces 160, such as a chip resistor, a bare-die resistor or surface mount device (SMD) resistor.

As discussed above, in embodiments where CE 145 includes or consists essentially of a resistor, there may be trade-offs between efficiency and current stability. While such trade-offs may be acceptable in certain products, other products may require relatively better current stability at higher efficiencies, and in these cases CE 145 may include or consist essentially of multiple components or a circuit element, as discussed above. In some embodiments CE 145 includes or consists essentially of a field-effect transistor (FET) and a resistor. In another embodiment CE 145 includes or consists essentially of two bipolar junction transistors (BJTs) and two resistors.

In some embodiments, the efficiency and current stability increase with the number of components, as does the cost. In some embodiments where CE 145 includes or consists essentially of multiple components, the components may be in discrete form (i.e., each component individually electrically coupled to conductive traces 160) or in hybrid form (where multiple separate components are mounted on a submount, which is then electrically coupled to conductive traces 160), or in monolithic form (where multiple components are integrated on a semiconductor chip, for example a silicon-based or other semiconductor-based integrated circuit). In some embodiments, CE 145 may be in bare-die form, while in other embodiments CE 145 may be packaged or potted or the like. In some embodiments, CE 145 may include or consist essentially of a bare-die integrated circuit. In some embodiments, the integrated circuit includes or consists essentially of multiple active and/or passive devices that are fabricated on a common semiconductor substrate.

In other embodiments, power conductors 120, 121 may provide AC power, or power modulated at different frequencies and in these embodiments CEs 145 may be selected accordingly or may be omitted. In one embodiment, power conductors 120, 121 may provide a standard line voltage, for example about 120 VAC or about 240 VAC or about 277 VAC, for example at about 50 Hz or about 60 Hz. In some embodiments, CEs 145 may accommodate a plurality of input types, and thus be so-called "universal" CEs 145, while in other embodiments different CEs 145 may be required for different input types. The actual component or components of CEs 145 are not limiting to this invention; however, in preferred embodiments of this invention, the positioning of CEs 145 does not disrupt the LEE pitch. In another embodiment of this invention, the positioning of CEs 145 is independent of LEE pitch. As discussed herein, CEs 145 and LEEs 140 may be electrically coupled to conductive traces 160 using a variety of means, for example solder, conductive adhesive or anisotropic conductive adhesive (ACA); however, the method of electrical coupling of CEs 140 and LEEs 140 is not a limitation of the present invention.

In some embodiments of the present invention, light sheet 110, when flat, may have a thickness less than about 15 mm, or less than about 10 mm, or less than about 5 mm, or less than about 3 mm. In some embodiments, light sheet 110 may have a thickness no less than about 0.25 mm.

In some embodiments of the present invention, light sheet 110 may have a relatively light weight, for example when substrate 165 includes or consists essentially of PET and/or a similar lightweight material, light sheet 110 may have a weight per area of less than about 2 kg/m$^2$, or less than about 1 kg/m$^2$, or less than about 0.5 kg/m$^2$. In some embodiments light sheet 110 may have a weight per area no less than 20 gm/m$^2$.

In general in the above discussion the arrays of semiconductor dies, light-emitting elements, optics, and the like have been shown as square or rectangular arrays; however this is not a limitation of the present invention and in other embodiments these elements may be formed in other types of arrays, for example hexagonal, triangular or any arbitrary array. In some embodiments these elements may be grouped into different types of arrays on a single substrate.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An illumination device comprising:
a housing;
a flexible light sheet that is substantially planar in an unfolded and uncurved configuration, the light sheet comprising (i) a flexible substrate having first and second opposed surfaces, (ii) a plurality of light-emitting elements disposed over at least one of the first or second surfaces of the substrate, and (iii) a plurality of conductive traces disposed on the substrate and electrically interconnecting the plurality of light-emitting elements; and
one or more spacers disposed between the light sheet and the housing,
wherein (i) the light-emitting elements each have a first luminous intensity distribution, (ii) at least a portion of the flexible substrate not covered by the light-emitting elements is reflective for a wavelength of light emitted by the light-emitting elements, (iii) the light sheet is curved and/or folded to produce a second luminous intensity distribution emitted by the illumination device, different from the first luminous intensity distribution, and (iv) the curved and/or folded light sheet is disposed at least partially within the housing.

2. The illumination device of claim 1, wherein the illumination device is free of optical elements discrete and/or separate from the light-emitting elements and positioned to transmit light emitted by the light-emitting elements, whereby the second luminous intensity distribution is produced only by the curving and/or folding of the light sheet.

3. The illumination device of claim 1, wherein the illumination device is free of diffusers discrete and/or separate from the light sheet and positioned to diffuse light emitted by the light-emitting elements.

4. The illumination device of claim 1, wherein the housing comprises a diffuser disposed around at least a portion of the curved and/or folded light sheet.

5. The illumination device of claim 1, wherein a reflectance of the at least a portion of the flexible substrate not covered by the light-emitting elements is greater than 50% for a wavelength of light emitted by the light-emitting elements.

6. The illumination device of claim 1, wherein a reflectance of the at least a portion of the flexible substrate not covered by the light-emitting elements is greater than 75% for a wavelength of light emitted by the light-emitting elements.

7. The illumination device of claim 1, wherein the at least a portion of the flexible substrate not covered by the light-emitting elements has a specular reflectance for a wavelength of light emitted by the light-emitting elements.

8. The illumination device of claim 1, wherein the at least a portion of the flexible substrate not covered by the light-emitting elements has a diffuse reflectance for a wavelength of light emitted by the light-emitting elements.

9. The illumination device of claim 1, wherein the light-emitting elements are disposed on the first surface of the substrate.

10. The illumination device of claim 1, wherein some of the light-emitting elements are disposed on at least a portion of the first surface of the substrate and some of the light-emitting elements are disposed on at least a portion of the second surface of the substrate.

11. The illumination device of claim 1, wherein the first luminous intensity distribution is a substantially Lambertian luminous intensity distribution and the second luminous intensity distribution is a substantially non-Lambertian luminous intensity distribution.

12. The illumination device of claim 1, wherein the second luminous intensity distribution is a substantially non-Lambertian luminous intensity distribution.

13. The illumination device of claim 1, wherein the second luminous intensity distribution comprises a batwing distribution extending from the illumination device in a first direction.

14. The illumination device of claim 1, wherein the second luminous intensity distribution comprises a collimated beam extending from the illumination device in a first direction.

15. The illumination device of claim 14, wherein the collimated beam has a half-power beam width less than 30°.

16. The illumination device of claim 1, wherein the second luminous intensity distribution comprises, extending from the illumination device in a first direction, a two-lobed beam distribution comprising two lobes separated by an angle therebetween.

17. The illumination device of claim 16, wherein the angle between the two lobes is at least 10°.

18. The illumination device of claim 16, wherein each lobe has a half-power beam width less than 40°.

19. The illumination device of claim 1, wherein the second luminous intensity distribution comprises a substantially cardioid distribution.

20. The illumination device of claim 1, wherein the second luminous intensity distribution comprises a linear spot beam extending from the illumination device in a first direction.

21. The illumination device of claim 20, wherein the linear spot beam has a half-power beam width less than 30°.

22. The illumination device of claim 1, wherein the second luminous intensity distribution comprises a beam distribution that is asymmetric with respect to an axis normal to the illumination device.

23. The illumination device of claim 1, wherein the light sheet defines one or more openings therethrough.

24. An illumination device comprising:
a housing; and
a flexible light sheet that is substantially planar in an unfolded and uncurved configuration, the light sheet comprising (i) a flexible substrate having first and second opposed surfaces, (ii) a plurality of light-emitting elements disposed over at least one of the first or second surfaces of the substrate, and (iii) a plurality of conductive traces disposed on the substrate and electrically interconnecting the plurality of light-emitting elements,
wherein (i) the light-emitting elements each have a first luminous intensity distribution, (ii) at least a portion of the flexible substrate not covered by the light-emitting elements is reflective for a wavelength of light emitted by the light-emitting elements, (iii) the light sheet is curved and/or folded to produce a second luminous intensity distribution emitted by the illumination device, different from the first luminous intensity distribution, and (iv) the curved and/or folded light sheet is disposed at least partially within the housing, and wherein at least one light-emitting element is coupled to one or more of the conductive traces with an anisotropic conductive adhesive, the anisotropic conductive adhesive being activatable via application of at least one of pressure, heat, or a magnetic field.

25. The illumination device of claim 1, wherein (i) the light sheet is curved and/or folded into a first shape, and (ii) the housing has a second shape different from the first shape.

26. The illumination device of claim 1, wherein the light sheet is curved and/or folded such that opposing ends of the light sheet are in contact, whereby a cross-section of the light sheet forms a closed shape.

27. The illumination device of claim 1, wherein the light sheet is curved and/or folded such that opposing ends of the light sheet are not in contact, whereby a cross-section of the light sheet is open.

28. The illumination device of claim 1, wherein at least a portion of the housing is opaque or absorbing to a wavelength of light emitted by the light-emitting elements.

29. The illumination device of claim 1, further comprising a conventional lamp base electrically connected to the light sheet.

30. The illumination device of claim 29, wherein the conventional lamp base comprises an Edison-style base, a pin base, or a threaded base.

31. The illumination device of claim 1, further comprising a reflective coating disposed on at least a portion of an interior surface of the housing.

32. The illumination device of claim 1, wherein at least one light-emitting element is coupled to one or more of the conductive traces with an anisotropic conductive adhesive, the anisotropic conductive adhesive being activatable via application of at least one of pressure, heat, or a magnetic field.

33. The illumination device of claim 1, wherein at least one said spacer comprises a dimple defined by the housing.

34. The illumination device of claim 24, wherein the illumination device is free of optical elements discrete and/or separate from the light-emitting elements and positioned to transmit light emitted by the light-emitting elements, whereby the second luminous intensity distribution is produced only by the curving and/or folding of the light sheet.

35. The illumination device of claim 24, wherein the illumination device is free of diffusers discrete and/or separate from the light sheet and positioned to diffuse light emitted by the light-emitting elements.

36. The illumination device of claim 24, wherein the housing comprises a diffuser disposed around at least a portion of the curved and/or folded light sheet.

37. The illumination device of claim 24, wherein a reflectance of the at least a portion of the flexible substrate not covered by the light-emitting elements is greater than 50% for a wavelength of light emitted by the light-emitting elements.

38. The illumination device of claim 24, wherein the at least a portion of the flexible substrate not covered by the light-emitting elements has a specular reflectance for a wavelength of light emitted by the light-emitting elements.

39. The illumination device of claim 24, wherein some of the light-emitting elements are disposed on at least a portion of the first surface of the substrate and some of the light-emitting elements are disposed on at least a portion of the second surface of the substrate.

40. The illumination device of claim 24, wherein the second luminous intensity distribution is a substantially non-Lambertian luminous intensity distribution.

41. The illumination device of claim 24, wherein the second luminous intensity distribution comprises a batwing distribution extending from the illumination device in a first direction.

42. The illumination device of claim 24, wherein the second luminous intensity distribution comprises a collimated beam extending from the illumination device in a first direction.

43. The illumination device of claim 24, wherein the second luminous intensity distribution comprises a linear spot beam extending from the illumination device in a first direction.

44. The illumination device of claim 24, wherein the second luminous intensity distribution comprises a beam distribution that is asymmetric with respect to an axis normal to the illumination device.

45. The illumination device of claim 24, wherein the light sheet defines one or more openings therethrough.

46. The illumination device of claim 24, wherein at least a portion of the housing is opaque or absorbing to a wavelength of light emitted by the light-emitting elements.

47. The illumination device of claim 24, further comprising a reflective coating disposed on at least a portion of an interior surface of the housing.

* * * * *